United States Patent
Simic et al.

(10) Patent No.: US 8,139,685 B2
(45) Date of Patent: Mar. 20, 2012

(54) SYSTEMS, METHODS, AND APPARATUS FOR FREQUENCY CONTROL

(75) Inventors: Emilija Simic, La Jolla, CA (US); Christopher Patrick, San Diego, CA (US); Raghu Challa, San Diego, CA (US); Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 928 days.

(21) Appl. No.: 11/430,613

(22) Filed: May 8, 2006

(65) Prior Publication Data

US 2007/0066268 A1 Mar. 22, 2007

Related U.S. Application Data

(60) Provisional application No. 60/679,783, filed on May 10, 2005, provisional application No. 60/762,958, filed on Jan. 26, 2006.

(51) Int. Cl.
*H04L 27/00* (2006.01)

(52) U.S. Cl. ........ 375/324; 375/322; 375/316; 375/346; 375/339; 455/318; 455/139; 455/319

(58) Field of Classification Search .................. 455/318, 455/319, 139; 375/324, 322, 316, 346, 339
See application file for complete search history.

(56) References Cited

U.S. PATENT DOCUMENTS

| | | | |
|---|---|---|---|
| 4,907,003 A | 3/1990 | Marshall et al. | |
| 5,852,630 A * | 12/1998 | Langberg et al. | 375/219 |
| 5,905,949 A * | 5/1999 | Hawkes et al. | 455/410 |
| 5,999,561 A | 12/1999 | Naden et al. | |
| 6,133,871 A | 10/2000 | Krasner | |
| 6,289,061 B1 * | 9/2001 | Kandala et al. | 375/344 |
| 6,330,291 B1 | 12/2001 | Agrawal | |
| 6,369,753 B1 * | 4/2002 | Schucker et al. | 342/357.75 |
| 6,459,883 B2 | 10/2002 | Subramanian | |

(Continued)

FOREIGN PATENT DOCUMENTS

JP 2000506348 5/2000

(Continued)

OTHER PUBLICATIONS

Written Opinion—PCT/US2006/018375, International Search Authority, European Patent Office, Sep. 28, 2007.

(Continued)

*Primary Examiner* — Kenneth Lam
(74) *Attorney, Agent, or Firm* — Andrea L. Mays; Arnold J. Gum

(57) ABSTRACT

A receiver according to one embodiment includes a frequency control unit configured to receive a stream of samples including a plurality of received instances of a transmitted signal. The frequency control unit is configured to output a first correction signal (e.g. indicating a rotation) that is based on more than one of the received instances and a second correction signal (e.g. to control an oscillator) that is also based on more than one of the received instances. In some embodiments, a controlled oscillator is used to receive and/or transmit another signal, such as a signal received from a GPS space vehicle. In other embodiments, the received instances are from a GPS signal. In further embodiments, a fixed-frequency oscillator is used, and the second correction signal is used to receive and/or transmit another signal, such as a GPS signal.

48 Claims, 41 Drawing Sheets

U.S. PATENT DOCUMENTS

| | | |
|---|---|---|
| 6,463,266 B1 | 10/2002 | Shohara |
| 6,608,858 B1 | 8/2003 | Sih |
| 6,628,702 B1 | 9/2003 | Rowitch |
| 6,661,851 B1 | 12/2003 | Kang |
| 6,704,555 B2 | 3/2004 | Sih |
| 6,728,301 B1 | 4/2004 | Chrisikos |
| 6,738,608 B2 | 5/2004 | Black |
| 6,760,573 B2 | 7/2004 | Subrahmanya |
| 6,912,244 B2 | 6/2005 | Challa et al. |
| 6,965,754 B2 * | 11/2005 | King .......................... 455/12.1 |
| 7,010,307 B2 * | 3/2006 | Abraham ................... 455/456.1 |
| 7,155,183 B2 * | 12/2006 | Abraham ................... 455/192.1 |
| 7,443,826 B1 * | 10/2008 | Atarius et al. ................ 370/342 |
| 2003/0054768 A1 * | 3/2003 | Challa et al. ..................... 455/63 |
| 2003/0064699 A1 * | 4/2003 | Olsen ........................... 455/318 |
| 2003/0087620 A1 | 5/2003 | Sendonaris |
| 2003/0128678 A1 | 7/2003 | Subrahmanya |
| 2003/0143951 A1 | 7/2003 | Challa et al. |
| 2003/0186666 A1 * | 10/2003 | Sindhushayana ............. 455/260 |
| 2003/0203743 A1 * | 10/2003 | Sugar et al. ................ 455/550.1 |
| 2003/0214432 A1 | 11/2003 | Tawadrous et al. |
| 2003/0214436 A1 * | 11/2003 | Voor et al. ..................... 342/418 |
| 2004/0010367 A1 * | 1/2004 | Pollard ........................ 701/211 |
| 2004/0049717 A1 | 3/2004 | Ahn |
| 2004/0105513 A1 | 6/2004 | Tian |
| 2004/0116121 A1 | 6/2004 | Sendonaris |
| 2004/0125862 A1 | 7/2004 | Li |
| 2004/0248533 A1 | 12/2004 | Mannermaa |
| 2005/0043825 A1 | 2/2005 | Aldridge |
| 2005/0094744 A1 * | 5/2005 | Ramachandran et al. .... 375/316 |

FOREIGN PATENT DOCUMENTS

| | | |
|---|---|---|
| JP | 2001016120 | 1/2001 |
| JP | 2003046398 | 2/2003 |
| JP | 2004524739 | 8/2004 |
| WO | 9714049 | 4/1997 |

OTHER PUBLICATIONS

International Search Report- PCT/US06/18375- International Search Authority—Sep. 28, 2007.
Global Positioning System Standard Positioning Service Signal Specification, 2nd edition, Jun. 2, 1995, USCG Navigation Center, Alexandria, Virginia.

* cited by examiner

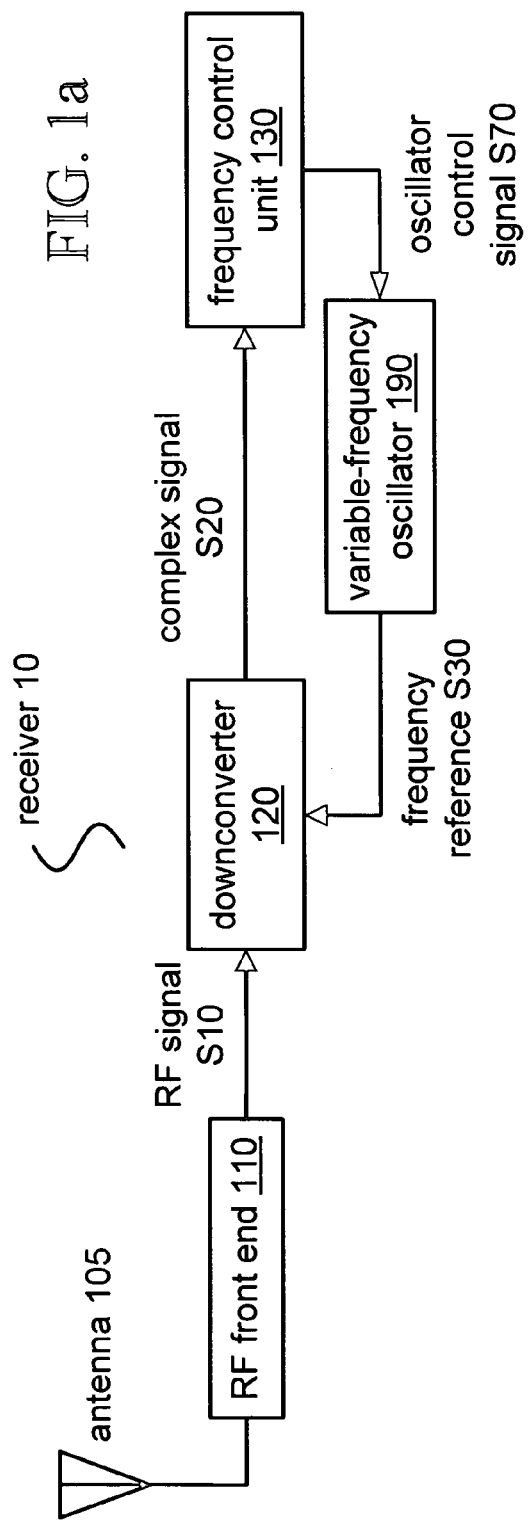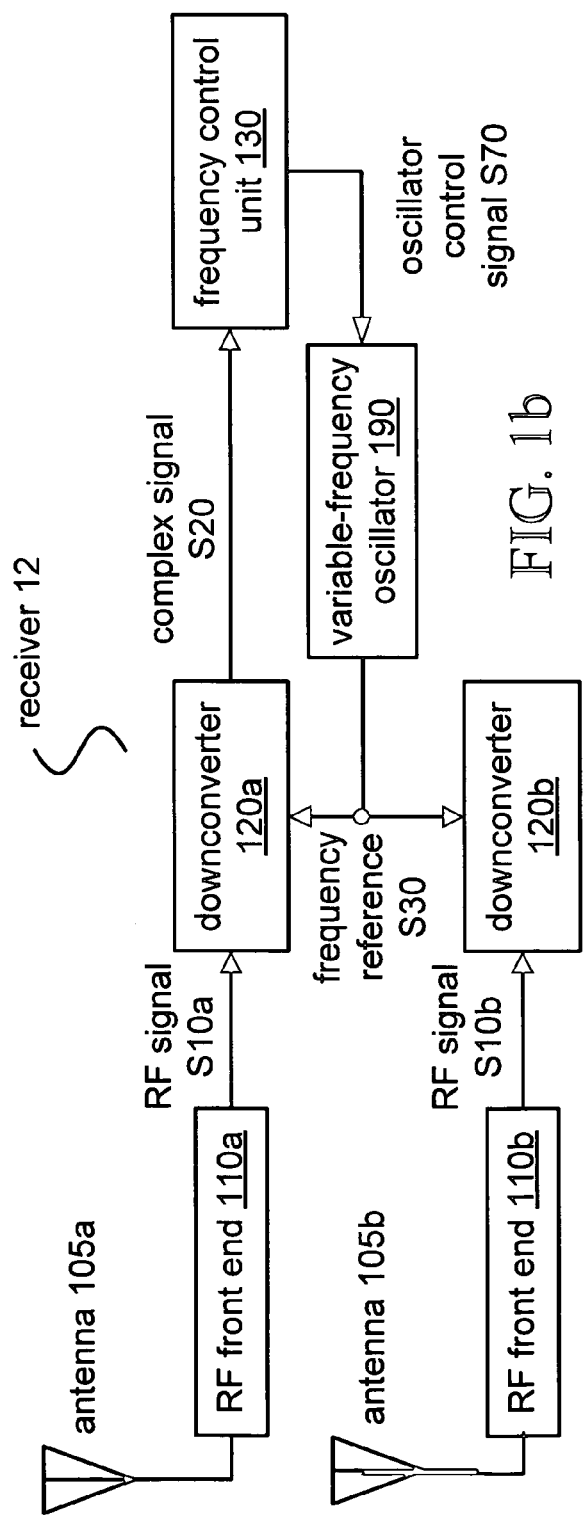

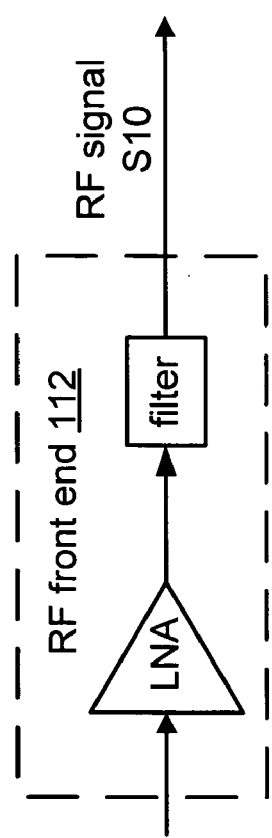
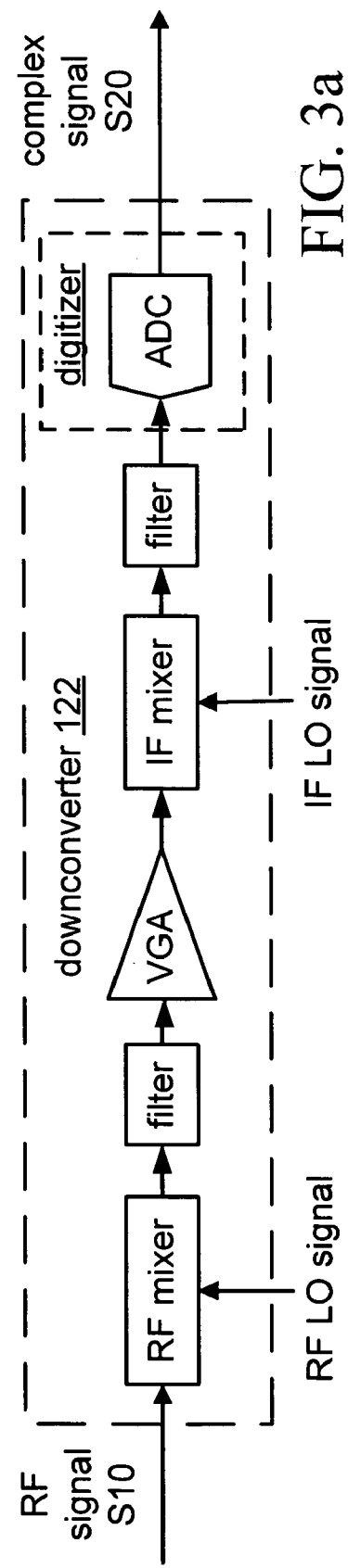

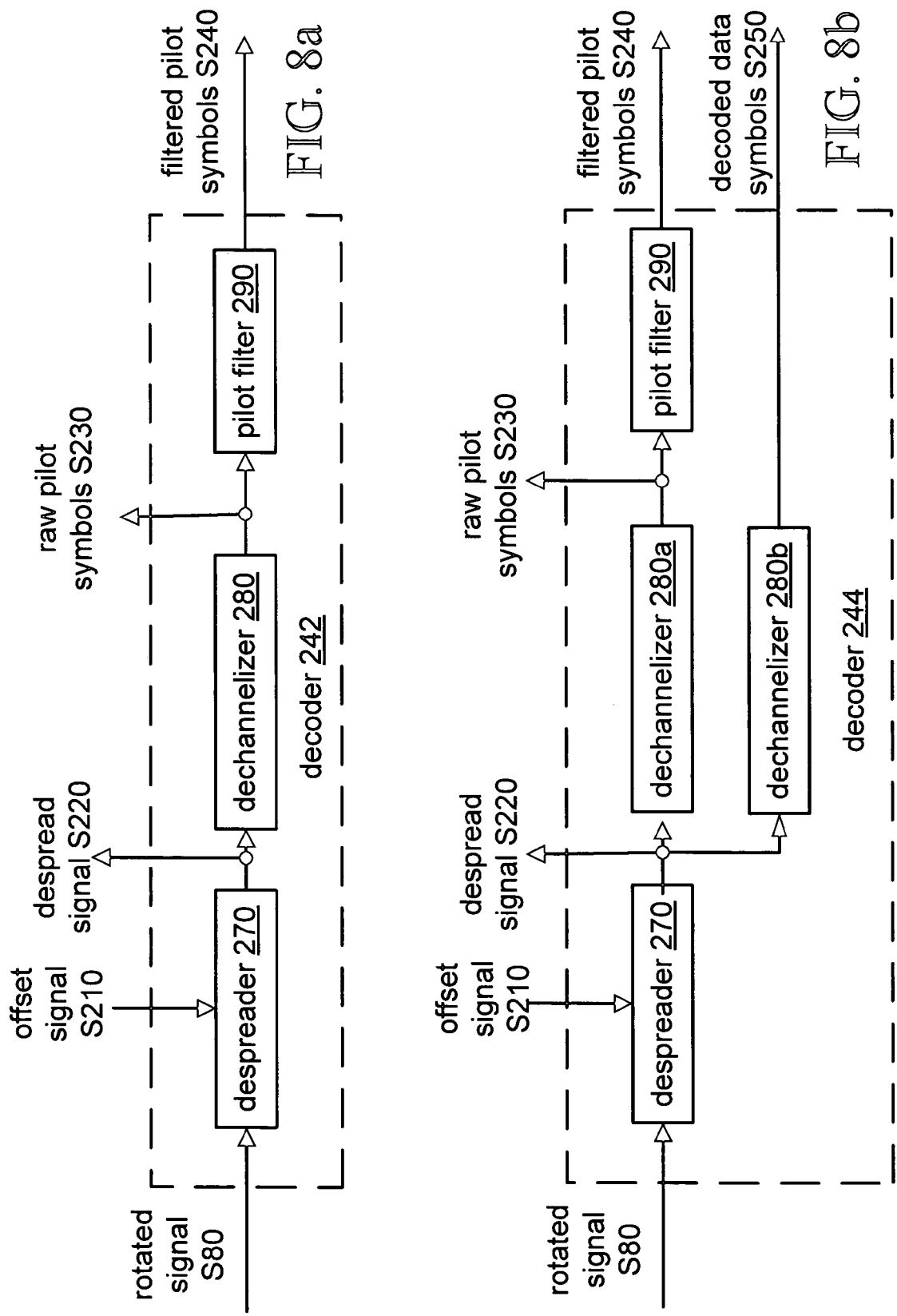

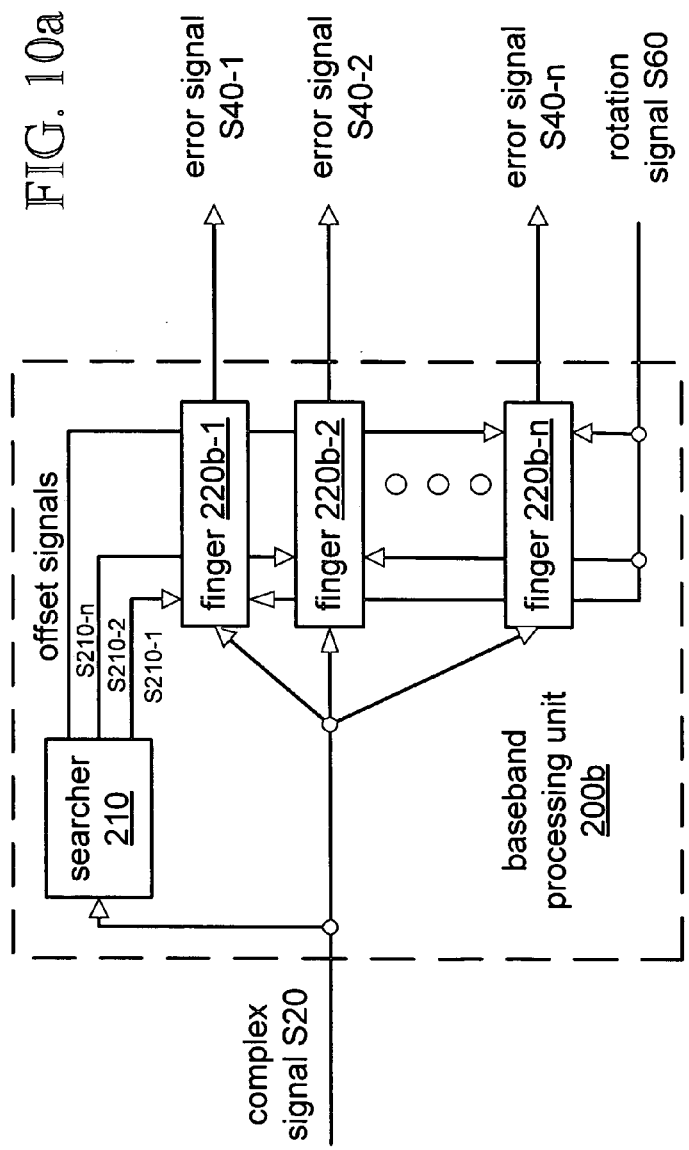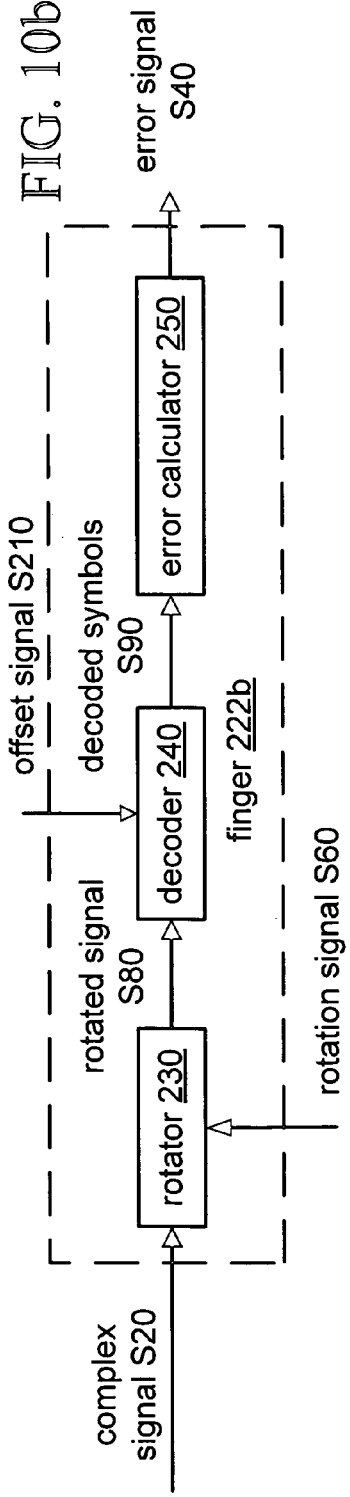

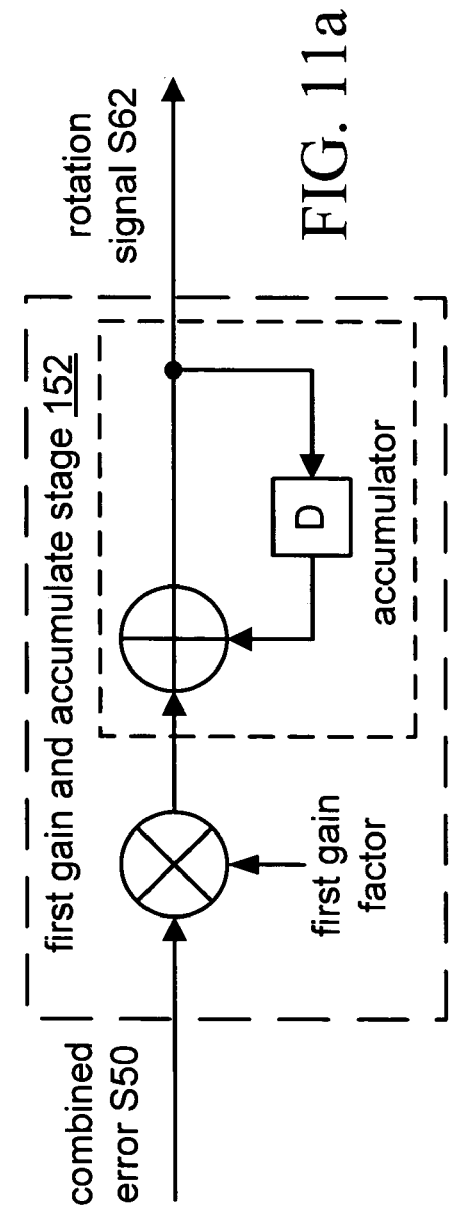
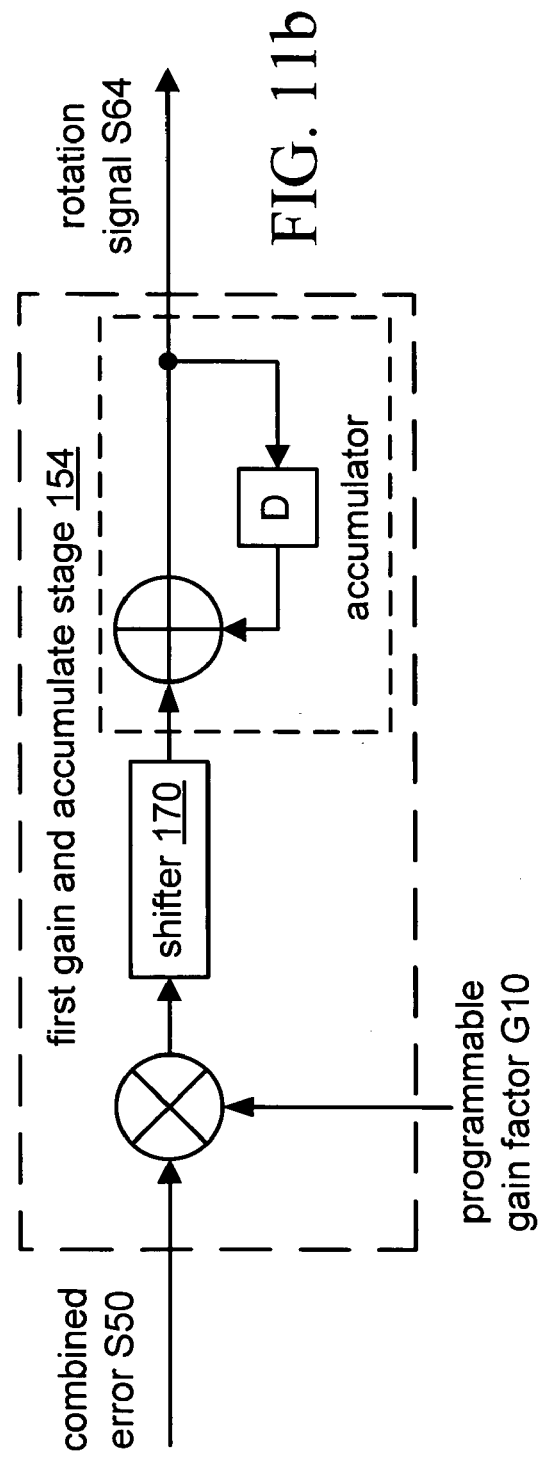
FIG. 11a
FIG. 11b

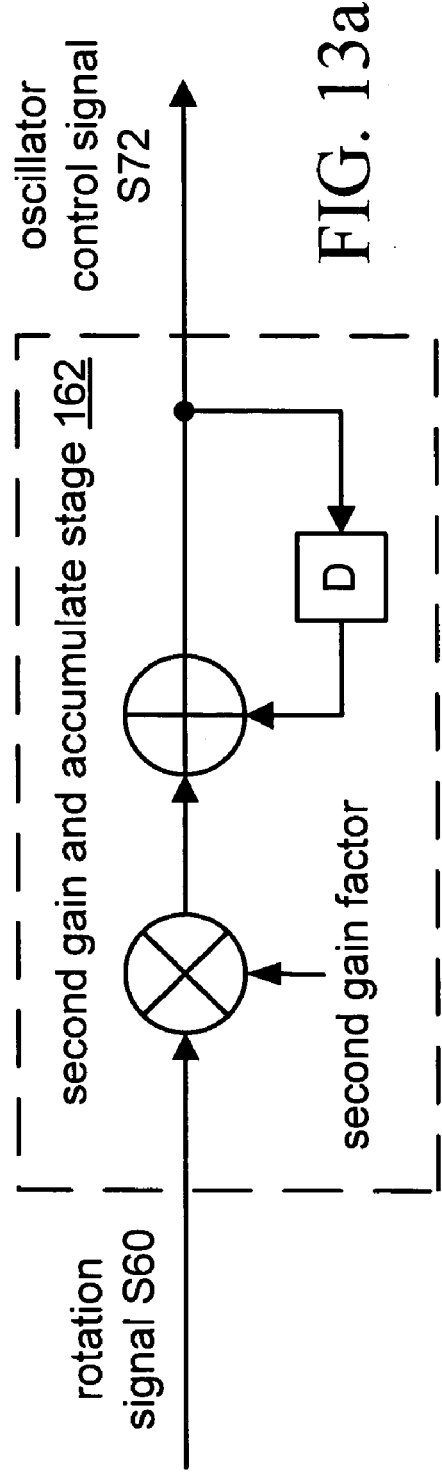
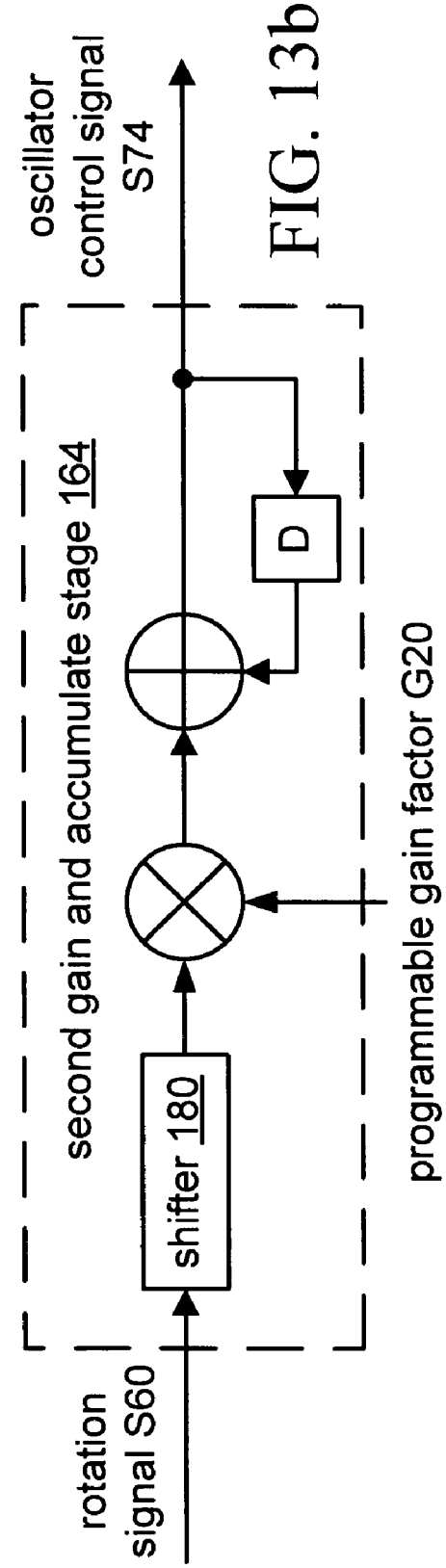

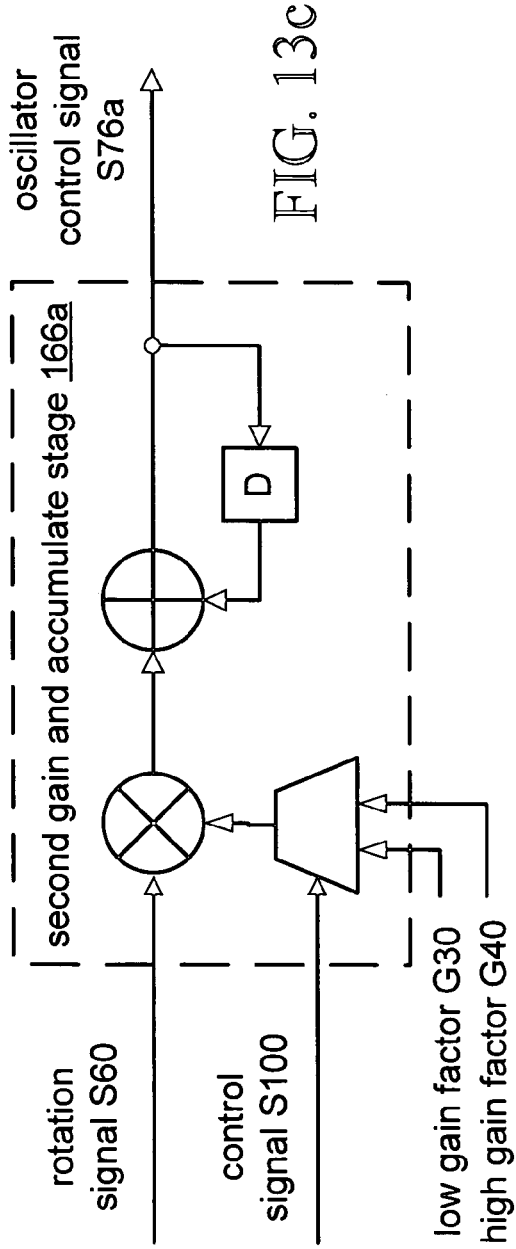
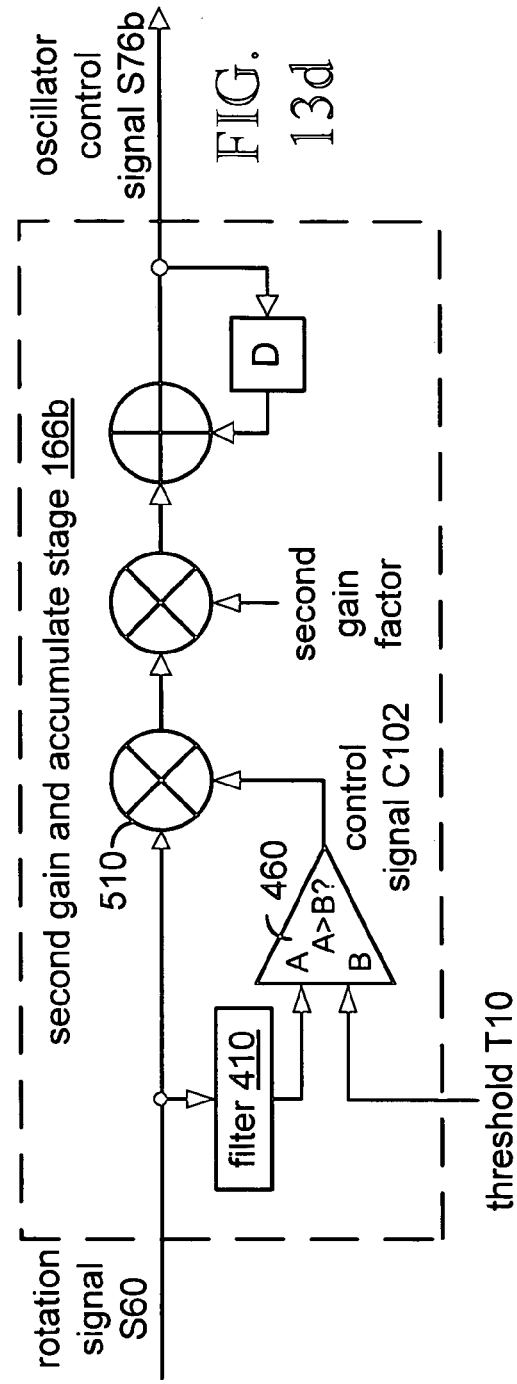

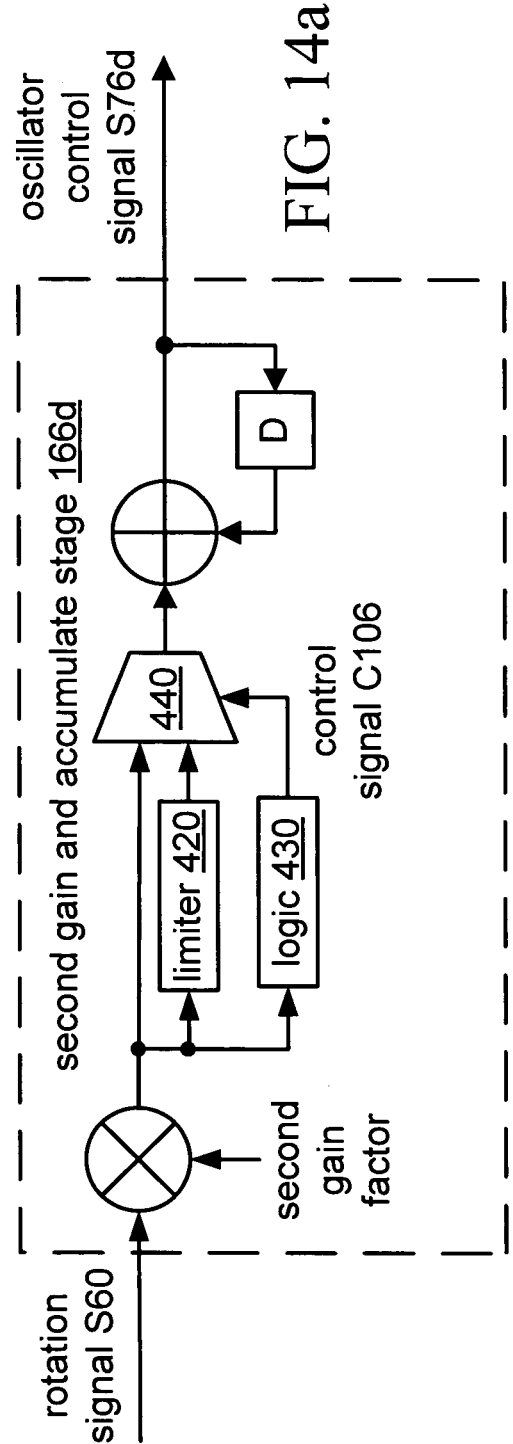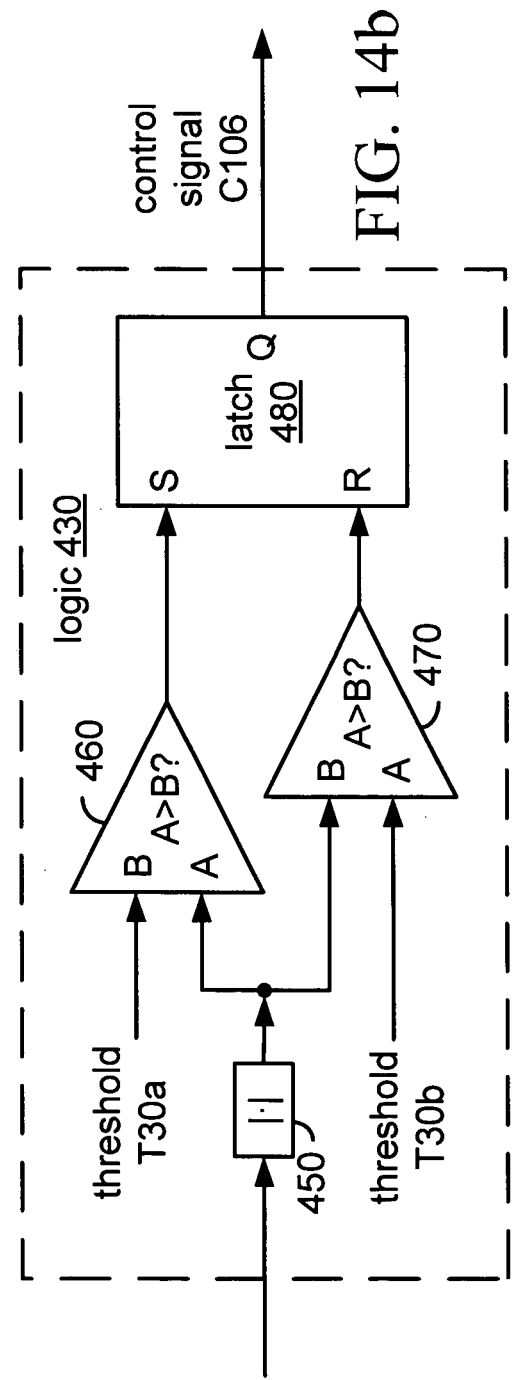

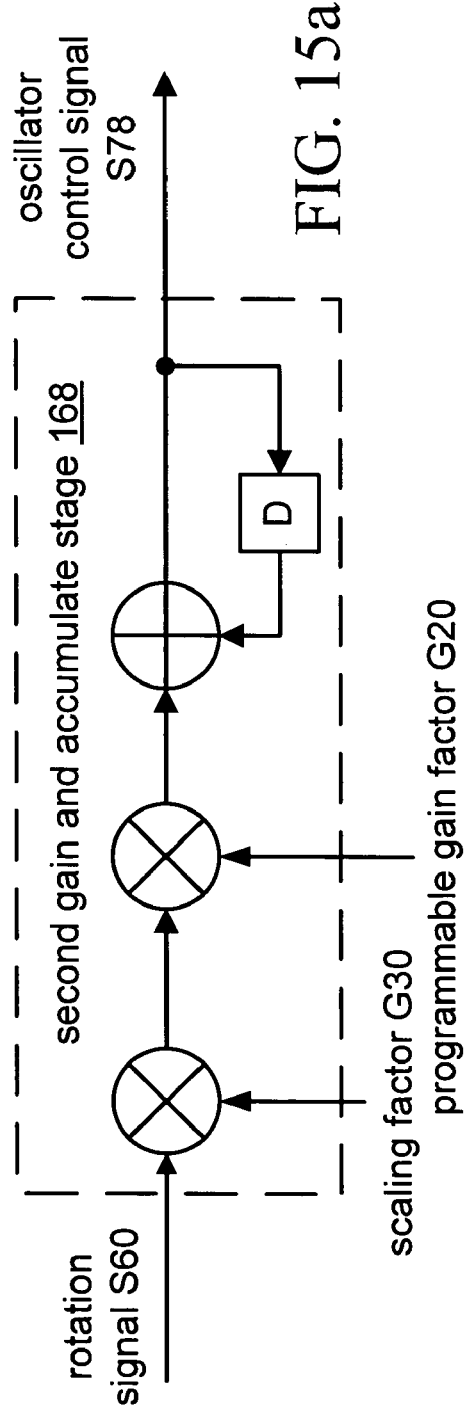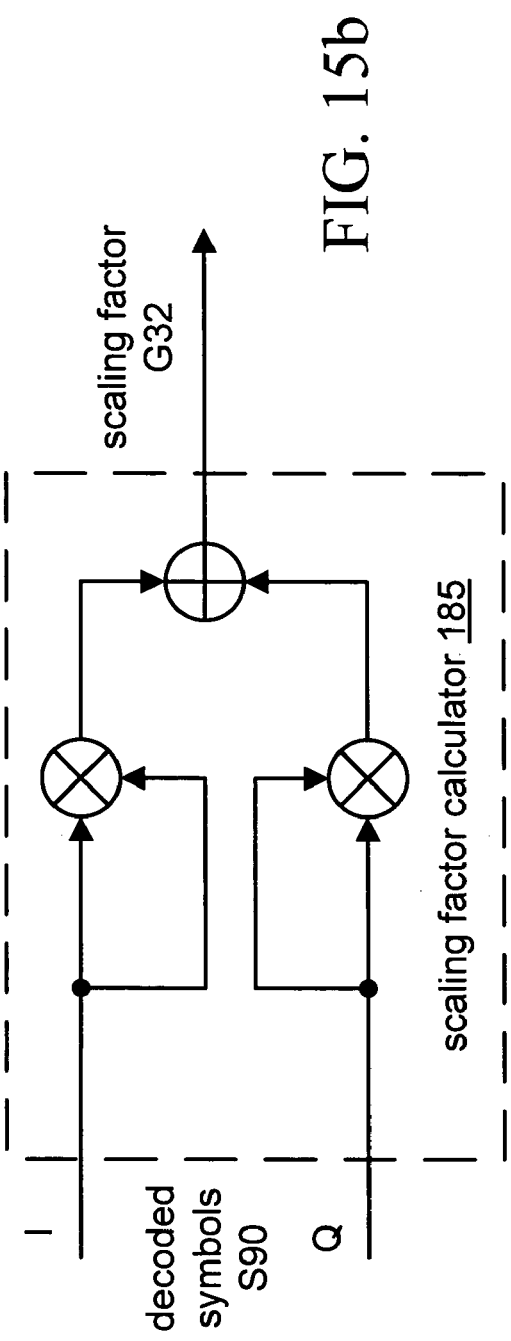

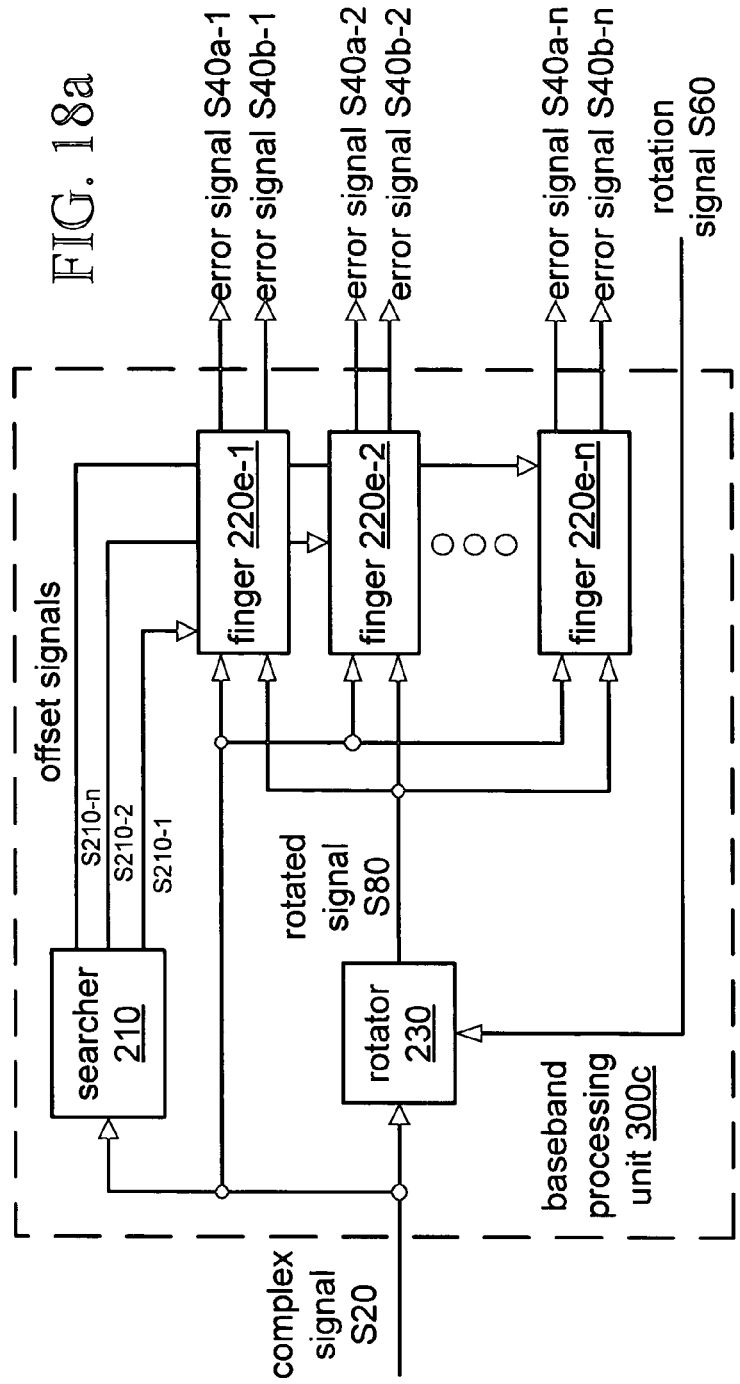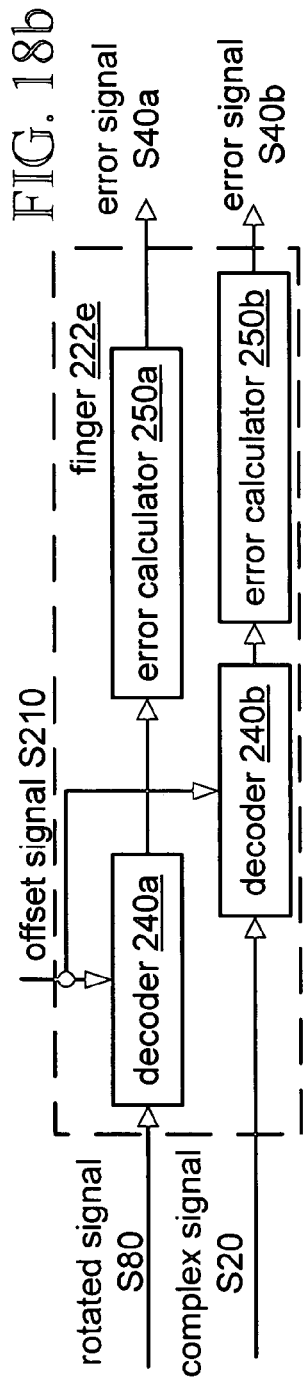

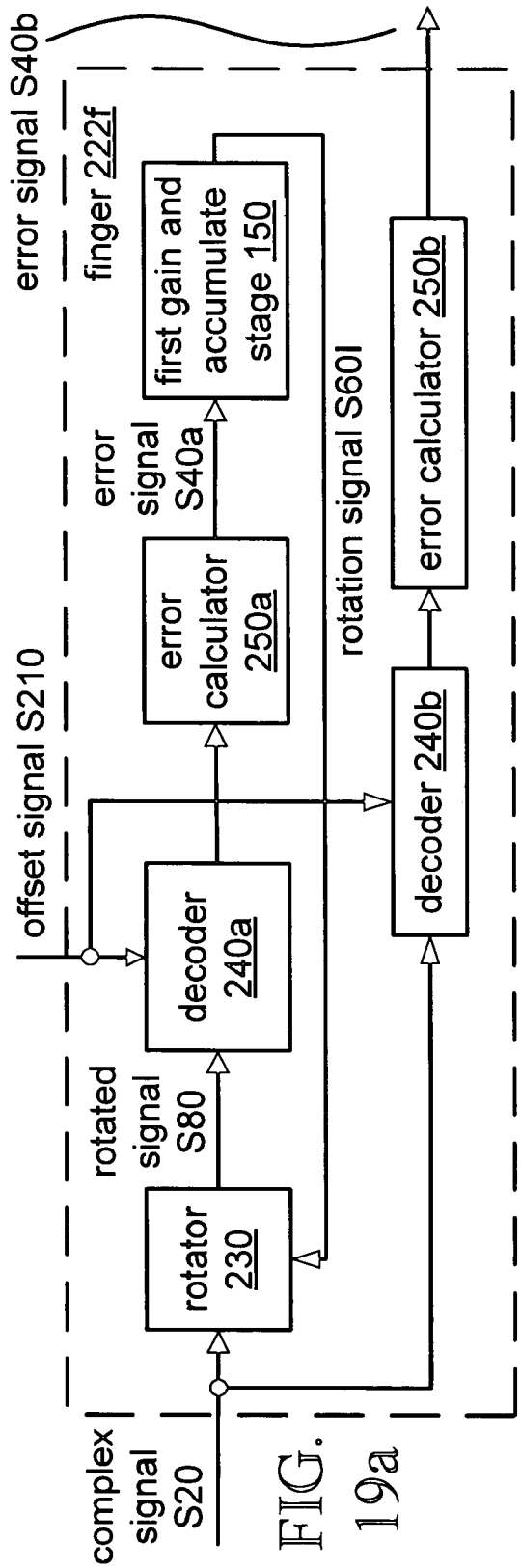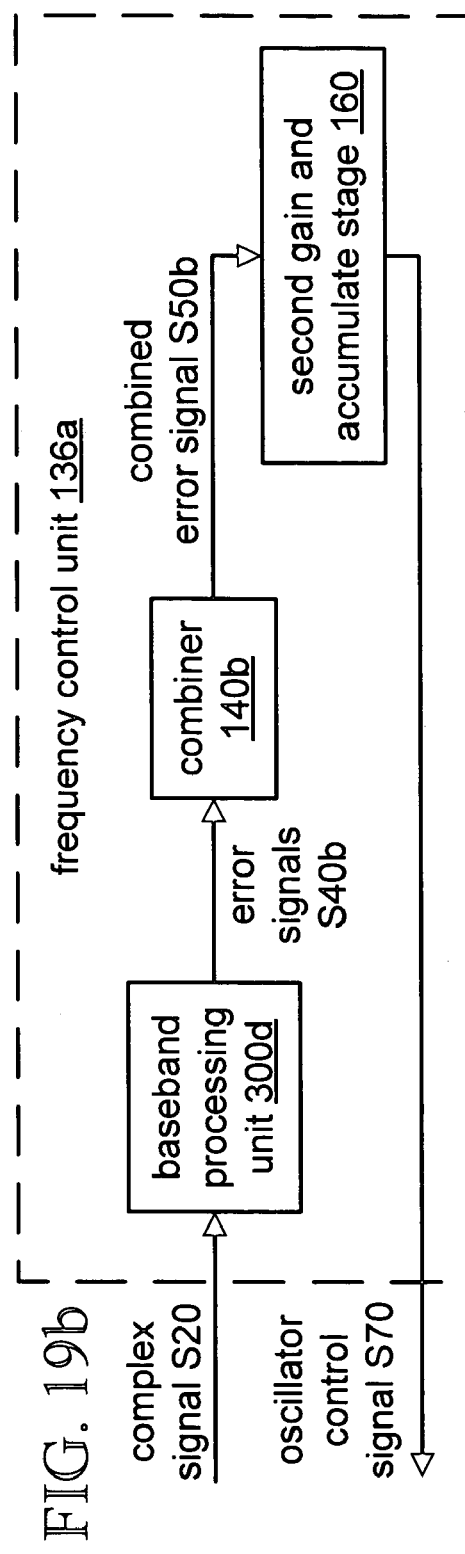
FIG. 19a
FIG. 19b

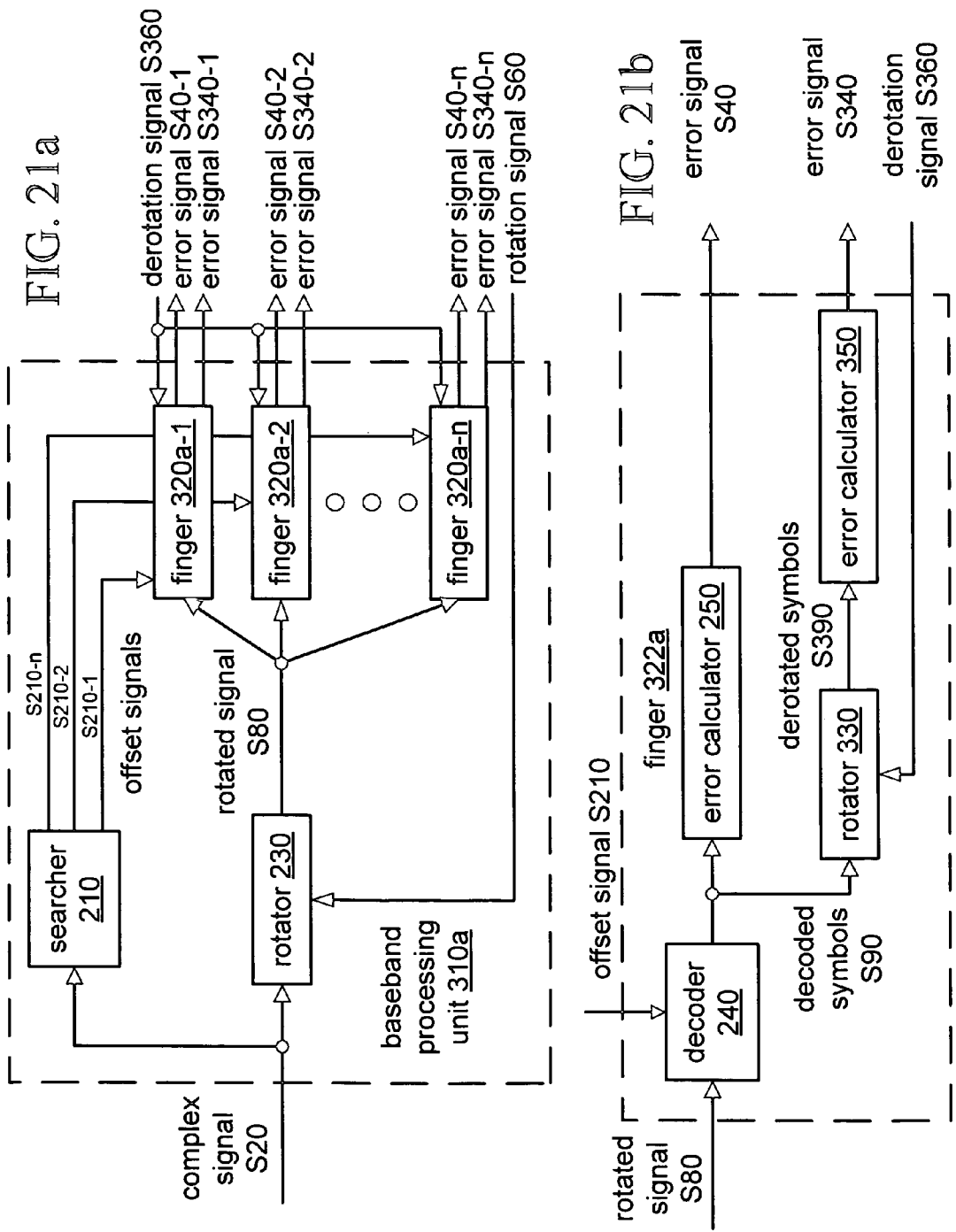

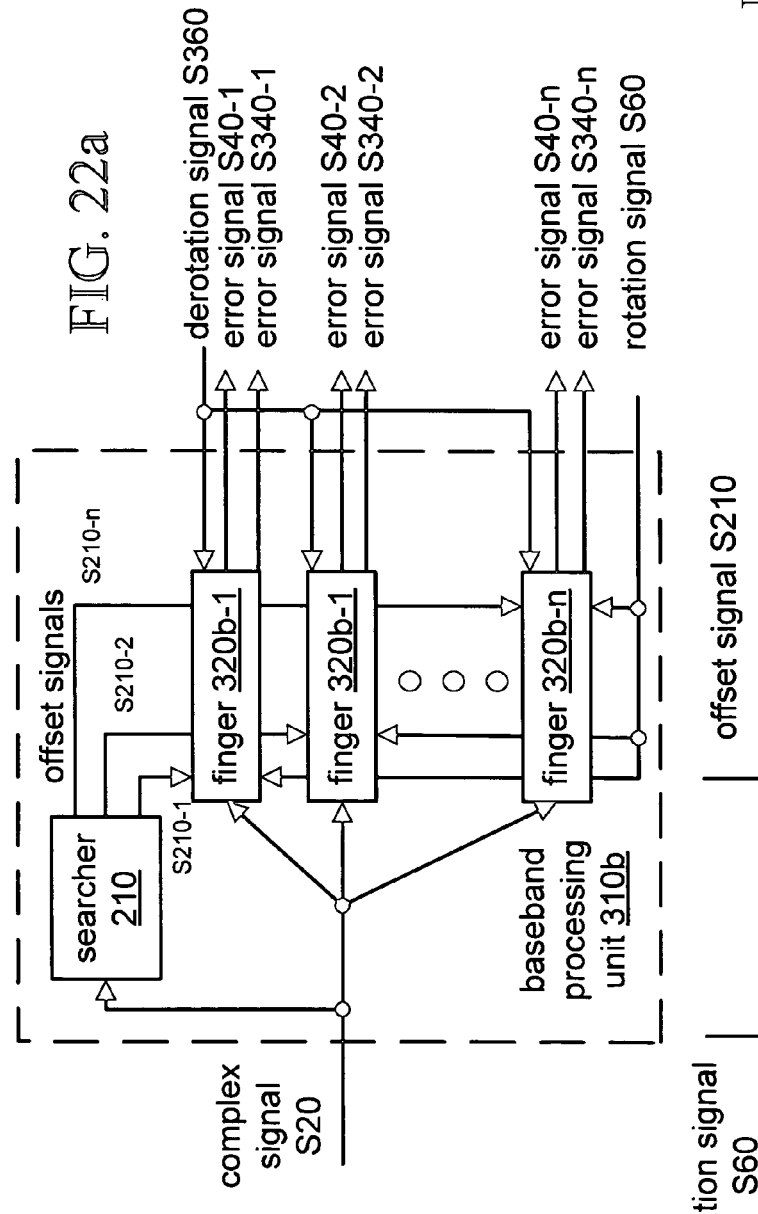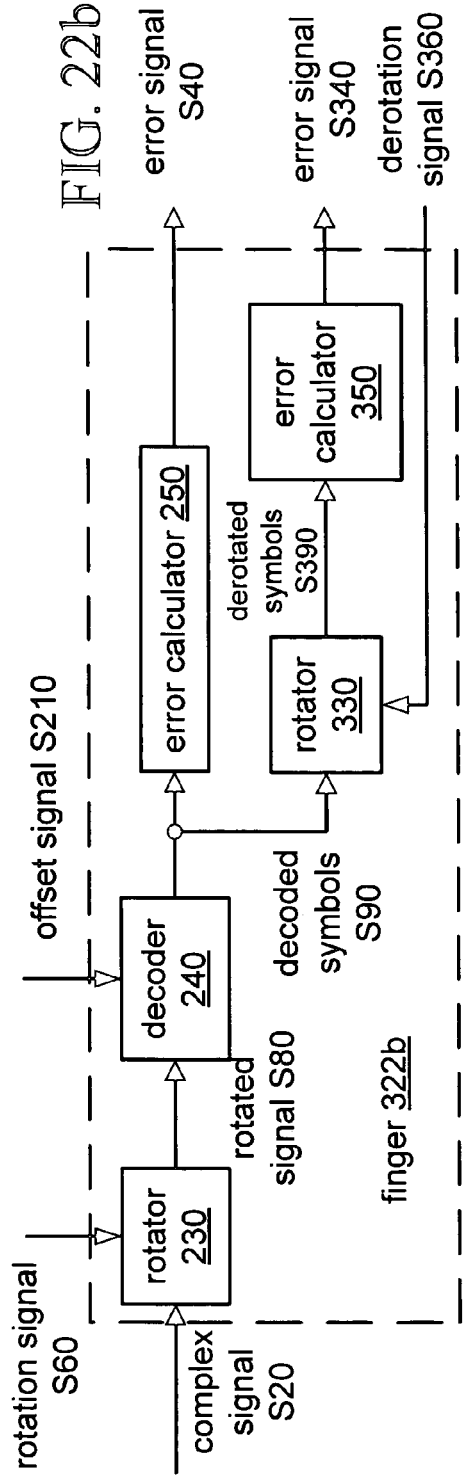

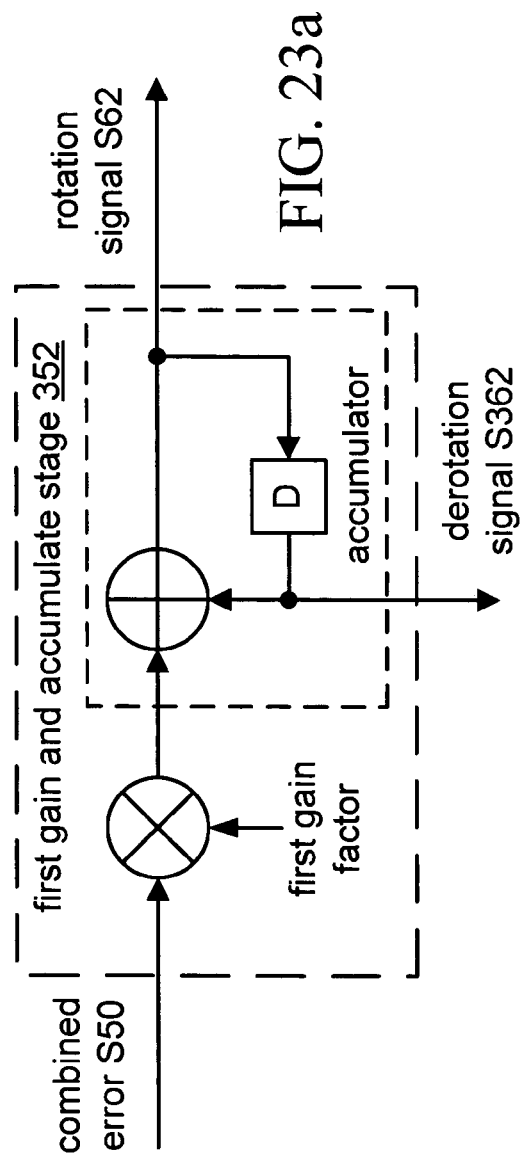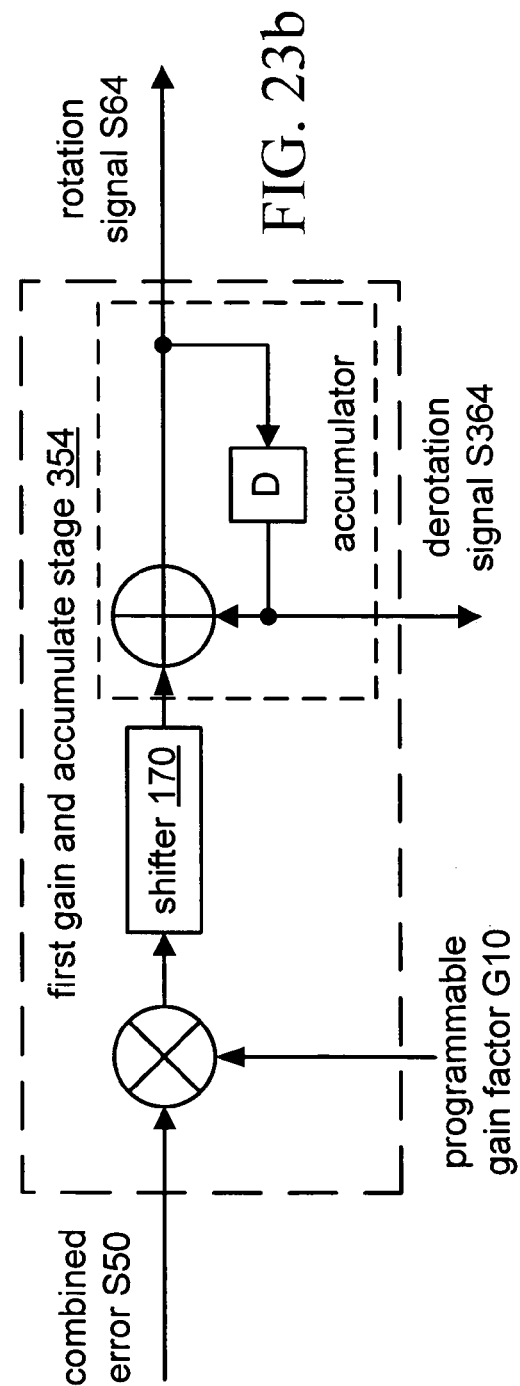

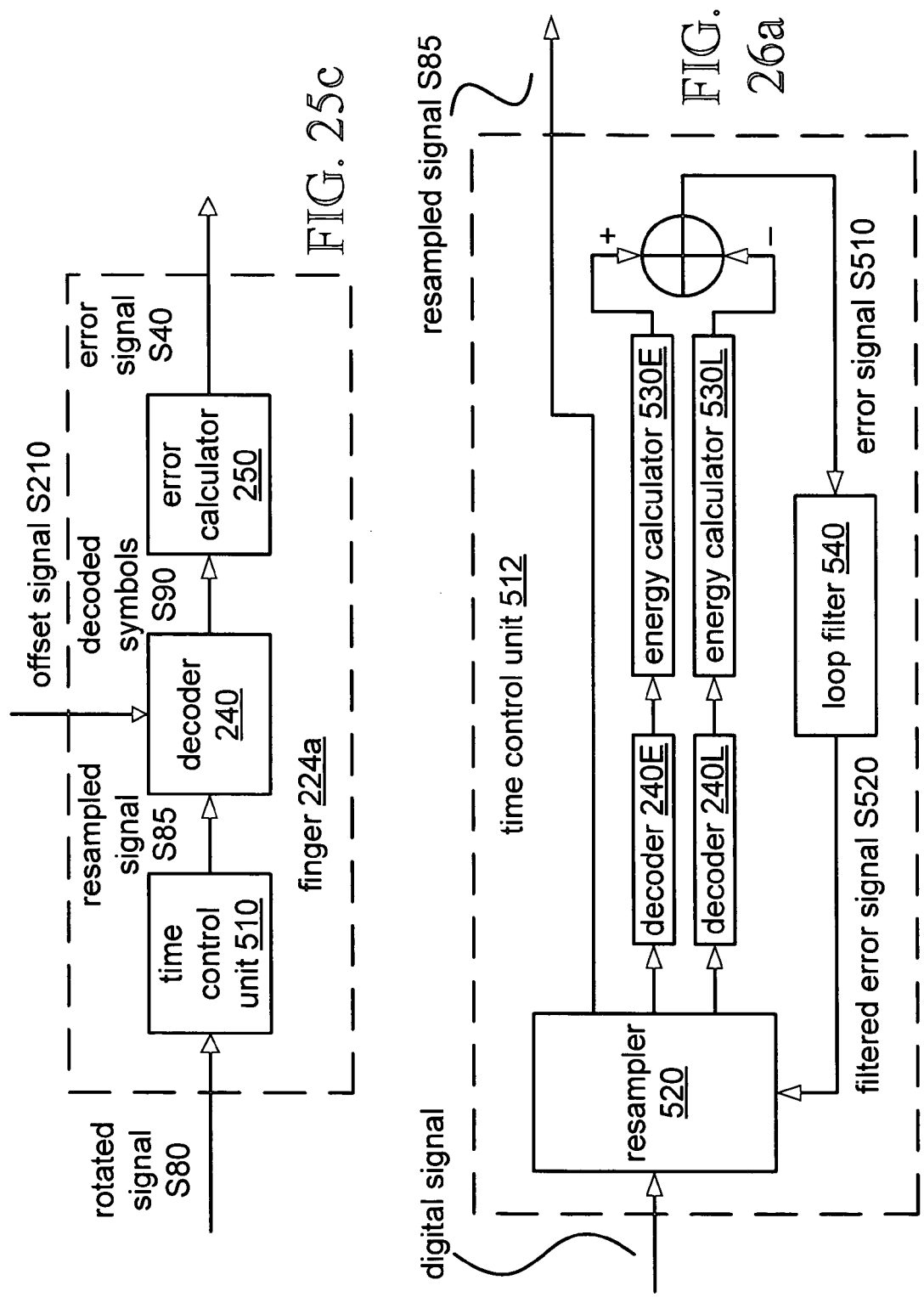

SYSTEMS, METHODS, AND APPARATUS FOR FREQUENCY CONTROL

RELATED APPLICATIONS

This application claims benefit of U.S. Provisional Pat. Appls. Nos. 60/679,783, entitled "SYSTEMS, METHODS, AND APPARATUS FOR FREQUENCY CONTROL," filed May 10, 2005 and 60/762,958, entitled "SYSTEMS, METHODS, AND APPARATUS FOR FREQUENCY CONTROL," filed Jan. 26, 2006.

FIELD OF THE INVENTION

This invention relates to wireless communications.

BACKGROUND

Most systems for the transmission and/or reception of information over wireless channels rely on some form of frequency control. For example, a wireless transmitter typically modulates information onto a radio-frequency carrier signal that is derived from a frequency reference generated locally by an oscillator. In order for a receiver to be able to receive the transmitted signal, it is desirable to keep the frequency of the carrier signal substantially constant, e.g. by controlling the frequency reference.

Oscillators are typically sensitive to temperature. Temperature transients affecting the output frequency of an oscillator may arise from such factors as changes in ambient temperature and local heating from nearby components. It may be desirable to apply some form of frequency control in order to prevent the frequency of the oscillator signal (and thus of the carrier signal) from drifting due to temperature transients.

Similarly, a wireless receiver typically receives a desired carrier signal having information modulated thereon by applying a frequency reference generated locally by an oscillator. In order for the receiver to continue to receive the transmitted signal, it may be desirable to keep a frequency of the frequency reference substantially constant. Like a transmitter, a receiver (which may be integrated with a transmitter, such as in a transceiver) may experience changes in oscillator frequency due to temperature transients. However, a receiver may also need to compensate for Doppler effects in a received signal.

Relative motion between a receiver and a transmission source (and/or apparent motion between the two, as might be caused by a moving reflector) causes a Doppler frequency error at the receiver that can be expressed in Hertz as $vf/c \cos \phi$, where v is the apparent relative velocity of the source with respect to the receiver, f is the carrier frequency in Hertz, c is the speed of light, and $\phi$ is the angle between the direction of travel of the receiver and the direction from the receiver to the transmission source. If the receiver is traveling directly toward the source, then $\phi=0$, and if the receiver is traveling directly away from the source, then $\phi=\pi$ radians. For carrier frequencies in the gigahertz range and relative velocities of up to a few hundred miles per hour, the Doppler error may be as high as hundreds of Hertz, with a Doppler error of tens of Hertz being more typical for cases at lower relative velocities.

It is desirable to achieve frequency control in wireless communications systems that may experience temperature transients and Doppler error.

SUMMARY

An apparatus according to one embodiment includes a frequency control unit comprising a processing unit. The processing unit is configured to receive a stream of samples that includes a plurality of received instances of a transmitted signal, and to output a plurality of frequency errors. Each of the plurality of frequency errors is based on a corresponding one of the plurality of received instances of a transmitted signal. The frequency control unit also comprises a combiner configured to output a combined error based on more than one of the plurality of frequency errors, and a first gain and accumulate stage configured to output a rotation signal based on the stream of samples. Each of the plurality of frequency errors is based on a first state of the rotation signal, and the first gain and accumulate stage is configured to calculate a second state of the rotation signal based on the combined error.

A receiver according to another embodiment comprises an oscillator configured to output a frequency reference having a frequency based on an oscillator control signal. The receiver also includes a first downconverter configured to receive a first local oscillator (LO) signal based on the frequency reference and to produce, according to the first LO signal, a first complex digital signal based on a first radio-frequency (RF) signal having a first carrier frequency. The receiver also includes a frequency control unit configured to calculate the oscillator control signal based on the first complex digital signal. The receiver also includes a second downconverter configured to receive a second LO signal based on the frequency reference and to produce, according to the second LO signal, a second complex digital signal based on a second RF signal having a second carrier frequency different than the first carrier frequency. A receiver according to a further embodiment also includes a processing unit configured to produce a baseband digital signal based on the second complex digital signal and to calculate a physical position of the receiver based on the baseband digital signal.

A receiver according to another embodiment comprises a first downconverter configured to output a first complex digital signal based on a first radio-frequency (RF) signal having a first carrier frequency; and a second downconverter configured to output a second complex digital signal based on a second RF signal having a second carrier frequency different than the first carrier frequency. The receiver also includes a frequency control unit configured to calculate a frequency correction signal based on the first complex digital signal; and a processing unit configured to produce, according to the frequency correction signal, a baseband digital signal based on the second complex digital signal. The baseband digital signal includes a stream of information symbols carried by the second RF signal. In a receiver according to a further embodiment, the processing unit is configured to calculate a physical position of the receiver based on the baseband digital signal.

A receiver according to another embodiment comprises a first downconverter configured to produce a first complex digital signal based on a first radio-frequency (RF) signal having a first carrier frequency; and a first processing unit configured to calculate a timing adjustment signal based on the first complex digital signal. The receiver also includes a clock synthesizer configured to produce a clock signal according to the timing adjustment signal; and at least one among (A) a second downconverter configured to produce, according to the clock signal, a second complex digital signal based on a second RF signal having a second carrier frequency different than the first carrier frequency and (B) an upconverter configured to produce, according to the clock signal, a third RF signal based on a third complex digital signal and having a third carrier frequency different than the first carrier frequency.

A method of frequency control according to another embodiment comprises receiving a stream of samples that includes a plurality of received instances of a transmitted signal, and obtaining a plurality of frequency errors. Each of the plurality of frequency errors is based on (A) a first state of a rotation signal based on the stream of samples and (B) a corresponding one of the plurality of received instances of a transmitted signal. The method also comprises obtaining a combined error based on more than one of the plurality of frequency errors and, based on the combined error, calculating a second state of the rotation signal.

A method of frequency control according to a further embodiment comprising determining a frequency error in a first signal, where the first signal is based on a first radio-frequency signal. The method includes obtaining a first correction signal based on the frequency error and a second correction signal based on the frequency error, where the second correction signal is different than the first correction signal. The method also includes processing the first signal according to the first correction signal and, according to the second correction signal, performing an operation with respect to a second radio-frequency signal, where the operation includes at least one of (A) transmitting the second radio-frequency signal and (B) receiving the second radio-frequency signal.

BRIEF DESCRIPTION OF THE DRAWINGS

Unless stated otherwise in the text, like reference numerals refer to like structures throughout.

FIG. 1a shows a block diagram of a receiver 10 according to an embodiment.

FIG. 1b shows a block diagram of another implementation 12 of receiver 10.

FIG. 2 shows a block diagram of an implementation 112 of RF unit 110.

FIGS. 3a and 3b show block diagrams of embodiments 122 and 124 of downconverter 120.

FIG. 6b shows a block diagram of an implementation 222a of finger 220a.

FIGS. 8a and 8b show block diagrams of implementations 242 and 244 of decoder 240.

FIG. 10a shows a block diagram of an implementation 200b of baseband processing unit 200.

FIG. 10b shows a block diagram of an implementation 222b of finger 220b.

FIGS. 11a and 11b show block diagrams of implementations 152 and 154 of first gain and accumulate stage 150.

FIGS. 13a, 13b, 13c, 13d, and 13e show block diagrams of implementations 162, 164, 166a, 166b, and 166c of second gain and accumulate stage 160.

FIG. 14a shows a block diagram of an implementation 166d of second gain and accumulate stage 160.

FIG. 14b shows a block diagram of slew rate testing logic block 430.

FIG. 15a shows a block diagram of an implementation 168 of second gain and accumulate stage 160.

FIG. 15b shows a block diagram of scaling factor calculator 185.

FIG. 18a shows a block diagram of an implementation 300c of baseband processing unit 300.

FIG. 18b shows a block diagram of an implementation 222e of finger 220e.

FIG. 19a shows a block diagram of an implementation 222f of finger 220c.

FIG. 19b shows a block diagram of an implementation 136a of frequency control unit 136.

FIG. 21a shows a block diagram of an implementation 310a of baseband processing unit 310.

FIG. 21b shows a block diagram of an implementation 322a of finger 320a.

FIG. 22a shows a block diagram of an implementation 310b of baseband processing unit 310.

FIG. 22b shows a block diagram of an implementation 322b of finger 320b.

FIGS. 23a and 23b show block diagrams of implementations 352 and 354 of first gain and accumulate stage 350.

FIG. 25c shows a block diagram of an implementation of finger 222a that includes a time control unit 510.

FIG. 26a shows a block diagram of an implementation 512 of time control unit 510.

DETAILED DESCRIPTION

Figure 3B:
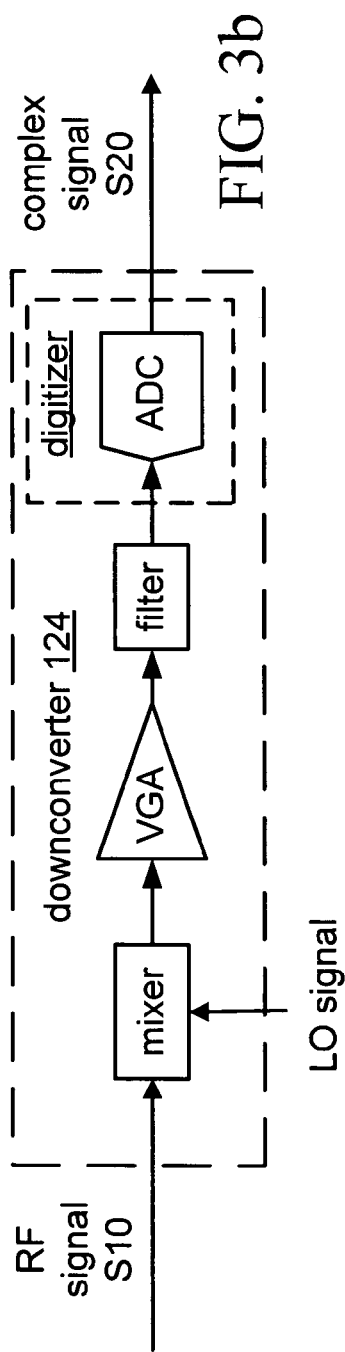

A statement of the form "signal B is derived from signal A" or "signal B is based on signal A" indicates that signal B is identical to signal A, that signal B results from performing various operations on signal A (possibly including combining signal A, or a derivation or portion thereof, with another signal), and/or that signal B results from applying signal A (or a derivation or portion thereof) to another signal.

The term "channel" may indicate one or more of the following, as will be understood from the context: a frequency band for wireless communications, a signal distinguished by a spreading code from other signals in the same frequency band, and a signal distinguished by a covering code (for example, a channelization code) from other signals having the same spreading code.

Embodiments include finger receiving architectures configured to process multipath instances in which a rotation derived from more than one multipath instance (e.g. relating to an average Doppler error) is applied to more than one finger. Further embodiments include architectures configured to control an oscillator, where such control is based upon more than one multipath instance in a received signal, and where the oscillator provides a frequency reference used to receive and/or transmit another signal.

A wireless communications device, such as a receiver or transceiver, may include an oscillator that supports more than one RF chain. For example, the oscillator may provide a frequency reference to two separate receive chains and/or to a receive chain and a transmit chain. A frequency of the oscillator may be controlled based on a signal received via one of the two chains. However, a problem may arise when that received signal includes a frequency error that is not present in the other chain.

A receiver according to an embodiment may be configured to receive signals from one or more of a system of positioning satellites, such as the NAVSTAR Global Positioning System (GPS) (as described in, e.g., Global Positioning Service Signal Specification, $2^{nd}$ ed., 1995, USCG Navigation Center, Alexandria, Va.), the GLONASS GPS maintained by the Russian Republic, and/or the GALILEO system proposed in Europe. The NAVSTAR GPS includes a set of satellites or "space vehicles" (SVs) that transmit navigation messages at a data rate of 50 bits per second via a direct sequence spread spectrum (DSSS) signal that is BPSK (binary phase-shift-keying) modulated onto a carrier at 1.57542 GHz (also called the L1 frequency). To spread the signal, each SV uses a different one of a set of pseudo-random noise (PN) codes (also called coarse acquisition or C/A codes) that have a chip rate of 1.023 MHz and a length of 1023 chips. The SVs may also transmit messages via a 10.23 MHz code modulated onto a carrier at 1.22760 GHz (also called the L2 frequency). GPS signals are commonly used by terrestrial receivers to support position location operations. Typically, signals from at least four SVs are needed to resolve a position in three dimensions.

GPS receivers are typically very sensitive to frequency variations. Such variations may arise from changes in the local oscillator frequency caused by e.g. temperature transients and/or low-frequency phase noise. On the other hand, GPS receivers are less likely to experience significant Doppler error due to receiver motion, as such motion is generally largely perpendicular to the direction between receiver and source, and as the apparent velocity of the satellites in their orbits (on the order of kilometers per second) is typically much greater than the expected velocity of the receiver.

While many oscillators typically include some form of temperature compensation, the cost and/or size of an oscillator may increase with the accuracy of its temperature compensation. Thus, it may be desirable to obtain a receiver design that is more tolerant of variations between oscillators and/or specifications of individual oscillators. Such a design may include a frequency tracking loop that reduces errors by applying a control signal to affect the frequency of the oscillator. In a GPS receiver, such a control signal may be derived from, e.g., phase variations detected among consecutive symbols in the received signal.

A receiver according to an embodiment may be configured to receive and/or transmit information (e.g. voice and/or data) over a network for wireless communications. Such a receiver may be configured to receive and/or transmit information via one or more channels in a code-division-multiple-access (CDMA) system. For example, such a receiver may perform some or all of the functions of a subscriber unit, access terminal (AT), base transceiver station (BTS), and/or user equipment (UE) according to at least a portion of one or more of the following standards or formats as promulgated by TIA, EIA, 3GPP, 3GPP2, CWTS (China), ARIB (Japan), TTC (Japan), TTA (Korea), ITU, and/or ETSI (Europe): CDMA, TD-SCDMA, W-CDMA (e.g. 3G TS 25.211/2/3/4), UMTS, IS-95-A/B/C (cdmaOne), IS-98, IS-835-A (cdma2000), IS-856 (cdma2000 HDR), IS-2000.1-A and other documents of the IS-2000 series (cdma2000), IS-707-A (data services), cdma2000 1xEV, cdma2000 1x EV-DO, cdma2000 1x EV-DV (also called 1x-EV phase 2), cdma2000 3x, 3GPP2 cdma2000 (e.g. TR-45.5, C.S0005-A, C.S0024), and IMT-2000. Such a receiver or transceiver may be configured to communicate over bands at or near, e.g., 800 MHz, 1800 MHz, and/or 1900 MHz. Such a receiver or transceiver may be configured to communicate via, for example, an M-ary form of phase-shift keying (PSK) such as binary PSK (BPSK), quadrature PSK (QPSK), offset QPSK (OQPSK), quadrature amplitude modulation (QAM), minimum-shift keying (MSK), or Gaussian MSK (GMSK). Other examples include a receiver configured to receive a UBM (Universal Broadcast Media) signal or a MediaFLO (Forward Link Only) signal.

A receiver of a CDMA signal may also be affected by changes in the local oscillator frequency. However, such receivers are also likely to experience Doppler frequency errors caused by relative motion between receiver and source. It is desirable for such a receiver to include a frequency tracking loop to account for such errors by, e.g., by applying a control signal to affect the frequency of the oscillator. A Doppler error experienced in a CDMA signal typically will not be present in a GPS signal received by the same receiver, however, so applying such an error to control an oscillator that also provides a reference to a GPS receive chain could add noise to the GPS chain.

One option would be to disable adjustment of the oscillator's frequency during GPS operation: for example, by temporarily preventing a frequency control signal from changing the oscillator frequency, while possibly allowing a temperature compensation circuit of the oscillator to continue to operate. However, this option could allow oscillator variations due to uncompensated temperature transients (e.g. transients that are beyond the correction capacity of the oscillator's temperature compensation circuit) to affect performance of the GPS receive chain. Another option would be to use an oscillator having better temperature compensation, but such an oscillator could be more expensive and/or larger. A further option would be to use separate oscillators for the CDMA and GPS chains, with obvious effects on cost and size. Embodiments as described herein may be applied to allow a solution using one oscillator.

FIG. 1a shows a block diagram of a receiver 10 according to an embodiment. Radio-frequency (RF) front end 110 receives a signal via an antenna 105 and outputs a corresponding RF signal S10 to a downconverter 120. Downconverter 120 converts RF signal S10 down to a complex signal S20 at or near baseband according to a signal based on a frequency reference S30. Frequency control unit 130 produces an oscillator control signal S70 based on complex signal S20. Variable-frequency oscillator 190 produces the frequency reference S30 according to a signal based on oscillator control signal S70.

Receiver 10 may be an independent unit (possibly including other elements for e.g. power management, user interface support, further processing of information carried by complex signal S20, etc.) or a portion of a device or system that also includes other circuits and/or functionalities. For example, receiver 10 may be included in a transceiver that also includes a transmitter, e.g. an access terminal such as a cellular telephone (configured to communicate with a system including a network of base stations and including e.g. a microphone, speaker, keypad, and associated circuits and processing) and/or a wireless modem (configured to support data transfer between a wireless channel and e.g. a PCMCIA or USB port). Such a transceiver may communicate with one or more processors for configuring operations in the device, processing signals within the device, and/or controlling a user interface of the device that may include input devices (e.g. a microphone, a keyboard or keypad) and/or output devices (e.g. a speaker or audio output jack, a display screen).

Such a receiver or transmitter may also be included in a device that supports further functionalities, e.g. including a media player (configured to decode audio information encoded into such compression formats as MP3, WMA, AAC3, and the like and/or video information encoded into such compression formats such as MPEG-2, MPEG-4, WMV, and the like), a personal digital assistant (PDA), a portable computer, etc. Such further functionalities may be integrated with the operations of the receiver and/or transmitter: for example, playback of multimedia information received via the receiver; communication between applications executing locally (e.g. an e-mail client) and an external server via the wireless modem; synchronization of local and external schedules, contacts, or other databases via the wireless modem.

Receiver 10 may also include more than one receive path. For example, FIG. 1b shows a block diagram of an implementation 12 of receiver 10 that includes two instances 110a, 110b of RF front end 110 and two instances 120a, 120b of downconverter 120. The two paths in this example may be configured to receive different analog and/or digital signals, possibly simultaneously. For example, one path may receive a CDMA signal (e.g. from a base station), while the other path receives a GPS signal (e.g. from an SV). Other implementations of receiver 10 may include separate receive paths that share a common antenna. Similarly, some implementations of receiver 10 may share some or all of an RF front end (e.g. having a common LNA but different respective filters to pass different bands).

An RF front end, which typically serves to amplify and/or condition the received signal, may include one or more amplifiers (e.g. a low-noise amplifier or LNA) and/or filters (e.g. to attenuate particular frequencies or bands). The RF path may also include such elements as a diplexer (or multiplexer) to separate different frequency bands within an antenna feed and/or a duplexer to support receive and transmit activity over the same antenna. FIG. 2 shows an implementation 112 of RF front end 110 that includes an LNA and a filter (e.g. an LC, ceramic, or surface acoustic wave (SAW) filter). Receiver 10 may be implemented to include more than one RF front end and/or may be configured such that an RF front end supplies more than one downconverter.

Downconverter 120 receives RF signal 10 and outputs a complex signal S20 at or near baseband. FIG. 3a shows a block diagram of one example 122 of a heterodyne implementation of downconverter 120. An RF mixer applies an RF local oscillator signal to convert RF signal S10 to an intermediate frequency (IF), e.g. on the order of 10 MHz. The IF signal is processed in an IF stage, which in this example includes a filter (e.g. to attenuate one or more images) and a variable-gain amplifier (VGA). An IF mixer applies an IF local oscillator signal to convert the IF signal to baseband. The baseband signal may be filtered (e.g. to attenuate one or more images).

A digitizer including an analog-to-digital converter (ADC) converts the baseband signal from analog to a digital stream of samples. In cases where the received signal is modulated by digital information (via, e.g., PSK, QAM, MSK, and/or OOK modulation) at a particular rate (e.g. a chip rate), the ADC may oversample the baseband signal (at a rate of e.g. chip×2, chip×4, chip×8, or chip×16). The ADC may also be configured to include two ADCs executing in parallel (e.g. each one receiving and digitizing a different respective component of a complex signal path of the downconverter). A digitizer may also include one or more resamplers as described herein to interpolate or decimate (e.g. according to a timing adjustment signal) a digital stream as produced by a respective ADC.

FIG. 3b shows a block diagram of an example 124 of a homodyne (or zero-IF) implementation of downconverter 120. In zero-IF conversion (also called direct downconversion), the RF signal is converted directly to baseband. Such a downconverter typically also includes circuitry for the removal or compensation of a DC offset in the baseband signal. Such a downconverter may also include amplitude control of the local oscillator signal (e.g. to reduce leakage). In a related technique called near-zero IF (or very low IF or VLIF) conversion, the RF signal is converted directly to a near-baseband frequency that may be hundreds of kHz or lower. A VLIF downconverter may be implemented with an IF stage or without one (e.g. with the conversion from IF to baseband being performed by rotation of the complex signal S20).

Figure 3C:
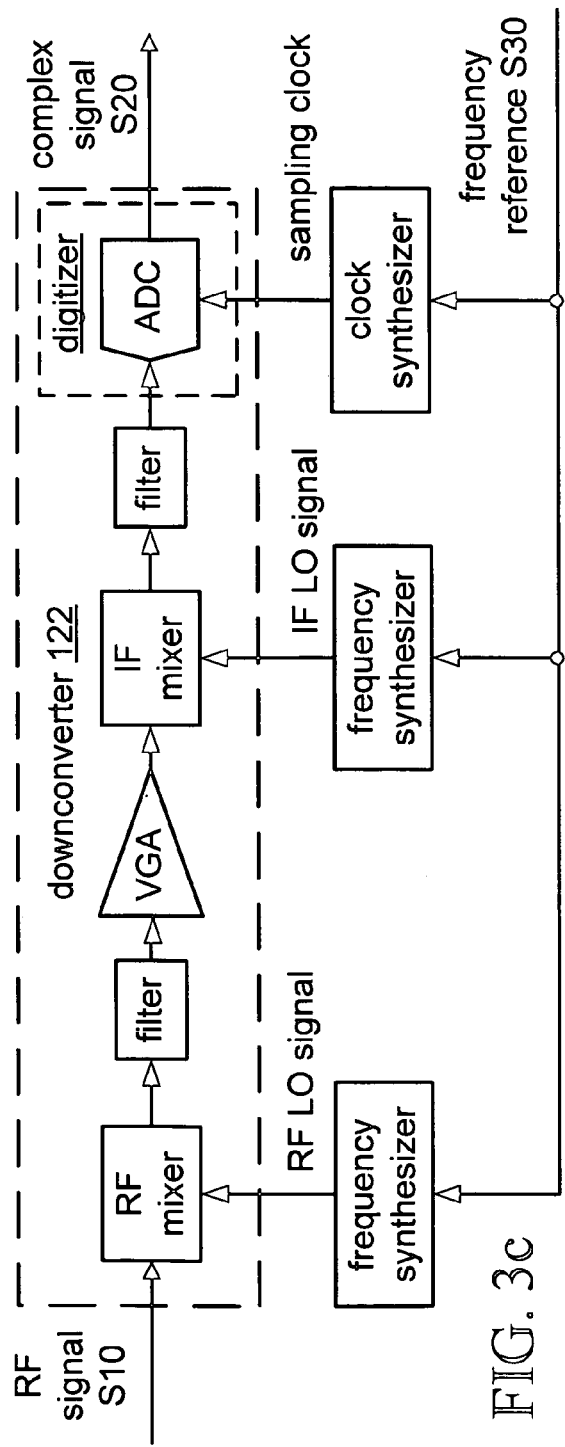
FIGS. 3c and 3d show block diagrams of arrangements including downconverters 122 and 124, respectively.

Frequency reference S30, or a signal based on frequency reference S30, may be used as a local oscillator signal in downconverter 120. A sampling clock of one or more ADCs may also be derived from frequency reference S30, such that frequency reference S30 may also serve as a time reference. FIG. 3c shows a block diagram of an arrangement in which downconverter 122 receives the RF and IF local oscillator signals from respective frequency synthesizers that are driven by frequency reference S30.

Figure 3D:
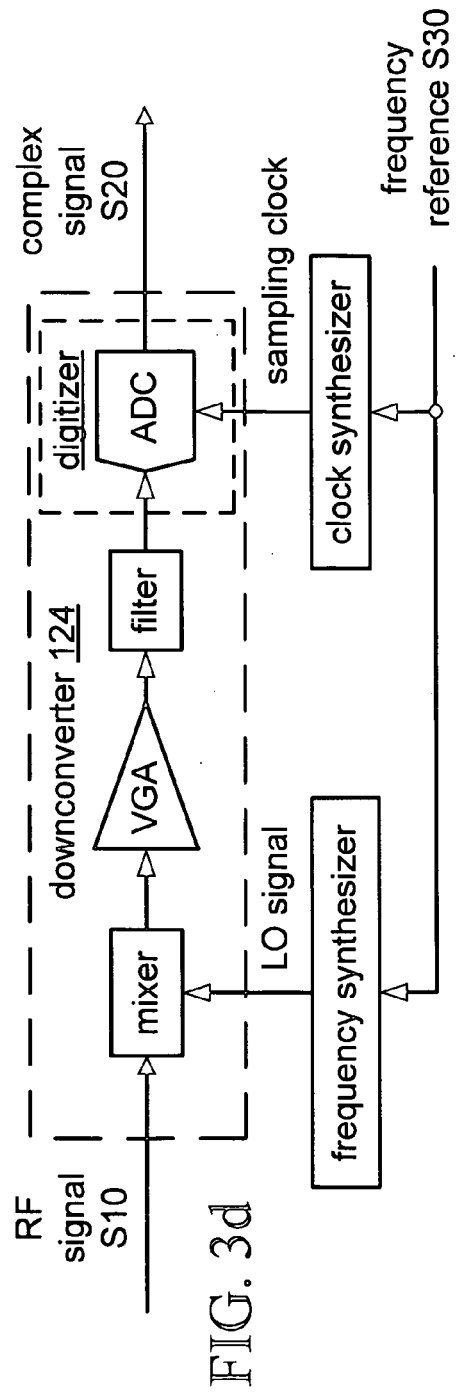

A frequency synthesizer, which may be implemented as a phase-locked loop (PLL), is typically configured to multiply or divide the frequency of the input signal by a desired fixed or programmable value (for example, an integer value). A frequency synthesizer may also be implemented as an M/N or M/N:D counter (e.g., as described in U.S. Pat. No. 6,449,329 to Halter or U.S. Publ. Pat. Appl. No. 2004/0263221 to Severson). In the example of FIG. 3c, the ADC receives a sampling clock signal from a clock synthesizer (e.g. a frequency synthesizer) that is also driven by frequency reference S30. FIG. 3d shows a block diagram of a similar arrangement in which downconverter 124 receives the local oscillator and sampling clock signals from a frequency synthesizer and a clock synthesizer, respectively, that are driven by frequency reference S30. It will be understood that a signal path of frequency reference S30 to a downconverter 120 (as shown, for example, in FIGS. 1a and 1b and other figures herein) may include one or more such frequency and/or clock synthesizers.

Another implementation of receiver 10 is a transceiver including an upconverter that has one or more digital-to-analog converters, mixers, and amplifiers (which may be similar to those described in the downconverters) and that receives one or more local oscillator and/or clock signals based on frequency reference S30. This upconverter produces an RF signal (for communication over a CDMA or other system as mentioned above) that is transmitted via an RF front end and antenna.

Variable-frequency oscillator (VFO) 190 outputs a frequency reference S30 according to an oscillator control signal S70. Frequency reference S30 is a periodic signal having a fundamental frequency that may be implemented to have any waveform suitable for the particular application (e.g. sinusoidal, square, triangular, sawtooth, etc.). Any tunable oscillator, using any technique known or yet to be developed, can be deployed as VFO 130. Typically, VFO 130 is implemented as a crystal oscillator (or XO), which may include an AT-cut crystal (for frequency stability over temperature) of a material such as quartz. VFO 130 may include a buffer to isolate the oscillator output from its load.

The frequency of an oscillator may be affected by changes in temperature. Temperature transients may occur during operation of a device, for example, as components heat up. In a compact transceiver such as a cellular telephone, the power amplifier of a transmitter is typically a primary source of temperature transients that may affect nearby components.

Figure 4:
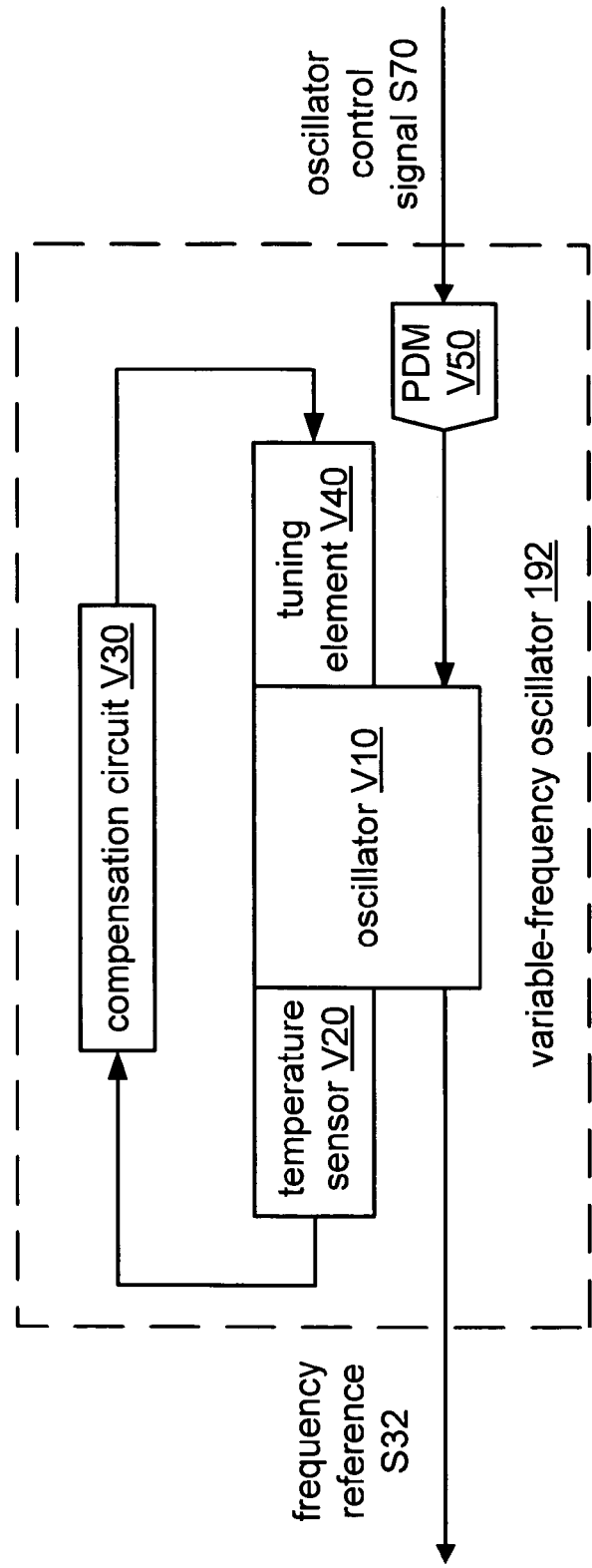
FIG. 4 shows a block diagram of an implementation 192 of variable-frequency oscillator 190.

It may be desirable to implement VFO 190 as a temperature-compensated oscillator (TCO), such that temperature-dependent changes in oscillator frequency are compensated to some extent. FIG. 4 shows a block diagram of a TCO implementation 192 of VFO 190 that includes a local temperature sensor V20, such as a diode or thermistor, which generates a temperature-dependent signal (e.g. a voltage) according to a known function. A compensation circuit V30 outputs a temperature compensation signal, based on the temperature-dependent signal, that is applied to the oscillator V10. Compensation circuit V30 may include an ADC to digitize the temperature-dependent signal, and the temperature compensation signal may be supplied as an analog or digital signal (e.g. by use of a lookup table or polynomial that models an inverse of the oscillator's temperature characteristic). Compensation circuit V30 may also include a correction table (possibly integrated with the lookup table) that includes calibration values specific to the particular oscillator. In other implementations, the temperature compensation signal is supplied from an external processor. VFO 190 may be implemented as a temperature-compensated XO (TCXO), in which the temperature compensation signal is applied to a tuning element V40, such as a varactor, which is coupled to the crystal.

It may be desirable to implement VFO 190 as a voltage-controlled oscillator (VCO), such that the output frequency of the oscillator may be adjusted according to a voltage indicated by oscillator control signal S70. A VCO may be implemented to increase frequency according to the magnitude and/or duty cycle of a voltage of a certain polarity, and to decrease frequency according to the magnitude and/or duty cycle of a voltage of the opposite polarity (or vice versa). VFO 190 may be further implemented as a voltage-controlled temperature-compensated oscillator (VCTCO). In such case, a signal based on oscillator control signal S70 may be applied separately from the temperature compensation signal, or a signal based on oscillator control signal S70 may be combined with the temperature compensation signal into a common control signal. For example, VFO 190 may be implemented as a voltage-controlled temperature-compensated crystal oscillator (VCTCXO), which in one particular application has a nominal output frequency of 19.68 MHz rated at +/−5 ppm. A tolerance of +/−5 ppm corresponds to a range of +/−4 kHz out of 800 MHz, or +/−9.5 kHz out of 1.9 GHz.

Oscillator control signal S70 may be an analog voltage level, or a digital signal that is converted to a voltage using a digital-to-analog converter (DAC) or any other technique. In one implementation, a pulse density modulator (PDM) V50 is used to convert a digital value on oscillator control signal S70 (e.g. an 8-, 12-, or 16-bit value) to a pulsed analog voltage signal for input to the oscillator. The analog voltage signal path may also include a filter such as an RC filter (e.g. to suppress residual fluctuations). In one example, VFO 190 has a resolution in the range of about ¼ to about 1 Hertz per least significant bit of oscillator control signal S70 (Hz/LSB).

In implementations where oscillator control signal S70 is converted from digital to analog, a control register may be used to store the digital value of oscillator control signal S70, with the register's output being coupled to the input of the DAC (e.g. PDM). Such a register may be initialized to a desired value (e.g. at power-up) and/or may be preloaded to a desired state (e.g. upon a mode change). In some applications, such as during reception of a GPS signal, it may be desired to temporarily prevent oscillator control signal S70 from changing the output of VFO 190. Such control may be achieved by preventing updates to the control register (for example, by deasserting a write enable signal of the control register).

A local oscillator signal is a periodic signal having a fundamental frequency that may be implemented to have any waveform suitable for the particular application (e.g. sinusoidal, square, triangular, sawtooth, etc.). One or more of the local oscillator signals applied in downconverter 120 are based on frequency reference S30. For example, downconverter 120 and/or receiver 10 may include one or more frequency synthesizers that use frequency reference S30 as a timing reference from which a signal of another frequency (e.g. a local oscillator signal) is derived. Such a synthesizer may be implemented, for example, as a frequency multiplier or divider and may include a circuit such as a phase-locked loop (PLL). Typical LO frequencies include 800 MHz for CDMA reception and 1.5 GHz for GPS reception.

A local oscillator signal may be supplied to a mixer of downconverter 120 as two components separated in phase by 90 degrees (e.g. I and Q), with each component being applied in a separate mixing path such that a complex downconverted signal is obtained. The amplitude of a local oscillator signal may be controlled, e.g. using a variable gain amplifier. Frequency reference S30 (or a signal based on frequency reference S30) may also be used as the sampling clock by which the ADC samples the baseband (or near-baseband) signal to obtain complex signal S20.

Figure 5:
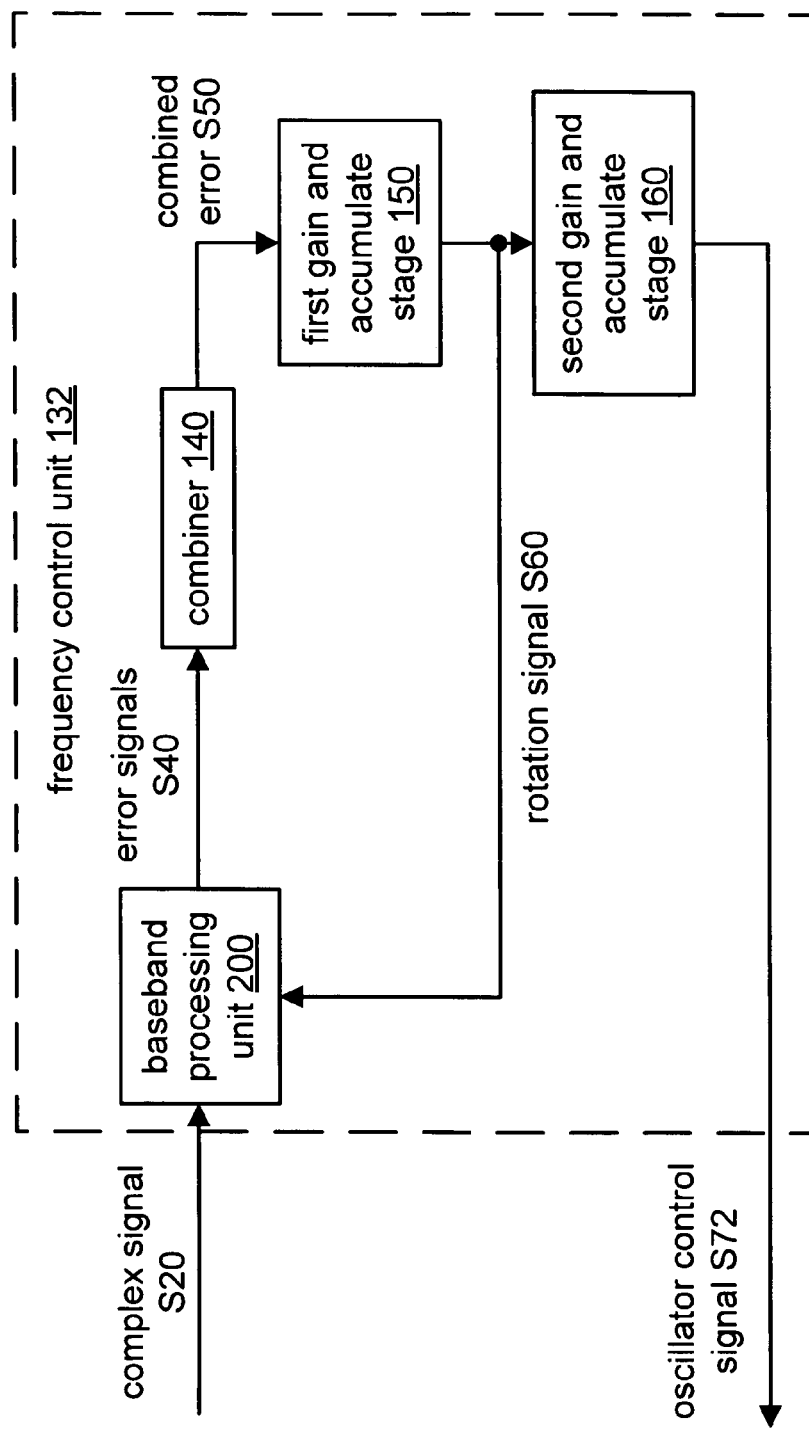
FIG. 5 shows a block diagram of an implementation 132 of frequency control unit 130 according to an embodiment.

Frequency control unit 130 outputs an oscillator control signal S70 based on complex signal S20. A digitized complex signal S20 may be filtered and/or decimated before processing by frequency control unit 130. FIG. 5 shows a block diagram of an implementation 132 of frequency control unit 130. A baseband processing unit 200 receives complex signal S20 (which may be at or near baseband) and rotation signal S60 and outputs a plurality of error signals S40 based on these two inputs. Combiner 140 combines the error signals S40 to obtain a combined error S50. First gain and accumulate stage 150 produces the rotation signal S60 based on combined error S50, and second gain and accumulate stage 160 produces an implementation S72 of oscillator control signal S70 based on rotation signal S60.

Figure 6A:
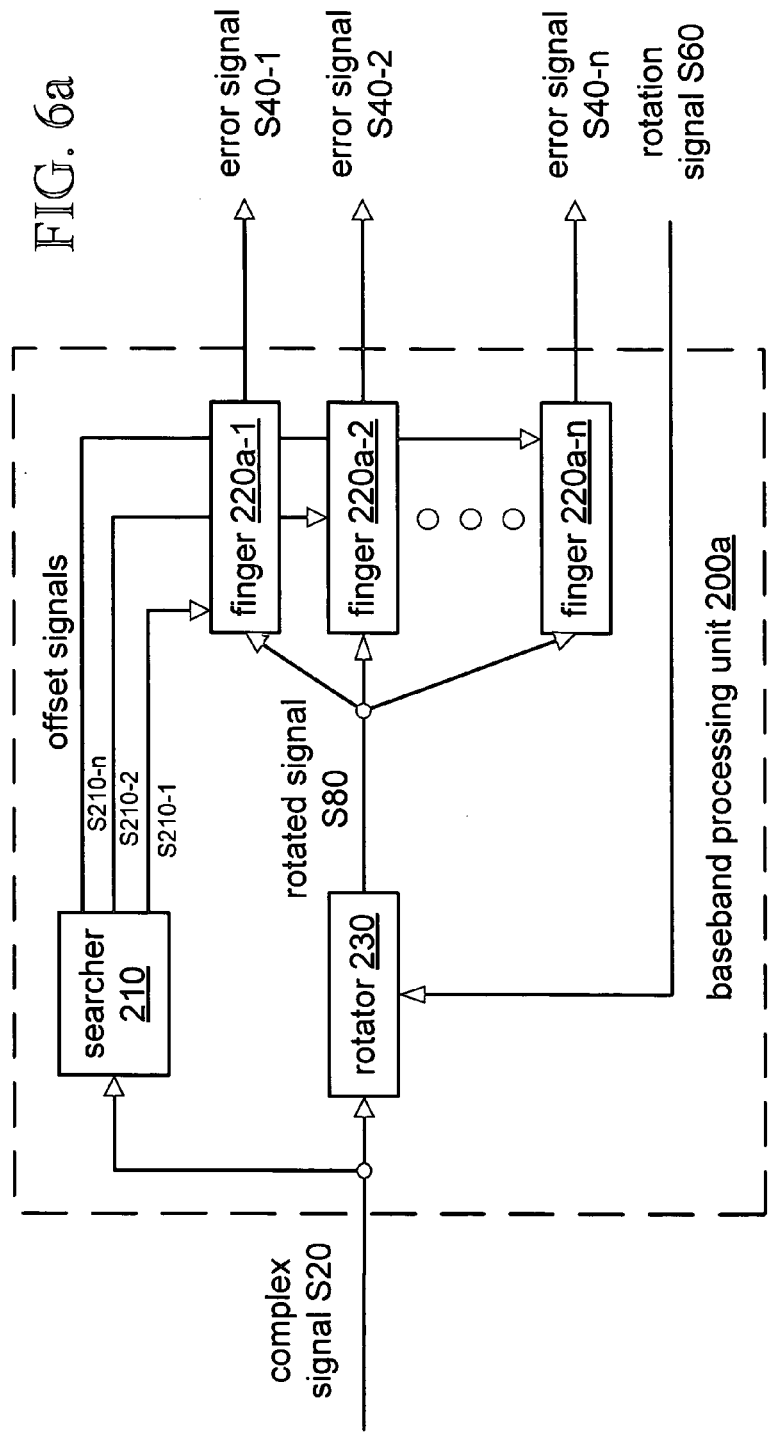
FIG. 6a shows a block diagram of an implementation 200a of baseband processing unit 200.

FIG. 6a shows a block diagram of an implementation 200a of baseband processing unit 200. A rotator 230 rotates complex signal S20 according to rotation signal S60 to produce a rotated signal S80. Each of a plurality of fingers (also called "demodulation elements") 220a receives the rotated signal S80 (or a signal based on rotated signal S80) and produces a corresponding error signal S40. In this example, each finger also receives (from searcher 210) a corresponding offset signal S210 based on complex signal S20.

A received signal may include several instances of the same transmitted signal, e.g. as received over different multipaths. As the various multipaths may differ (and vary) in length, the corresponding instances may be received at different (and varying) relative times. A configuration of searcher and fingers as shown in FIG. 6a is one example of a RAKE receiver. In such a configuration, the searcher processes a sample stream (e.g. complex signal S20) to locate an instance of a signal according to its delay in time or code phase relative to a reference (also called "acquisition") and assigns a finger to track and demodulate that instance. For example, the searcher may locate instances of a signal being searched according to peaks of a correlation between the sample stream and a code characteristic of the signal. Searcher 210 may also receive feedback information from finger 220 and may use this information to determine when the finger should be reassigned. For example, information from finger 220 regarding the energy and/or timing of the assigned instance may be used to determine that a multipath instance has faded out, or that two multipath instances have merged.

The fingers 220 may also be configured to apply offsets that are fixed or programmed. For example, searcher 210 may be configured to control a set of fingers 220 to perform correlations at programmed intervals such that a desired region of a code phase space is searched at a particular resolution. Such control may be used, for example, in GPS operation. The interval between offset values assigned to the various fingers, and/or the interval between consecutive offset values applied by a finger, may be dynamically selected based on one or more factors such as previous results, current operating mode (for example, a "cold start" mode vs. a tracking mode), or other information about the current receiving environment (for example, current satellite positions).

A typical implementation of baseband processing unit 200 in a single-carrier system includes four or six fingers, although any other number of fingers may be used. A typical implementation of baseband processing unit 200 in a multi-carrier system (e.g. a cdma2000 3x system) includes twelve or eighteen fingers (e.g. four or six per carrier), although any other number of fingers may be used. For example, a different number of fingers may be used for one carrier than for another, with each of one or more fingers possibly being assigned to more than one carrier (e.g. at different times).

Figure 7:
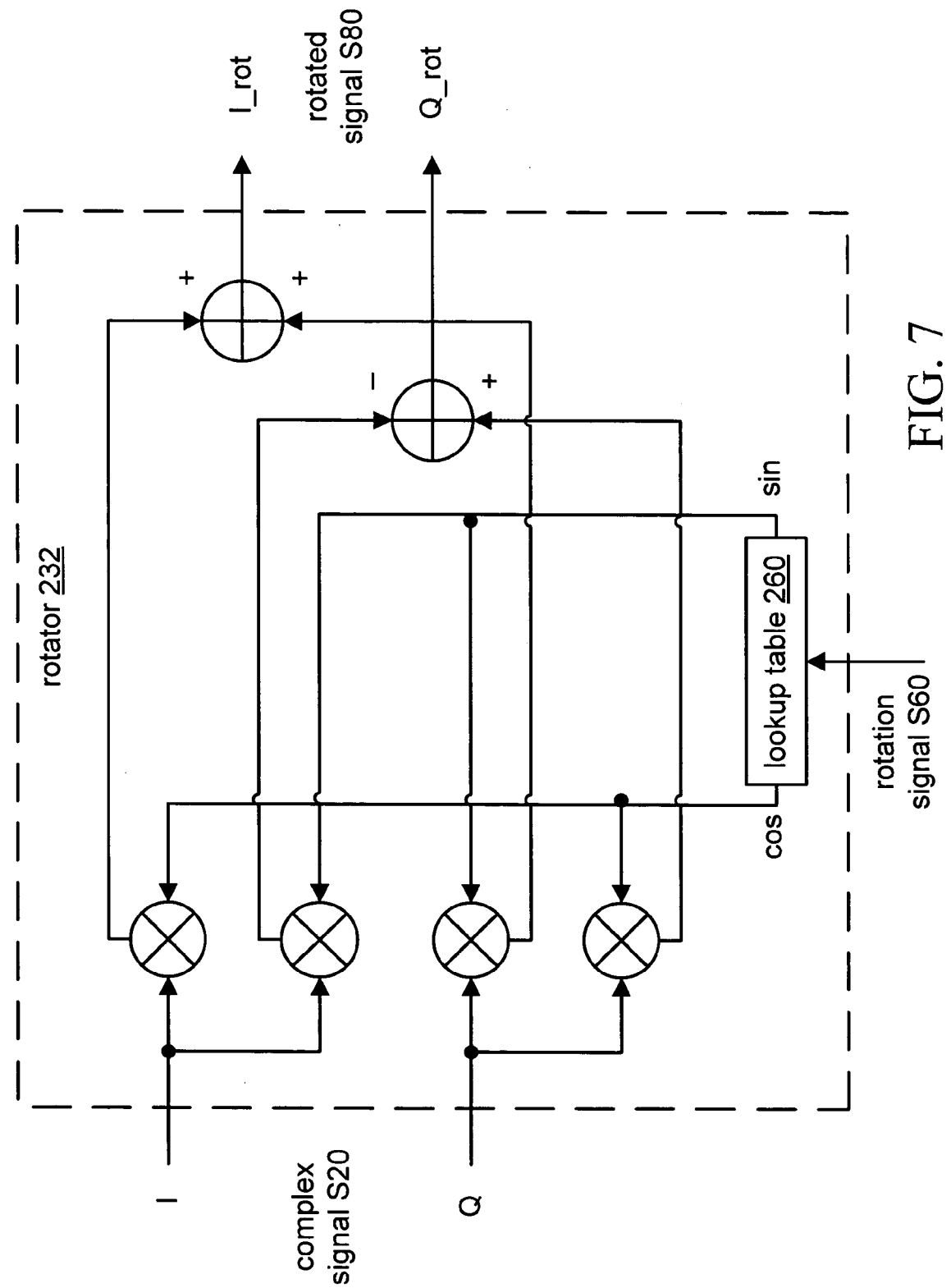
FIG. 7 shows an implementation 232 of rotator 230.

Rotation signal S60 indicates an angle θ by which complex signal S20 is to be rotated. FIG. 7 shows a block diagram of an implementation 232 of rotator 230 that performs a clockwise rotation of complex signal S20 according to the following expression:

$$(I+jQ)(e^{-j\theta})=(I+jQ)(\cos\theta-j\sin)=(I\cos\theta+Q\sin\theta)+j(-I\sin+Q\cos\theta) \quad (1)$$

Alternatively, rotator 230 may be implemented to perform a counterclockwise rotation according to the following expression:

$$(I+jQ)(e^{+j\theta})=(I+jQ)(\cos\theta+j\sin\theta)=(I\cos\theta-Q\sin\theta)+j(I\sin\theta+Q\cos\theta) \quad (2).$$

In one example, rotator 230 has a resolution of 37.5 Hertz per least significant bit of rotation signal S60 (Hz/LSB).

Sine and cosine values applied by rotator 230 may be retrieved from a lookup table (e.g. table 260) stored in a discrete location or as a portion of a larger memory space, which table may be stored in read-only memory (ROM) or random-access memory (RAM, volatile or non-volatile). In a device or system having more than one rotator or other element making use of sine and/or cosine values, a lookup table may be shared by more than one such element.

The lookup table may contain both sine and cosine values, or it may contain only sine or cosine values, with the other function being derived (e.g. according to the expression $\cos\alpha=\sin(\alpha+\pi/2 \text{ radians})$ or $\sin\alpha=\cos(\alpha-\pi/2 \text{ radians})$). Similarly, the lookup table may contain values for all quadrants, or it may contain values for only a portion of the coordinate plane (e.g. the first quadrant), with values for other portions being derived. One implementation of lookup table 260 contains a table of 256 entries, each corresponding to a sine value for an angle in the first quadrant (e.g. in increments of $\pi/512$ radians). A request to such a table may be formatted as a ten-bit value: e.g. two bits for quadrant and eight bits for table address. Rotator 230 may include circuitry or processing to derive the appropriate values from the corresponding table entries, and/or such derivation may be performed using external circuitry or processing.

Rotator 230 may also be implemented such that one or both of the sine and cosine values are calculated. For small angles, for example, the lookup table may be bypassed or omitted by approximating $\sin\alpha$ as $\alpha$ and/or approximating $\cos\alpha$ as $(1-0.5\alpha)$.

In an application that includes a VLIF implementation of downconverter 120, rotator 230 may also perform a downconversion of complex signal S20 from the low IF to baseband. In such case, rotation signal S60 may be adjusted by (e.g. summed with) a value corresponding to the desired downconversion angle before rotation signal S60 is applied by rotator 230.

Figure 6B:
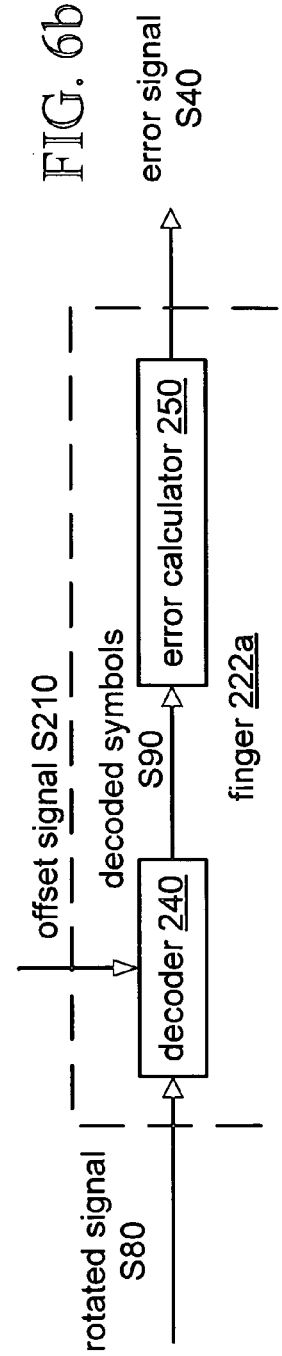

FIG. 6b shows a block diagram of an implementation 222a of finger 220a. Decoder 240 decodes rotated signal S80 according to offset signal S210 to obtain decoded symbols S90. For example, decoder 240 may separate a desired channel in rotated signal S80 from among a plurality of channels in the rotated signal. Error calculator 250 calculates an error signal S40 based on the decoded symbols S90.

FIG. 8a shows an implementation 242 of decoder 240. Despreader (or descrambler) 270 removes a spreading code from rotated signal S80 according to offset signal S210. Dechannelizer 280 accumulates portions of despread signal S220 to obtain raw pilot symbols S230. Pilot filter 290 filters raw pilot symbols S230 to obtain filtered pilot symbols S240. Decoder 240 may perform similar operations to obtain data symbols from rotated signal S80 and/or despread signal S220.

In a CDMA DSSS system, a transmitted signal may be spread using (e.g. multiplied by or modulo-2 added with) a complex pseudonoise (PN) code (e.g. a Gold code) that is at least nearly orthogonal to PN codes assigned to all other users of the system. In some implementations, the chip rate of the spreading code is an integer multiple of 1.2288 MHz. In a typical application, despreader 270 multiplies rotated signal S80 with a PN sequence (which may be complex) that corresponds to a desired cell, transmitter, and/or channel.

Offset signal S210 indicates the appropriate timing of the sequence with respect to the desired multipath (the code offset or "code phase"). Offset signal S210 may indicate the code offset, or may include one or more sequences having the appropriate offset. For example, searcher 210 may control a PN generator to supply a PN sequence at a particular offset, which offset may be updated as the signal changes (e.g. according to timing information provided by finger 220). Searcher 210 and/or finger 220 may also include a timing control loop configured to adjust the timing of a decoding operation: for example, according to an energy of symbols decoded at slightly different offsets (e.g. fractions of a chip), examples of such loops being described in, e.g., U.S. Pat. No. 6,738,608 (Black et al.), issued May 18, 2004.

In one example, despreader 270 is implemented as a complex multiplier. In a case where rotated signal S80 and the despreading sequence are expressed in binary notation, the complex multiplication may be performed using exclusive-OR gates. Despreader 270 may include an integrate-and-dump circuit or decimator (e.g. in a case where rotated signal S80 is oversampled).

Despread signal S220 may include several channels, each being covered with a different code. Dechannelizer 280 receives despread signal S220 and removes a covering code to obtain raw pilot symbols S230. A covering code may include one or more Walsh codes and/or one or more of another set of orthogonal, nearly orthogonal, or quasi-orthogonal codes. In a WCDMA application, for example, the covering code may be an orthogonal variable spreading factor (OVSF) selected based on the data rate of the channel.

Dechannelizer 280 may be implemented as an accumulator or an integrate-and-dump circuit (e.g. for an application in which the covering code is Walsh code $W_0$). In one example, dechannelizer 280 integrates 64 chips of despread signal S220 into one pilot symbol. In another example, dechannelizer 280 integrates 256 chips into a pilot symbol. For other codes, dechannelizer 280 may be implemented to include a multiplier (for example, a complex multiplier). Dechannelizer 280 may also be implemented to decover portions of a symbol at a time (e.g. as described in U.S. Pat. No. 6,628,702 (Rowitch et al.), issued Sep. 30, 2003).

In a case where a pilot signal is transmitted using two different covering codes (e.g. a transmit diversity mode that transmits orthogonally coded versions of the pilot signal from different antennas), decoder 242 may include a separate instance of dechannelizer 280 for each code. In a transmit diversity case (e.g. a Space Time Spreading (STS) mode of cdma2000, or a Space Time Transmit Diversity (STTD) mode of WCDMA), results for the diversity instances may be combined before pilot filtering (e.g. to obtain raw pilot symbols S230) or after (e.g. to obtain filtered pilot symbols S240).

In a receive diversity application (e.g. in which the same transmitted signal is received via more than one antenna), one or more of despread signal S220, raw pilot symbols S230, and filtered pilot symbols S240 from a diversity instance may be combined with a similar signal from one or more other instances before further processing.

Pilot filter 290, which may be implemented in an FIR (finite impulse response) or IIR (infinite impulse response) form, may be a low-pass filter. For example, pilot filter 290 may be a moving average filter. In some implementations, pilot filter 290 may be implemented as a first-order filter. In other implementations, pilot filter 290 may be implemented as a filter having variable coefficients, e.g. a variable-bandwidth filter as described in U.S. Pat. No. 6,760,362 (Patel et al.), issued Jul. 6, 2004.

Decoder 240 may include one or more instances of dechannelizer 280 to obtain data symbols from despread signal S220. FIG. 8b shows an implementation 244 of decoder 240 that includes an implementation 280a of dechannelizer 280 that receives despread signal S220 and removes a covering code (e.g. a Walsh code, such as $W_0$) to obtain raw pilot symbols S230, and an implementation 280b of dechannelizer 280 that receives despread signal S220 and removes a covering code (e.g. a different Walsh code) to obtain decoded data symbols S250.

It may be desirable for decoder 244 to maintain a synchronization between filtered pilot symbols S240 and decoded data symbols S250. For example, decoder 244 may be implemented to delay the stream of decoded data symbols S250 (e.g. with a delay element such as a register or FIFO buffer) according to a delay characteristic of pilot filter 290.

Decoder 240 or finger 220 may also include a pilot demodulator in which the channel estimate represented by the pilot symbols is applied to decoded data symbols. Such a pilot demodulator may include a circuit that calculates a dot product of data and pilot symbol vectors (e.g. to remove phase ambiguity from the data symbols). Decoded data (or traffic) symbols S250 may be further processed in operations such as deinterleaving, decompression, and/or decoding of one or more convolutional, turbo, cyclic redundancy check (CRC), and/or parity codes. In some applications, decoder 240 may be configured to output decoded symbols S90 from a burst pilot signal, in which the pilot is transmitted in a discontinuous fashion and may be interspersed with data traffic.

Error calculator 250 outputs an error signal S40 based on decoded symbols S90. The decoded symbols S90 may include raw pilot symbols S230 and/or filtered pilot symbols S240. In one application, error calculator 250 calculates error signal S40 from raw pilot symbols during acquisition of a signal, and from filtered pilot symbols during tracking of an acquired signal. Error calculator 250 may be implemented to account for differences between the value widths of different forms of decoded symbols S90 (e.g. sixteen bits for filtered pilot symbols vs. eight bits for raw pilot symbols).

Error calculator 250 may be implemented to calculate a frequency error based on a plurality of decoded symbol vectors. For example, error calculator 250 may be implemented to calculate a frequency error based on adjacent decoded symbol vectors: e.g. the current symbol vector (denoted here as I[n], Q[n]) and the previous symbol vector (denoted here as I[n−1], Q[n−1]). If the current vector (I[n], Q[n]) is expressed as (A[n] cos θ[n], A[n] sin θ[n]), where A and θ indicate the vector magnitude and phase angle, respectively, then by applying a finite difference approximation the following expression can be derived:

$$I[n]Q[n-1] - I[n-1]Q[n] = A[n]A[n-1]\sin(\theta[n] - \theta[n-1]). \quad (3)$$

If θ is assumed small such that sin θ≈θ, then the quantity on the left side of expression (3) (i.e. the magnitude of the cross product of the current and previous vectors) may be taken as an approximation of the frequency error.

Figure 9A:
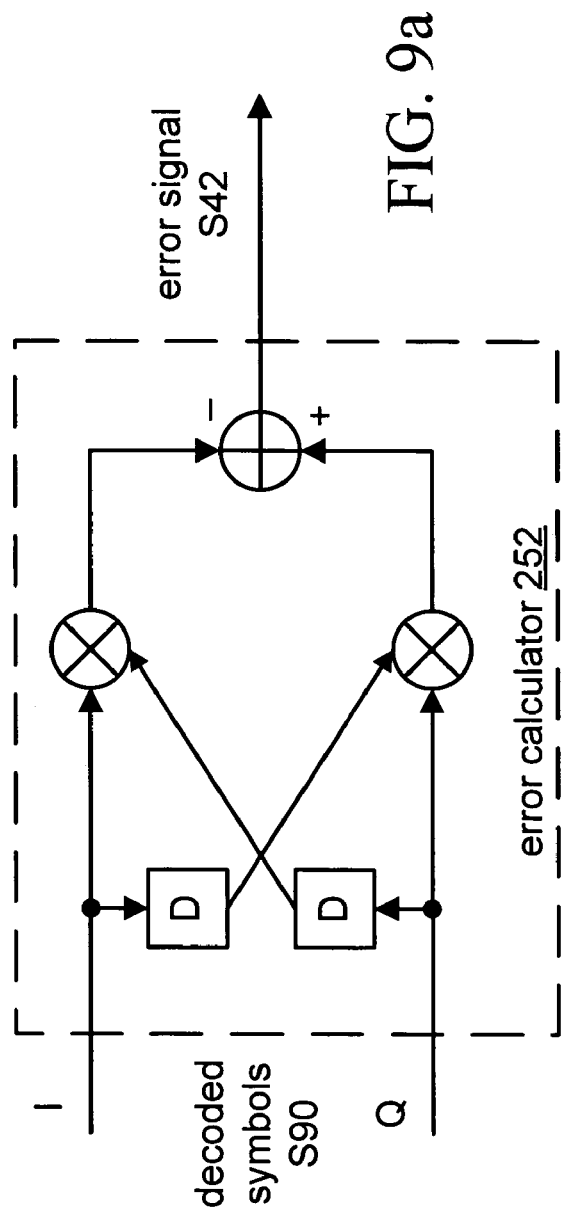
FIGS. 9a, 9b, and 9c show block diagrams of implementations 252, 254, and 256 of error calculator 250.
Figure 9B:
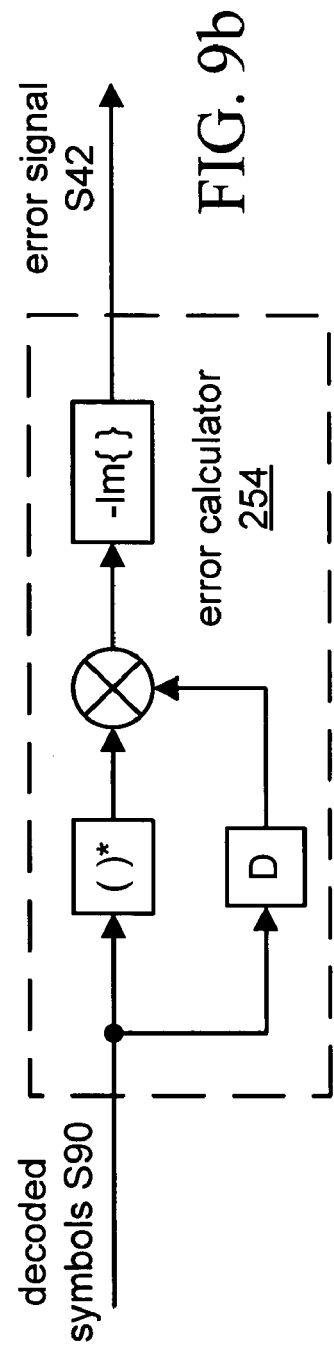
Figure 9C:
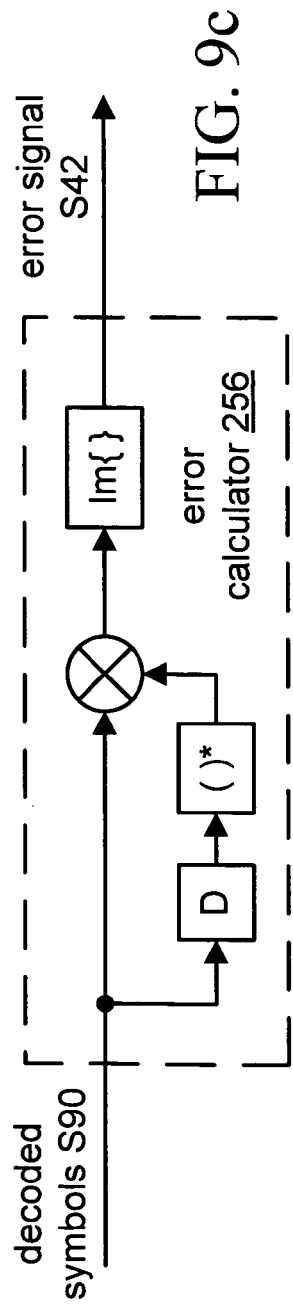

FIG. 9a shows a block diagram of an implementation 252 of error calculator 250 that calculates an implementation S42 of error signal S40 as (−I[n]Q[n−1]+I[n−1]Q[n]). FIGS. 9b and 9c show block diagrams of alternate implementations 254, 256 which calculate this value according to the following respective expressions:

$$Im\{(I[n],-Q[n])\times(I[n-1],Q[n-1])\}=-I[n]Q[n-1]+I[n-1]Q[n], \quad (4)$$

$$Im\{(I[n],Q[n])\times(I[n-1],-Q[n-1])\}=-I[n]Q[n-1]+I[n-1]Q[n]. \quad (5)$$

Similar expressions may be applied for calculation of error signal S40 based on additional symbol vectors (e.g. including the vector I[n−2], Q[n−2]). Implementations of similar expressions that may be used to calculate error signal S40 for pilot signals that include +A and −A symbols (e.g. as used in WCDMA transmit diversity modes) are described in U.S. Pat. Appl. Publ. No. 2003/0128678 (Subrahmanya et al.), published Jul. 10, 2003.

It may be understood that the accuracy of an approximation of the frequency error according to the cross product in expression (3) may vary depending upon the magnitude of the vectors (i.e. the signal strength) and the magnitude of the change in phase angle. Other implementations of error calculator 250 calculate a frequency error from symbol vectors according to an expression such as the following (see U.S. Pat. No. 6,728,301 (Chrisikos), issued Apr. 27, 2004):

$$\tan^{-1}\frac{I[n-1]Q[n]-I[n]Q[n-1]}{I[n]I[n-1]+Q[n]Q[n-1]}=\theta[n]-\theta[n-1]. \quad (6)$$

Such an error may be less dependent on vector magnitude or phase angle magnitude than a frequency error calculated according to expression (3).

Various optimizations are known for calculating the arctangent as in the left side of expression (6). For example, for any angle in the first or eighth octet (−45 to +45 degrees), the arctangent may be approximated to a maximum error of 0.26 degrees according to the following expression:

$$\tan^{-1}(B/A)=\frac{AB}{A^2+\left(\frac{1}{4}+\frac{1}{32}\right)B^2}, \quad (7)$$

where the factors ¼ and 1/32 may be easily implemented as bitwise right shifts (see Richard Lyons, Another Contender in the Arctangent Race, IEEE Signal Processing Magazine, January 2004, pp. 109-110). The arctangent of an angle in the fourth or fifth octet may be approximated to the same accuracy by adding π to the value obtained using expression (7), while the arctangent of an angle in the second or third (sixth or seventh) octet may be approximated to the same accuracy by subtracting the value obtained using expression (7) from π/2 (−π/2).

In some cases, decoded symbols S90 may include information from a source other than a pilot channel. For example, while long pilot symbols provide a channel estimate having less noise, a greater frequency range may be obtained with shorter pilot symbols. A pilot symbol on a cdma2000 channel includes 64 chips, and it may be desirable in some situations (e.g. signal acquisition) to obtain an error signal S40 corresponding to a shorter pilot symbol. In one cdma2000 application, error calculator 250 calculates a magnitude of a cross product of a raw pilot symbol vector and a vector of symbols decoded from the forward sync channel. The resulting implementation of error signal S40, which resembles an error as derived using pilot symbols of length 32, may be useful during acquisition as offering an increased frequency range at the expense of more noise. Further implementations of error calculator 250 calculate an implementation of error signal S40 based on decoded pilot and non-pilot symbols (e.g. as described in U.S. Pat. App. Publn. 2003/0087620 (Sendonais), published May 8, 2003) and/or based on results of correlating decoded symbols S90 (possibly including decoded data symbols S250) with more than one Walsh function (e.g. as described in U.S. Pat. No. 6,330,291 (Agrawal et al.), issued Dec. 11, 2001).

Figure 9D:
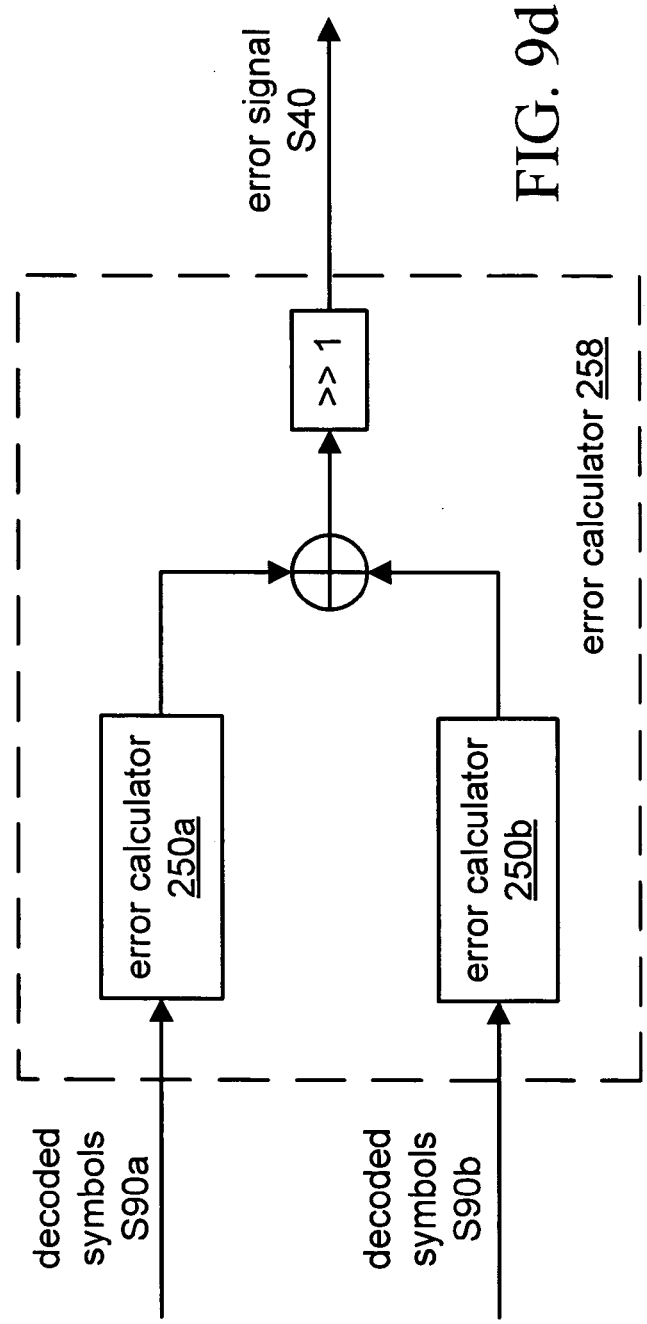
FIG. 9d shows a block diagram of an implementation 258 of an error calculator.

In a "receive diversity" application, receiver 10 includes two or more antennas that each receive a different instance of the same transmitted signal. Receive diversity may provide for better averaging in additive white Gaussian noise (AWGN) and fading channels. In such applications, error signal S40 may be produced by an error calculator that includes more than one instance of error calculator 250 as described herein. FIG. 9d shows a block diagram of one example 258 of such an error calculator, in which instances 250a, 250b of error calculator 250 receive decoded symbols S90a, S90b based on instances of the same channel (e.g. having the same spreading and covering codes) as received via different respective antennas (and, possibly, as processed by different RF front ends and/or downconverters). In this example, the combined error signals are averaged (added, then shifted right by one bit) to obtain corresponding error signal S40.

In another receive diversity example, each diversity instance includes a corresponding instance of antenna 105, RF front end 110, downconverter 120, and baseband processing unit 200. Each of the various instances of downconverter 120 is configured to receive one or more LO signals based on frequency reference S30. The error signals S40 produced by one or more (e.g. all) of the various diversity instances may be combined in a combiner 140. Alternatively, each diversity instance may also include a corresponding instance of combiner 140 and first gain and accumulate stage 150, with an instance of rotation signal S60 being applied locally, and with the various instances of rotation signal S60 being combined for input to second gain and accumulate stage 160 (possibly being weighted according to, e.g., signal strength). Such arrangements may also be adapted for receiver diversity applications including instances of other forms of a baseband processing unit as described herein, with other corrections being applied in common to the various diversity instances. Such principles of a common frequency reference, and/or common frequency and/or time correction, may also applied to transmit diversity applications.

Error signal S40 may also be adjusted to account for transmit diversity, in which related symbols are transmitted at the same time over more than one antenna. For example, an error signal corresponding to a CDMA signal transmitted using Orthogonal Transmit Diversity (OTD) may be left-shifted one bit, and an error signal corresponding to a CDMA signal transmitted using Space Time Spreading (STS) may be left-shifted two bits. Error signal S40 may also be limited (e.g. by a saturating or truncating element) and/or shifted as appropriate for further processing in the particular application.

FIG. 10a shows a block diagram of another implementation 200b of baseband processing unit 200. In this example, each of the fingers 220b receives rotation signal S60 and outputs an error signal S40 based on rotation signal S60 and complex signal S20. FIG. 10b shows a block diagram of an implementation 222b of finger 220b, which includes a rotator 230 (e.g. as shown in FIG. 7 and discussed herein). In such an implementation, the rotators of two or more (possibly all) fingers may share one lookup table.

Combiner 140 receives the error signals S40 and outputs a combined error S50. In one example, combiner 140 includes an adder that produces combined error S50 as the sum of the error signals S40. In another example, combiner 140 produces combined error S50 as the weighted sum of the error signals S40, wherein each error signal S40 is weighted by, e.g., a measure of the strength of the signal from which the corresponding error signal S40 was derived (such as a received signal strength indication or RSSI). For example, combiner 140 may be implemented as a maximal ratio combiner. An adder or summer of combiner 140 may be implemented as a saturating adder. Combiner 140 may also be implemented to pad, truncate, and/or round an input or output value to a desired format or width.

Combiner 140 may receive a lock signal corresponding to each finger 220 (e.g. from the finger or from searcher 210) indicating whether the finger is in lock. In such a case where the lock signal has a value of one (in lock) or zero (out of lock), combiner 140 may apply each lock signal to the corresponding error signal S40 as a gain factor. For implementations of combiner 140 in which error signals S40 are weighted e.g. according to the corresponding signal strength, error signals S40 from out-of-lock fingers may be assigned a weight of zero.

First gain and accumulate stage 150 scales combined error S50 according to one or more gain factors and outputs the rotation signal S60 based on an accumulation of a current state with one or more previous states. First gain and accumulate stage 150 may be implemented according to principles of loop filter design. FIG. 11a shows an implementation 152 of first gain and accumulate stage 150 that outputs an implementation S62 of rotation signal S60. The accumulator in this example includes a delay element (e.g. a register) and an adder, which may be a saturating adder. Rotation signal S60 may also be further scaled, shifted, and/or inverted, e.g. before application by baseband processing unit 200 and/or second gain and accumulate stage 160.

A first gain factor as applied by first gain and accumulate stage 150 may include a fixed gain factor and an adjustable gain factor. FIG. 11b shows an implementation 154 of first gain and accumulate stage 150 in which a multiplier applies an adjustable (e.g. programmable) gain factor G10 and a shifter 170 applies a fixed gain factor. In one such example, the fixed gain factor is implemented as a left shift following application of the adjustable gain factor. The fixed gain factor may be selected according to a desired loop characteristic (e.g. to obtain a desired tracking speed or bandwidth, to ensure stability and/or damping, etc.).

The adjustable gain factor may be implemented as a programmable value, e.g. an eight-bit unsigned integer value, although other values (signed and/or floating point) may be used. Alternatively, the adjustable gain factor may be implemented as a selection among two or more values that may each be fixed or programmable. A control circuit or processor of receiver 10 may be configured to program or select the adjustable gain factor, and different gain values (e.g. different fixed and/or adjustable gain factors) may be used to obtain a desired behavior in different modes of operation (e.g. a larger gain factor for an acquisition mode and a smaller gain factor for a tracking mode). Typically, a larger gain factor will result in faster tracking. It may also be desirable to obtain a gain factor which provides a sufficiently fast slew rate for the rotation control loop. For example, it may be desirable to obtain a gain factor which provides a bandwidth for the rotation control loop that is sufficiently large (in light of e.g. the resolution of rotator 230) to prevent tracking loss over a range of expected Doppler error.

It may be desired to apply a different rotation to one or more of the received signal instances than to another received instance. The frequency errors associated with the various signal instances will typically differ due, for example, to the different Doppler errors associated with the corresponding propagation paths. In some cases, the Doppler errors associated with different received instances may even have different signs. Rather than applying a correction that is based on frequency errors calculated by other fingers, it may be desired to rotate a received instance according to a particular frequency error observed by that finger.

Figure 12A:
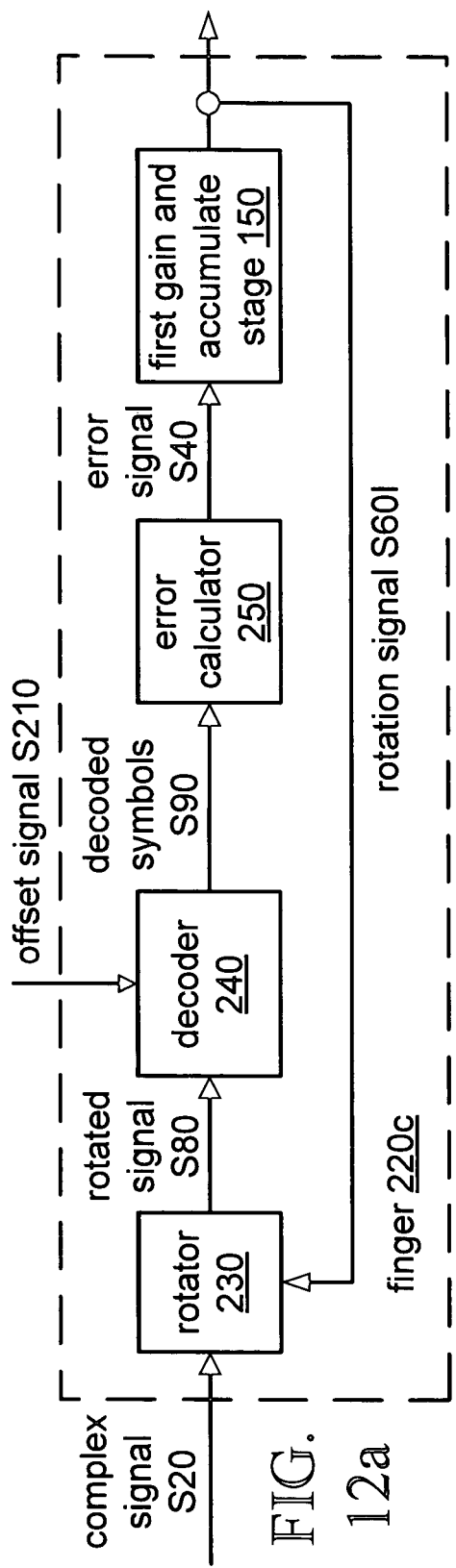
FIG. 12a shows a block diagram of an implementation 220c of finger 220.

FIG. 12a shows an implementation 220c of finger 220 that includes an instance of rotator 230. Finger 220c also includes an instance of first gain and accumulate stage 150 that is configured to calculate an implementation S60I of rotation signal S60 that is based on error signal S40. Finger 220c is configured to output rotation signal S60I (e.g. to a combiner 142 as described herein) and also to apply rotation signal S60I to rotator 230.

Figure 12C:
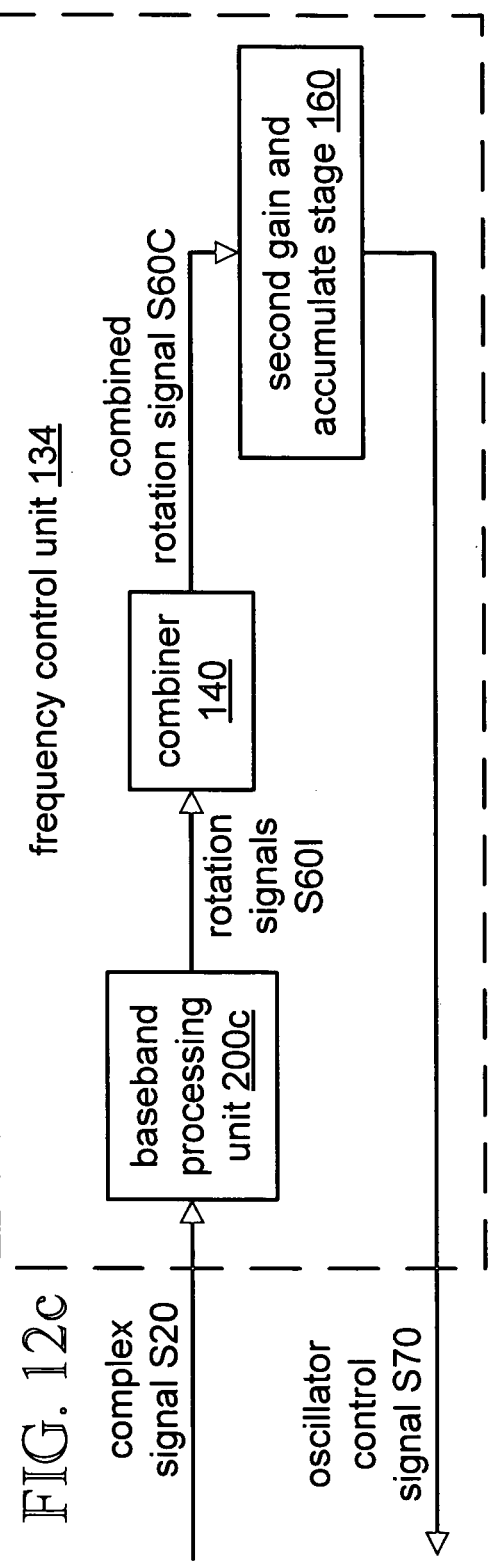
FIG. 12c shows a block diagram of an implementation 134 of frequency control unit 130.
Figure 12B:
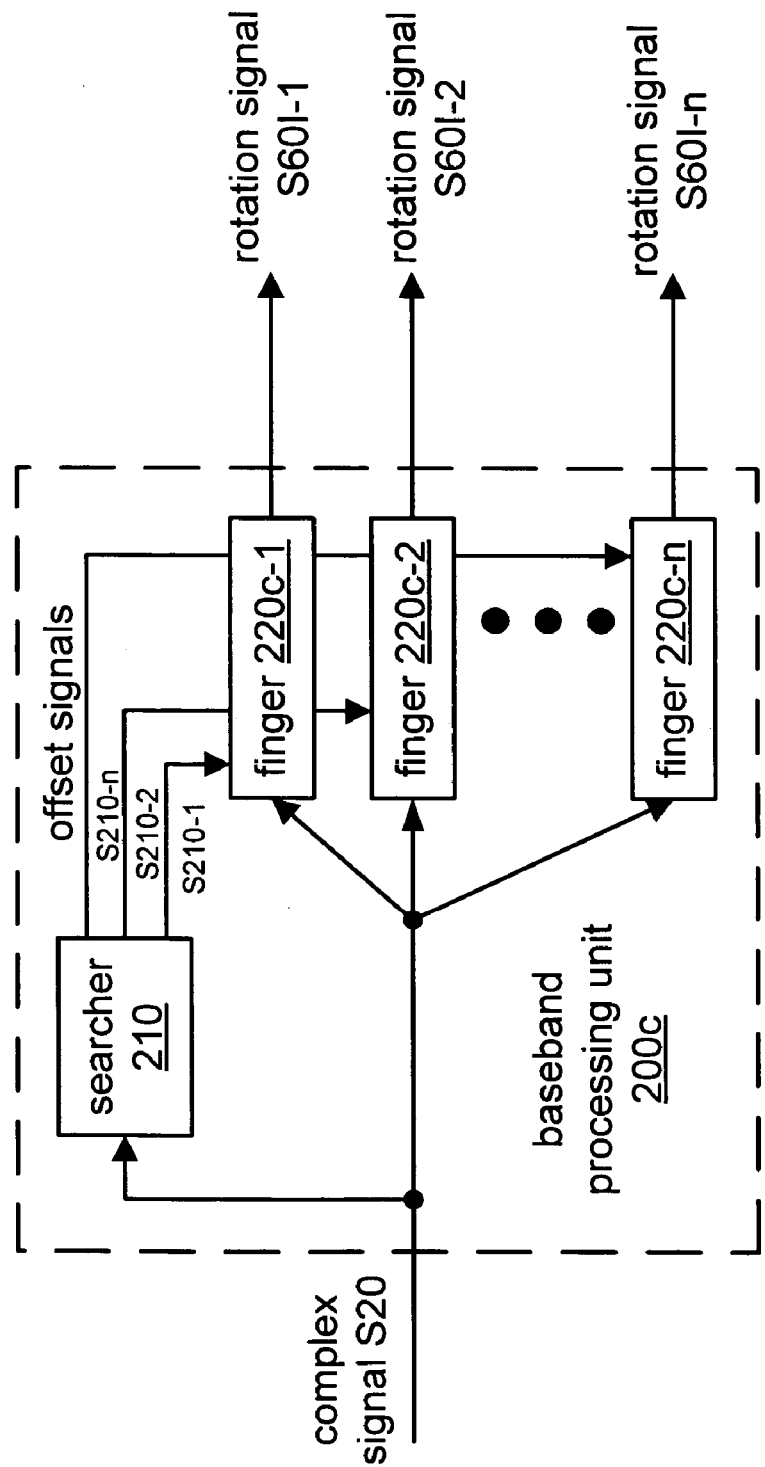
FIG. 12b shows a block diagram of an implementation 200c of baseband processing unit 200.

FIG. 12b shows an implementation 200c of baseband processing unit 200 that includes a plurality of instances of finger 220c, each configured to output a corresponding instance of rotation signal S60I. FIG. 12c shows a block diagram of an implementation 134 of frequency control unit 130 that includes a combiner 142 configured to calculate a combined implementation S60C of rotation signal S60 that is based on the rotation signals S60I. In some applications, combiner 142 may be implemented as an adder configured to calculate a sum of the rotation signals S60I. In other applications, combiner 142 may be implemented as an array of multipliers and adders configured to calculate a weighted sum of the rotation signals S60I, where each signal S60I is weighted by a measure of the strength of the corresponding received instance.

One of the versions of rotation signal S60I as applied by rotator 230 and as outputted to combiner 142 may be a scaled, truncated, or gated version of the other. For example, rotator 230 may apply a full-resolution version of signal S60I, while combiner 142 may combine truncated versions of the various rotation signals S60I.

Frequency control unit 134 includes an instance of second gain and accumulate stage 160 that is configured to calculate an instance of oscillator control signal S70 based on the combined rotation signal S60C. In another implementation, frequency control unit 130 is configured to select the rotation signal corresponding to the strongest received instance, and second gain and accumulate stage 160 is configured to calculate oscillator control signal S70 based on this selected signal.

Second gain and accumulate stage 160 scales rotation signal S60 according to one or more gain factors and outputs the oscillator control signal S70 based on an accumulation of a current state with one or more previous states. Second gain and accumulate stage 160 may be implemented according to principles of loop filter design. FIG. 13a shows an implementation 162 of second gain and accumulate stage 160 that outputs an implementation S72 of oscillator control signal S70. The accumulator in this example includes a delay element and an adder, which may be a saturating adder. Oscillator control signal S70 may also be further scaled, shifted, and/or inverted, e.g. before application to VFO 190.

A second gain factor as applied by second gain and accumulate stage 160 may be based on such criteria as a slew rate of the rotation loop, GPS sensitivity to residual VFO error, search schedules, and/or requirements of another chain (e.g. a reverse link or transmit chain). It may be desired to obtain a bandwidth for the VFO loop that is small enough to filter out Doppler and fading-related dynamics and large enough to track temperature transients.

The second gain factor may be implemented as a combination of a fixed gain factor and an adjustable gain factor. FIG. 13b shows an implementation 164 of second gain and accumulate stage 160 in which a shifter 180 applies a fixed gain factor and a multiplier applies an adjustable (e.g. programmable) gain factor G20 to produce an implementation S74 of oscillator control signal S70. In one such example, the fixed gain factor is implemented as a right shift prior to application of the adjustable gain factor. The fixed gain factor may be selected according to a desired loop characteristic (e.g. to obtain a desired tracking speed or bandwidth, to ensure stability and/or damping, etc.). For example, it may be desired to provide for an overdamped response in the VFO loop. The adjustable gain factor may be implemented as a programmable value, e.g. an eight-bit unsigned integer value, although other values (signed and/or floating point) may be used. Alternatively, the adjustable gain factor may be implemented as a selection among two or more values that may each be fixed or programmable. A control circuit or processor of receiver 10 may be configured to program or select the adjustable gain factor, and different gain values (e.g. different fixed and/or adjustable gain factors) may be used to obtain a desired behavior in different modes of operation (e.g. a larger gain factor for an acquisition mode and a smaller gain factor for a tracking mode). Typically, a larger gain factor will result in faster tracking.

One or both of programmable gain factors G10 and G20 may be implemented as a selection among a number of preset values. For example, programmable gain factor G20 may be implemented as a selection between a low-gain value and a high-gain value. FIG. 13c shows a block diagram of an implementation 166a of second gain and accumulate stage 160 that includes a selector configured to select between a low gain factor G30 and a high gain factor G40 according to a control signal S100 and may also include a shifter 180. A control processor or circuit of receiver 10 may be configured to dynamically select the high gain factor G40 via control signal S100, for example, when it is desired to pull more of the frequency error into the VFO loop. Such a selection may be performed according to a timer and/or upon a GPS reception operation. Such a selection may also be performed according to VFO error requirements relating to an advanced forward link trilateration (AFLT) operation.

It may be desirable to disable or freeze the VFO loop while allowing the rotator loop to operate. For example, it may be desired to update the value of oscillator control signal S70 only when the residual error on the rotator loop reaches or exceeds a threshold value. FIG. 13d shows a block diagram of an implementation 166b of second gain and accumulate stage 160 that is configured to produce an implementation S76b of oscillator control signal S70. In this example, a low-pass filter 410 is configured to output a long-term average of rotation signal S60. Filter 410 may be implemented as a first- or other low-order FIR or IIR filter.

Comparator 460 is configured to output a control signal C102 having a high (1) or low (0) state depending on a relation between the average of rotation signal S60 and a threshold value T10. In this example, control signal C102 has a high state when the average exceeds a threshold value T10, and a low state otherwise. In another example, control signal C102 has a low state when the average is less than a threshold value T11, and a high state otherwise.

Multiplier 510 may be implemented as an AND gate configured to gate the rotation signal S60 according to the state of control signal C102. In a case where rotation signal S60 has a width of n bits, for example, multiplier 510 may be implemented as a ganged array of n two-input AND gates in which one input of each gate receives a corresponding bit of rotation signal S60 and the other input receives control signal C102. In another implementation of second gain and accumulate stage 166b, the second gain factor may be applied upstream of filter 410 and/or multiplier 510.

Figure 13E:
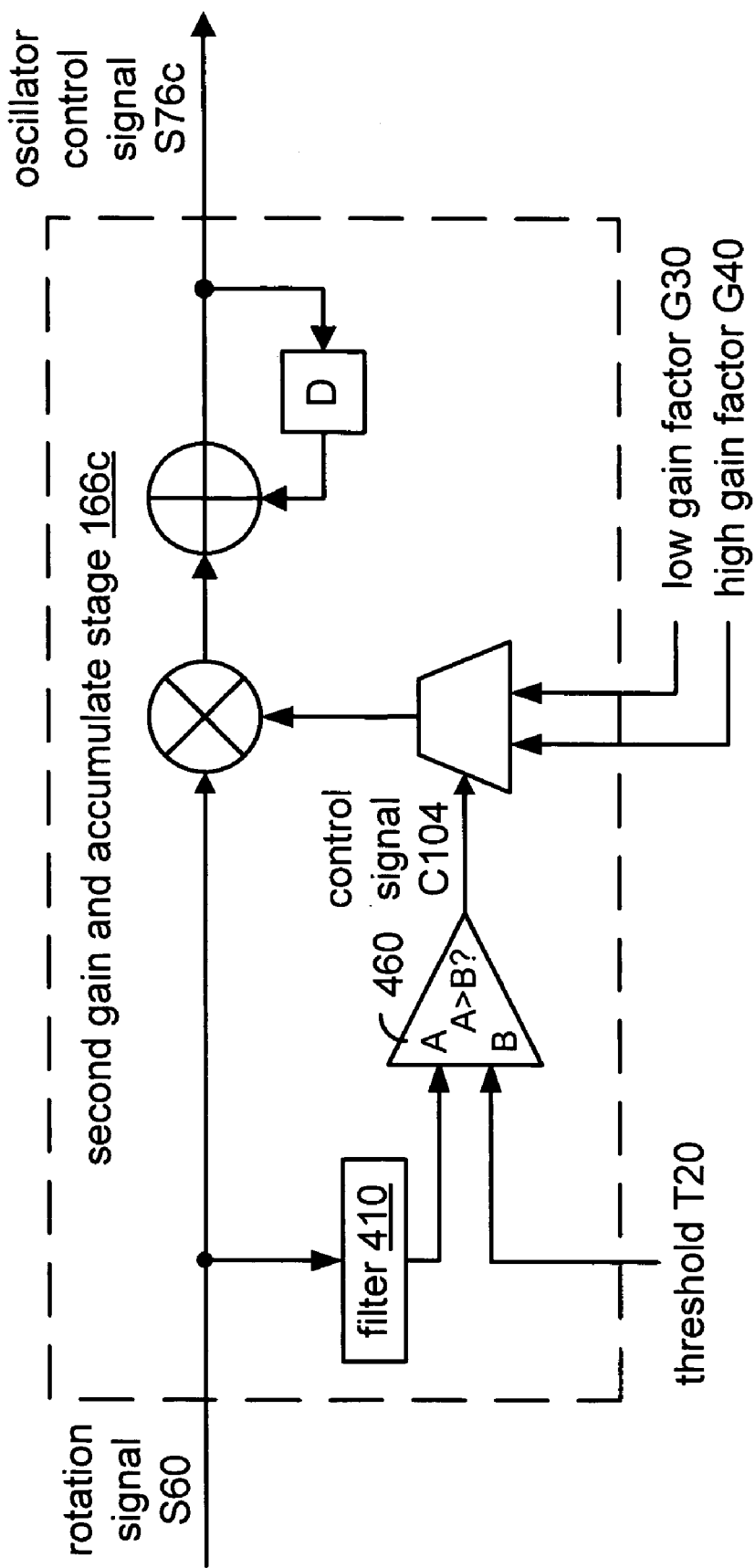

Selection between a low and high gain factor may be based on rotation signal S60. For example, a high gain factor G40 may be selected when a long-term average of rotation signal S60 exceeds a threshold. This average may be indicated by a magnitude of the output of a low-pass filter on rotation signal S60, which filter may be implemented e.g. as part of first gain and accumulate stage 150 or of second gain and accumulate stage 160. FIG. 13e shows a block diagram of such an implementation 166c of second gain and accumulate stage 160, in which one among a low gain factor G30 and a high gain factor G40 is selected according to a relation between a long-term average of rotation signal S60 and a threshold value T20.

It may be desired to limit a slew rate of the VFO loop. For example, certain events may cause a sudden significant change in the value of rotation signal S60. Examples of such events include a finger falling out of lock, a finger with a different Doppler error acquiring lock, and a sudden large change in the relative velocity of receiver and transmitter. It may be desired to reduce an effect of such transients on oscillator control signal S70.

FIG. 14a shows a block diagram of an implementation 166d of second gain and accumulate stage 160. Multiplexer 440 receives a scaled version of rotation signal S60 and a slew-rate-limited version of that signal as calculated by limiter 420. In one example, limiter 420 is configured to apply upper and lower bounds on a value of its input signal. Such bounds may be selected based on, for example, a maximum absolute rate of change in oscillator frequency, which may be expressed in units such as parts per billion (ppb) per second. For a GPS application, it may be desired to select a maximum rate as 6.4, 3.2, or 1.6 ppb/sec or even less. Alternatively, it may be desired to select a slew rate limit in terms of Hertz, such as a 5 kHz instantaneous or average limit. Multiplexer 440 is configured to select one of its inputs based on a state of control signal C106 as produced by logic block 430.

FIG. 14b shows a block diagram of one implementation of logic block 430. Magnitude calculation block 450 is configured to calculate a magnitude of the scaled version of rotation signal S60. Comparators 460 and 470 are configured to compare the magnitude to respective thresholds T30a and T30b, and RS latch 480 is configured to output control signal C106 based on relations between the magnitude and each of the thresholds. In this example, the value of control signal C106 is high when the magnitude exceeds threshold T30a, is low when the magnitude does not exceed threshold T30b, and otherwise does not change. It may be desirable to select a value for high threshold T30a that is larger than the expected oscillator drift, while the low threshold value T30b may be selected according to a desired sensitivity. Second gain and accumulate stage 166d may also be configured such that a slew-rate-limiting operation may be enabled or disabled. For example, it may be desired to enable slew-rate limiting during GPS reception and to disable such an operation otherwise.

It is noted that an implementation of second gain and accumulate stage 160 that performs a control function based on rotation signal S60 (for example, an implementation as shown in FIG. 13c, 13d, 13e, or 14a) may be configured to perform the control function on a scaled or truncated version of rotation signal S60.

In some implementations of receiver 10, one or both of the first and second gain and accumulate stages may be implemented as an accumulator, and/or the gain element in such a stage may be implemented as a shift.

It may be desirable to configure the gain factors of the first and second gain and accumulate stages such that Doppler and temperature errors may be reliably separated between the two loops. For example, it may be desirable to maintain a substantially constant ratio between the bandwidths of the loops. A suitable bandwidth ratio may be in the range of from ten to 1000, with a value of 100 being desirable for at least some applications. Alternatively, it may be desirable to maintain a substantially constant ratio between the time constants of the two loops. A suitable time constant ratio may be in the range of from 0.2 to twenty, with a value of two being desirable for at least some applications. In a further alternative, it may be desirable to maintain a substantially constant bandwidth or time constant of the VFO loop. A suitable time constant for the VFO loop may be in the range of from 0.2 to twenty seconds, with a value of two seconds being desirable for at least some applications.

As noted above, an error signal S40 as calculated by error calculator 250 may be dependent upon a magnitude of the received signal. In some implementations of frequency control unit 132, the gain of the inner (rotation) loop may scale with Ec/Io (ratio of pilot energy per chip to total received power of signals and noise) such that loop response becomes faster with increasing signal strength, while the dominant pole of the outer (VFO) loop may be insensitive to signal strength. In such a case, the bandwidth ratio between the two loops may change with signal strength.

A potential effect of such a change is that the ratio of the amounts of the frequency error that are compensated in each loop varies significantly according to signal strength. It may be desired to avoid such an effect. For example, it may be desired to provide for a substantially constant bandwidth ratio of the two loops (e.g. within a range of 100%, 50%, or 10%) across the expected spread of Ec/Io values. In one application, such a spread of Ec/Io values (e.g. from the lock threshold of a single finger to saturation of all fingers) has a range of from about −28 to about 0 dB. In one application, the ratio of rotation loop bandwidth to VFO loop bandwidth is about ten, although any other ratio (e.g. greater than or less than one) may be selected as appropriate for the desired application.

Second gain and accumulate stage 160 may be implemented to include a signal-dependent gain factor. For example, the second gain factor may be scaled according to a measure of signal strength (e.g. energy). FIG. 15a shows a further implementation 168 of second gain and accumulate stage 160 that outputs an implementation S78 of oscillator control signal S70 based on a scaling factor G30.

Scaling factor G30 may be implemented to resemble a signal-dependent scaling as seen by error calculator 250 (e.g. as a product of magnitudes of current and previous sample vectors). For example, scaling factor G30 may be implemented as an indication or approximation of the received signal energy. FIG. 15b shows a block diagram of a scaling factor calculator 185 that calculates an implementation G32 of scaling factor G30 as a sum of the squares of the current I and Q values. In other implementations, an appropriate scaling factor may already be available (e.g. as an RSSI value calculated for the corresponding finger). In some applications, it may be desired to use a dot product of adjacent symbols (e.g. current and previous symbols) instead: for example, if such a value is already available. Second gain and accumulate stage 168 may also include a shifter 180, while in some implementations, it may be sufficient to apply scaling factor G30 as a shift.

In some applications of frequency control unit 130, it may be desirable to decouple the rotation control loop and the VFO control loop. For example, it may be desirable to isolate the VFO loop from quantization noise of the rotation loop (e.g. in a case where the resolution of VFO 190 (in Hz/LSB) is finer than that of rotator 230). A decoupled configuration may be easier to design and analyze, more flexible, and/or easier to adapt to special situations such as acquisition. In such a configuration, gain factors for the two loops may be selected largely independently of one another, such that an arbitrary bandwidth ratio between the loops may be implemented.

Figure 16A:
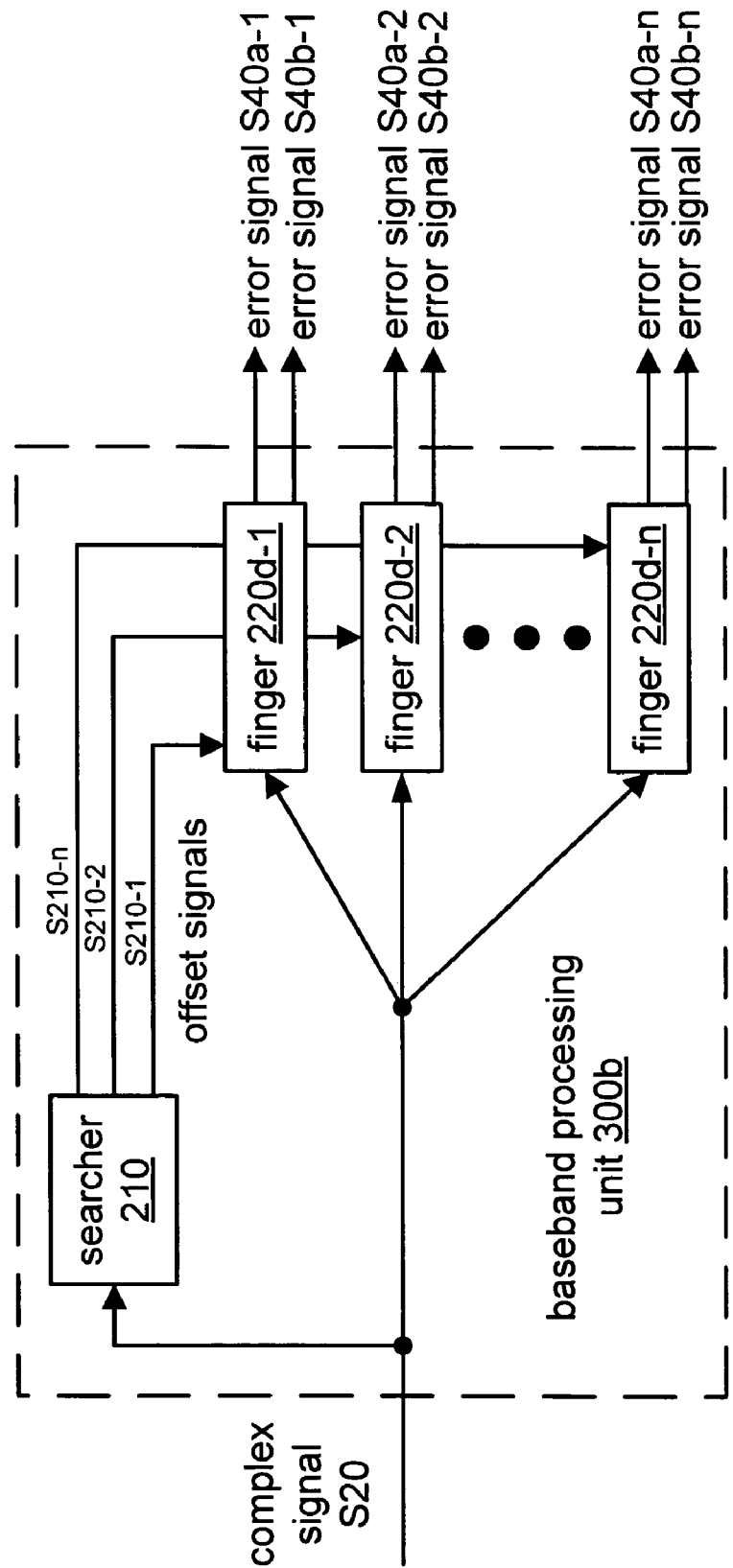
FIG. 16a shows a block diagram of an implementation 300b of baseband processing unit 300.

FIG. 16a shows a block diagram of an implementation 300b of a baseband processing unit 300 that may be used in a decoupled configuration. Baseband processing unit 300b includes a set of implementations 220d of finger 220, each outputting two error signals S40a and S40b that are based on the same instance of the received signal. Error signal S40a indicates a frequency error remaining after a rotation has been applied to the signal, while error signal S40b indicates a frequency error in the unrotated signal.

Figure 16B:
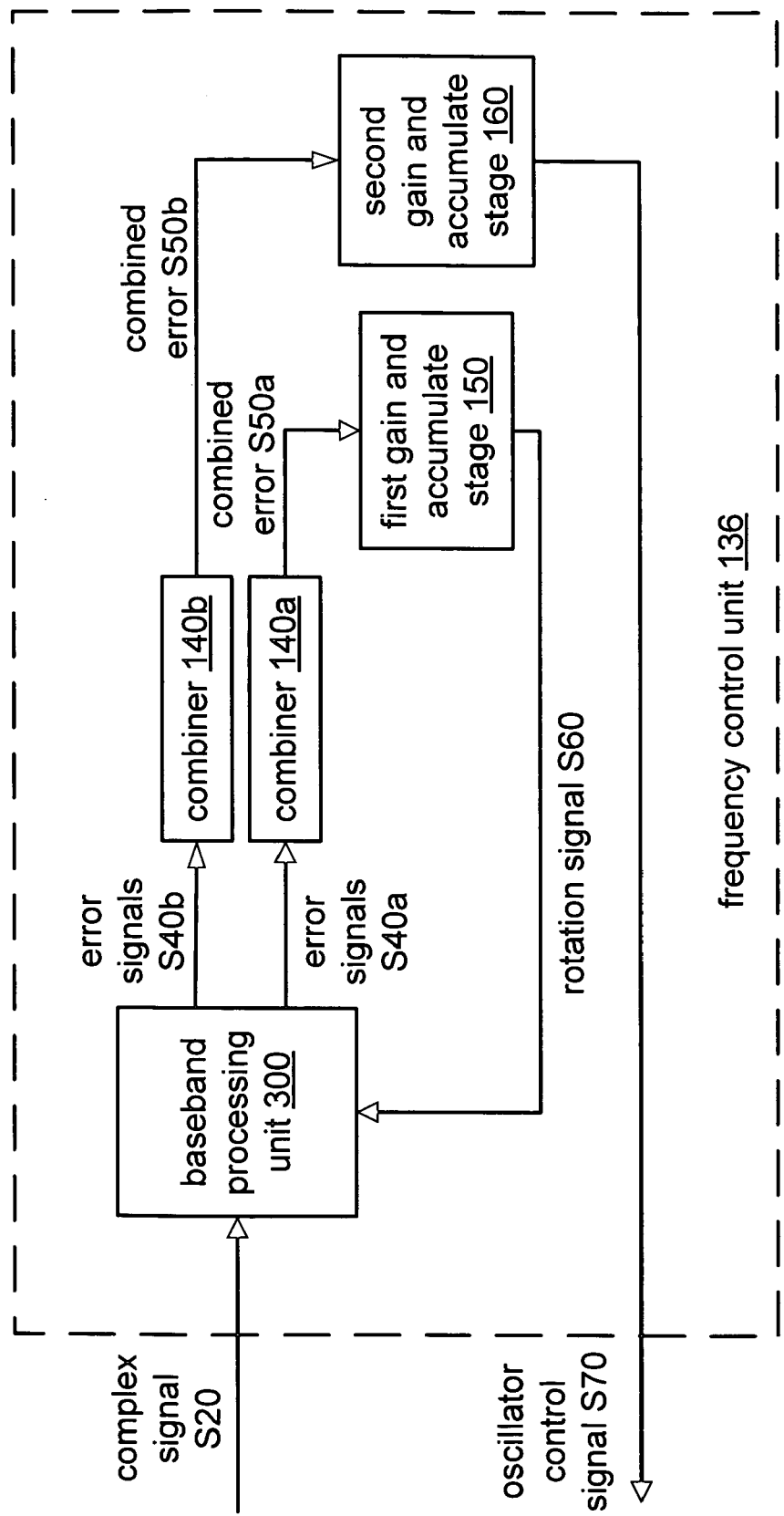
FIG. 16b shows a block diagram of an implementation 136 of frequency control unit 130.

FIG. 16b shows a block diagram of an implementation 136 of frequency control unit 130 that includes two instances 140a, 140b of combiner 140. Frequency control unit 136 is configured to calculate a subsequent state of rotation signal S60 based on error signals S40a. Frequency control unit 136 is also configured to calculate a subsequent state of oscillator control signal S70 based on error signals S40b.

Figure 17:
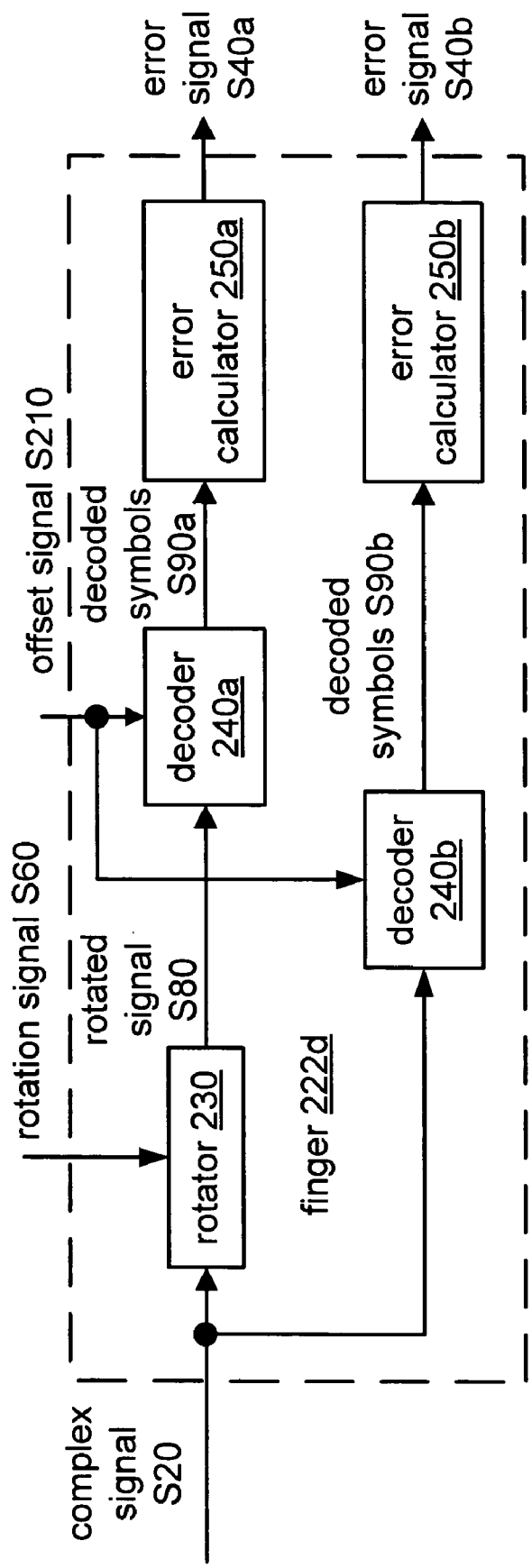
FIG. 17 shows a block diagram of an implementation 222d of finger 220d.

FIG. 17 shows a block diagram of an implementation 222d of finger 220d. Finger 222d includes two instances of decoder 240 and two instances of error calculator 250. In a first signal path, decoder 240a decodes rotated signal S80 and error calculator 250a calculates error signal S40a, as described above in relation to finger 222b. In a second signal path, decoder 240b decodes complex signal S20 and error calculator 250b calculates error signal S40b. Error calculators 250a and 250b may be similarly implemented and may even be implemented as the same structure and/or set of instructions being applied in different contexts at different times. Alternatively, the error calculators may be implemented as different structures and/or sets of instructions, in which case one or both of the first and second gain and accumulate stages may be configured to compensate for a difference between the responses of the error calculators.

The two decoders of finger 222d are configured to decode their input signals according to the same offset signal S210. In this case, error calculator 250a calculates a frequency error characteristic of rotated signal S80, while error calculator 250b calculates a frequency error characteristic of (unrotated) complex signal S20. It may be understood that in finger 222d, error signal S40b is not affected by changes in rotation signal S80.

It may also be understood that a similar decoupling of the rotation and oscillator control loops may be achieved using other finger architectures as described herein. For example, FIG. 18a shows a block diagram of another implementation 300c of baseband processing unit 300 that includes a set of fingers 220e, each configured to calculate error signals S40a and S40b. FIG. 18b shows a block diagram of an implementation 222e of finger 220e.

Likewise, FIG. 19a shows a block diagram of an implementation 222f of finger 220c that calculates an error signal S40b, and FIG. 19b shows a block diagram of an implementation 136a of frequency control unit 136, in which an implementation 300d of baseband processing unit 300 includes a set of fingers 222f configured to calculate error signals S40b.

Figure 20:
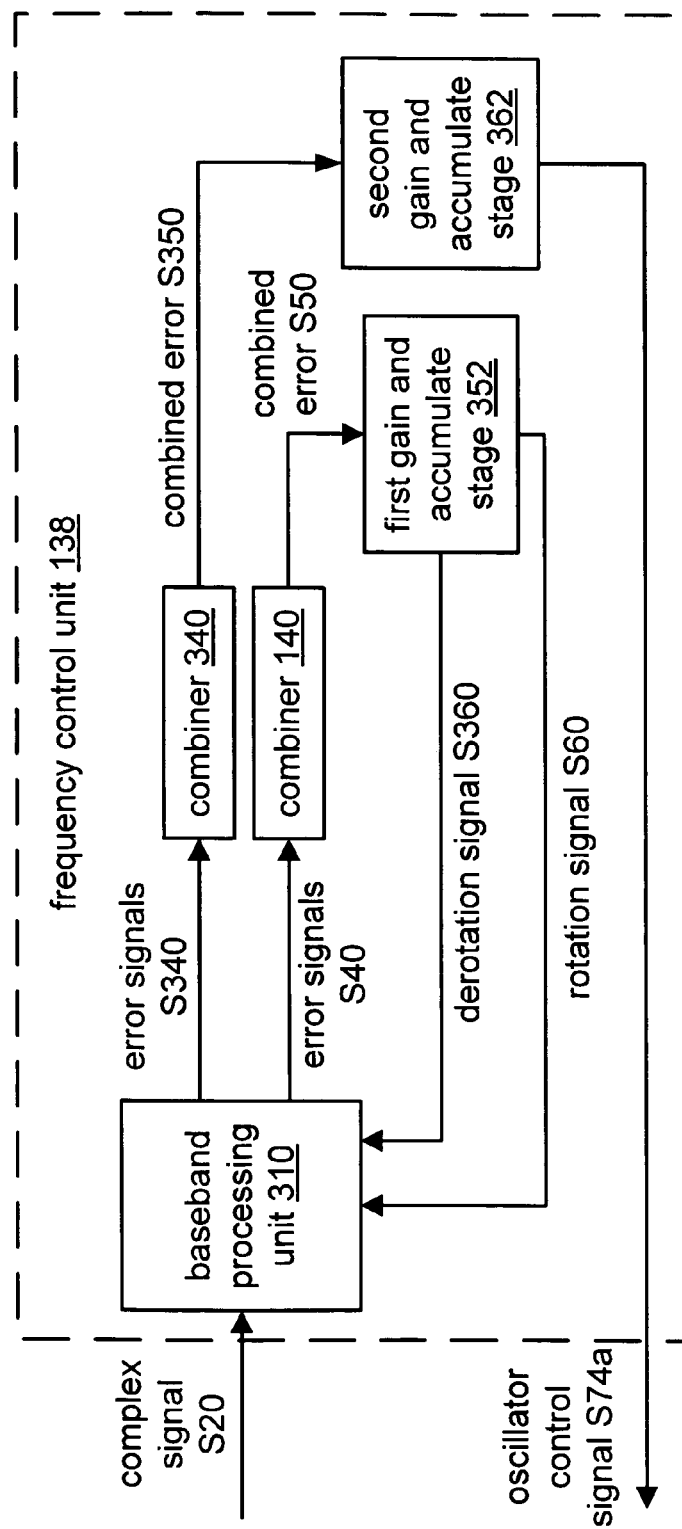
FIG. 20 shows a block diagram of an implementation 138 of frequency control unit 130.

In some finger architectures, it may not be feasible to supply an unrotated signal to the decoder. In such cases, an effective decoupling of the rotation and oscillator control loops may be achieved by calculating a frequency error for the oscillator control loop that is based on derotated symbols. FIG. 20 shows a block diagram of an implementation 138 of frequency control unit 130. An implementation 310 of baseband processing unit 300 receives complex signal S20 (which may be at or near baseband) and rotation signal S60 and outputs a plurality of error signals S40 based on these two inputs. Baseband processing unit 310 also outputs a plurality of error signals S340 based on a derotation signal S360. Combiner 140 combines the error signals S40 to obtain a combined error S50, and combiner 340 combines the error signals S340 to obtain a combined error S350. Based on combined error S50, an implementation 350 of first gain and accumulate stage 150 produces the rotation signal S60 and the derotation signal S360. An implementation 360 of second gain and accumulate stage 160 produces an implementation S74 of oscillator control signal S70 based on combined error S350.

FIG. 21a shows a block diagram of an implementation 310a of baseband processing unit 310 that includes a plurality of fingers 320a. Each of the fingers 320a is an implementation of finger 220a as described herein that is also configured to output a corresponding error signal S340 based on a derotation signal S360.

FIG. 21b shows a block diagram of an implementation 322a of finger 320a. Rotator 330 rotates decoded symbols S90 according to derotation signal S360 to produce derotated symbols S390. Rotator 330 may be implemented according to an embodiment of rotator 230 as described herein and may use the same lookup table as rotator 230. In one example, rotator 230 is implemented using dedicated hardware elements (e.g. multipliers), while rotator 330 is implemented as one of a plurality of routines executing on an array of logic elements (e.g. a microprocessor or digital signal processor).

Error calculator 350 is an implementation of error calculator 250 as described herein that calculates an error signal S340 based on the derotated symbols S390. Error calculators 250 and 350 may be similarly implemented such that error signals S40 and S340 have a similar dependence on signal strength. In such an embodiment, a bandwidth ratio between the rotation control loop and the VFO control loop may be preserved even if error signal S40 varies with signal amplitude.

FIG. 22a shows a block diagram of another implementation 310b of baseband processing unit 310. In this example, each of the fingers 320b is an implementation of finger 220b as described herein that is also configured to output a corresponding error signal S340 based on derotation signal S360. FIG. 22b shows a block diagram of an implementation 322b of finger 320b, which includes a rotator 330 that is configured to rotate decoded symbols S90 according to derotation signal S360 to produce derotated symbols S390. In one example, rotator 230 is implemented using dedicated hardware elements (e.g. multipliers), while rotator 330 is implemented as one of a plurality of routines executing on an array of logic elements (e.g. a microprocessor or digital signal processor). Rotators of two or more (possibly all) of the fingers of an implementation of baseband processing unit 300 may share a lookup table.

First gain and accumulate stage 350 is an implementation of first gain and accumulate stage 150 as described herein that is configured to output a derotation signal S360 based on a previous state of rotation signal S60. FIG. 23a shows a block diagram of an implementation 352 of first gain and accumulate stage 350, and FIG. 23b shows a block diagram of an implementation 354 of first gain and accumulate stage 350.

Combiner 340 is an implementation of combiner 140 as described herein. If combiner 140 calculates combined error S50 by weighting error signals S40, it may be desirable for combiner S340 to apply similar corresponding weights to its input signals (e.g. error signals S340) in calculating its output (e.g. combined error S350). Second gain and accumulate stage 360 is an implementation of second gain and accumulate stage 160 as described herein, with the second gain factor being selected according to e.g. the desired VFO loop response.

Other implementations of baseband processing unit 310 may obtain error signals S340 based on an unrotated version of complex signal S20. For example, such a unit may include fingers having instances of decoder 240 that decode symbols (e.g. based on the current or a previous version of the respective offset signal S210) from a version of complex signal S20 that does not pass through rotator 230, with the respective error calculator 350 being configured to calculate error signal S340 based on these unrotated decoded symbols.

It may be desirable to obtain an effective decoupling of the rotation and VFO control loops using an alternate configuration. For example, it may be desirable to obtain an error signal suitable for input to second gain and accumulate stage 360 (e.g. similar or equivalent to combined error S350) without performing a per-finger derotation operation or an additional per-finger decoding operation. Such an implementation may include performing a derotation operation on one or more combined signals (e.g. combined error S50) rather than per-finger rotations of decoded symbols S90.

In some applications of receiver 10, it may be desired to temporarily prevent oscillator control signal S70 from changing the output of VFO 190. For example, it may be desired to inhibit such a change during the execution of another operation based on frequency reference S30, such as reception or transmission of a signal via another RF chain of receiver 10 (e.g. a GPS signal reception). Such control may be achieved by setting oscillator control signal S70 to zero, by setting an input to second gain and accumulate stage 160 to zero and/or by preventing updates to a control register (for example, by deasserting a write enable signal of the control register) that is configured as described herein to receive oscillator control signal S70. In such an application, it may be desired to allow temperature compensation of VFO 190 to continue.

A mode of preventing oscillator control signal S70 from changing the output of VFO 190 may be initiated by a timer or upon execution of a reception (e.g. GPS reception) or transmission operation. Such a mode may also be initiated upon detection of a large change on rotation signal S60 (e.g. to stop excess error from entering the VFO loop), although preventing compensation of the error in the VFO loop may adversely affect the ability to track RF signal S10 (e.g. if the frequency error should exceed the slew rate of the rotation loop). Such a change may be indicated by a magnitude of the output of a low-pass filter on rotation signal S60, which filter may be implemented e.g. as part of first gain and accumulate stage 150 or of second gain and accumulate stage 160. A timing or control decision to enter such a mode may be based on e.g. a magnitude of residual error of the rotation control loop, sensitivity of a GPS receive chain to residual VFO error, one or more search schedules, and/or requirements of another RF chain of receiver 10 such as a transmit or other receive chain.

As noted herein, receiver 10 may include a receive chain that is relatively free of Doppler error arising from movement of the receiver (e.g. a GPS receive chain). Over time, however, the VFO control loop may begin to compensate for steady-state Doppler error. In some applications, it may be desirable for frequency control of VFO 190 to be temporarily based on a signal other than oscillator control signal S70 (e.g. to clear such Doppler error from the VFO loop). For example, it may be desired to switch control of VFO 190 to a signal derived from another receive chain, such as a GPS receive chain. Such a mode may be initiated upon detection of a large rate of change on rotation signal S60, upon execution of a GPS receive operation, and/or according to a timer.

As described herein, a two-loop frequency control configuration may be used to separate an average Doppler frequency error from a VFO error. However, it may also be desired to compensate for other frequency errors. In addition to the average Doppler error, for example, a receive chain may also experience path-specific Doppler errors. In a situation where receiver 10 is moving at high speed (e.g. in a fast car or aboard a high-speed train), and/or when complex signal S20 includes signals received from opposite directions (e.g. from a direction toward which receiver 10 is moving and from the opposite direction), different fingers may see very different Doppler errors.

In a further application of an implementation in which at least one finger includes a rotator, such a finger or fingers receive an additional rotation signal indicating a compensation for a frequency error (e.g. a Doppler error) unique to that finger. Thus, the actual rotation applied to a multipath instance may be based on other factors in addition to rotation signal S60. Such additional compensation may be applied by the corresponding rotator 230 (e.g. may be combined with rotation signal S60 for that finger), and/or the signal path may include another instance of rotator 230 to apply such additional rotation. It may be desirable for a derotation signal S360 as applied to a finger to account for (e.g. also remove) such additional rotation.

In a further application, rotation of complex signal S20 according to rotation signal S60 may be temporarily disabled. Such disabling may be used, for example, if it is desired to use rotator(s) 230 for another task (e.g. to compensate path-specific Doppler errors, such as during high-speed movement of receiver 10). It may be desired to enter such a mode during a period when another RF chain of receiver 10 is inactive.

In such an application of rotation disabling, combined error S50 may be directed to second gain and accumulate stage 160 for VFO control, or the output (e.g. rotation signal S60) of first gain and accumulate stage 150 may be redirected to serve as oscillator control signal S70, with the relevant stage possibly being configured to apply a different fixed and/or adjustable gain factor. Alternatively, control of the VFO loop may be switched during such an application to a parallel branch having a further instance of a gain and accumulate stage (e.g. receiving combined error S50 and outputting oscillator control signal S70). Implementation of such a mode may include, e.g., setting rotation signal S60 to zero or otherwise preventing rotator(s) 230 from applying a rotation based on rotation signal S60. For an implementation that includes derotation signal S360, it may also be desirable in such an application to also set derotation signal S360 to zero or otherwise prevent rotator 430 from applying derotation signal S360.

In one application of a receiver 12 as shown in FIG. 1b, RF front end 110a is configured to receive a CDMA signal, and the receiver is configured to derive oscillator control signal S70 from the CDMA signal. In another application of such a receiver, RF front end 110a is configured to receive a GPS signal, and the receiver is configured to derive oscillator control signal S70 from the GPS signal.

In a further application of a receiver 12, downconverter 120a is configured to output a complex digital signal based on a CDMA signal to an instance 130a of frequency control unit 130, and downconverter 120b is configured to output a complex digital signal based on a GPS signal to an instance 130b of frequency control unit 130. Each of the frequency control units 130a, 130b is configured to calculate an instance of oscillator control signal S70 based on the respective complex digital signal, and the receiver includes decision logic configured to determine which instance of oscillator control signal S70 to apply to VFO 190.

The receiver may be configured to select an instance of oscillator control signal S70 according to an operating mode of the receiver. In one such implementation, the instance of S70 that corresponds to the GPS signal is used to control VFO 190 during GPS reception, and the instance of S70 that corresponds to the CDMA signal is used otherwise. Alternatively, the selection may be based on relative strengths of the GPS and CDMA signals and may be reevaluated dynamically according to a time interval or other event. In an open outdoor space, for example, a received instance based on a GPS signal may have more signal energy than the strongest received instance of a CDMA signal, and the receiver may be configured to select the instance of S70 corresponding to the GPS signal on that basis.

Figure 24:
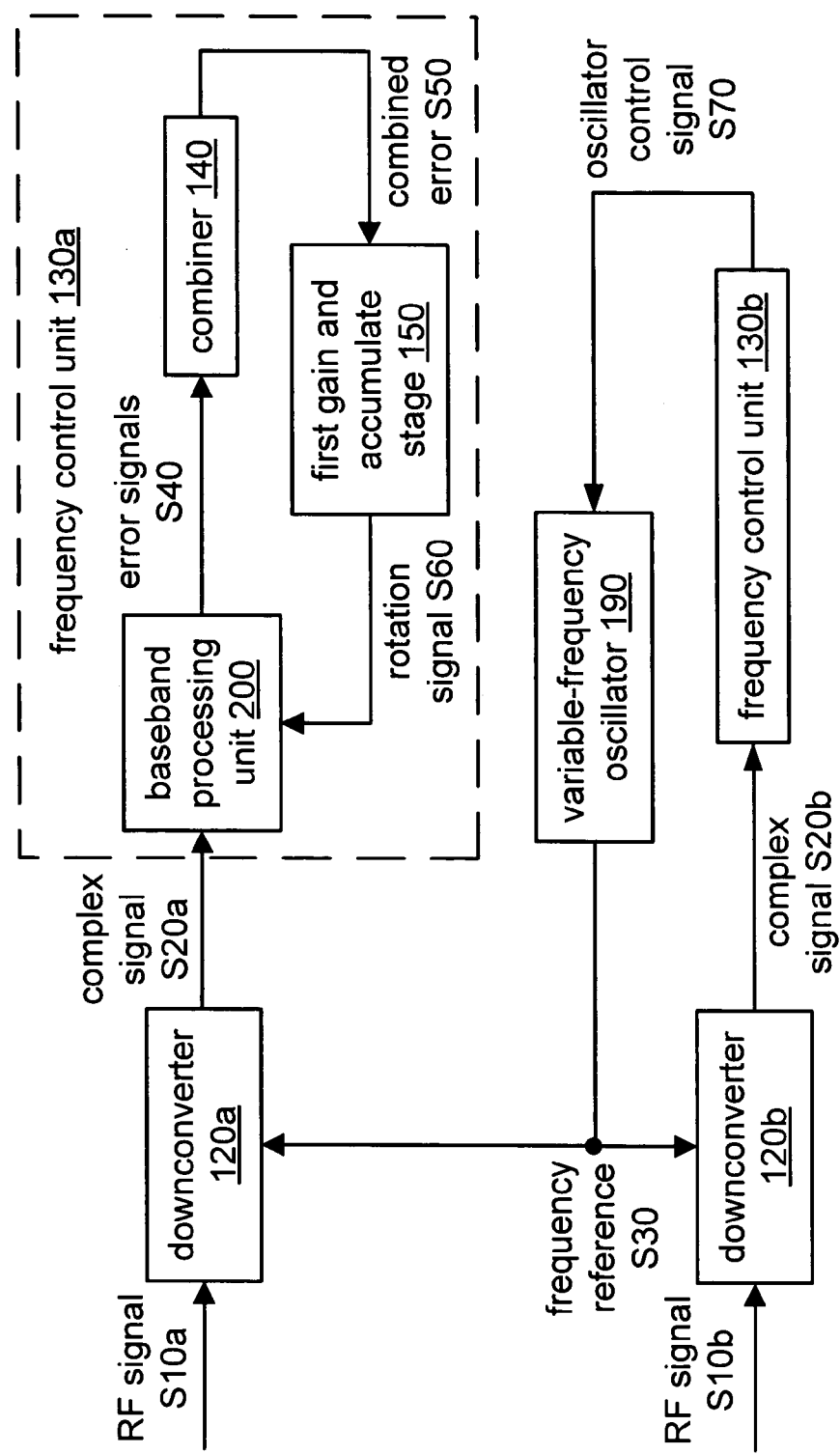
FIG. 24 shows a block diagram of a receiver according to an embodiment.

FIG. 24 shows a block diagram of a receiver according to an embodiment in which each of the two downconverters 120a, 120b outputs a complex digital signal to a respective frequency control unit. Frequency control unit 130a is configured to calculate a rotation signal S60 derived from complex signal S20a. Frequency control unit 130b, which may be implemented according to any of the implementations of frequency control unit 130 as described herein, is configured to calculate oscillator control signal S70 derived from complex signal S20b. In some applications, frequency control unit 130b is implemented to include only an oscillator control loop. In one example, RF signal S10a is received from a CDMA base station, and RF signal S10b is received from a GPS SV.

As noted herein, frequency reference S30 may also serve as a time reference for receiver 10. A sampling clock used by a downconverter 120 to produce a digital signal S20, for example, may be derived from frequency reference S30. An error in the frequency of frequency reference S30 may therefore also cause an error in the timing of complex signal S20. While a frequency error in complex signal S20 may be reduced or corrected by rotating values of complex signal S20 accordingly, such rotation is not effective to correct errors in timing. Embodiments include arrangements in which timing information derived from a first RF signal having a first carrier frequency is applied to reduce or correct a timing error in a digital signal based on the first RF signal and/or to reduce or correct a timing error in a digital signal based on a second RF signal having a different carrier frequency.

Figure 25A:
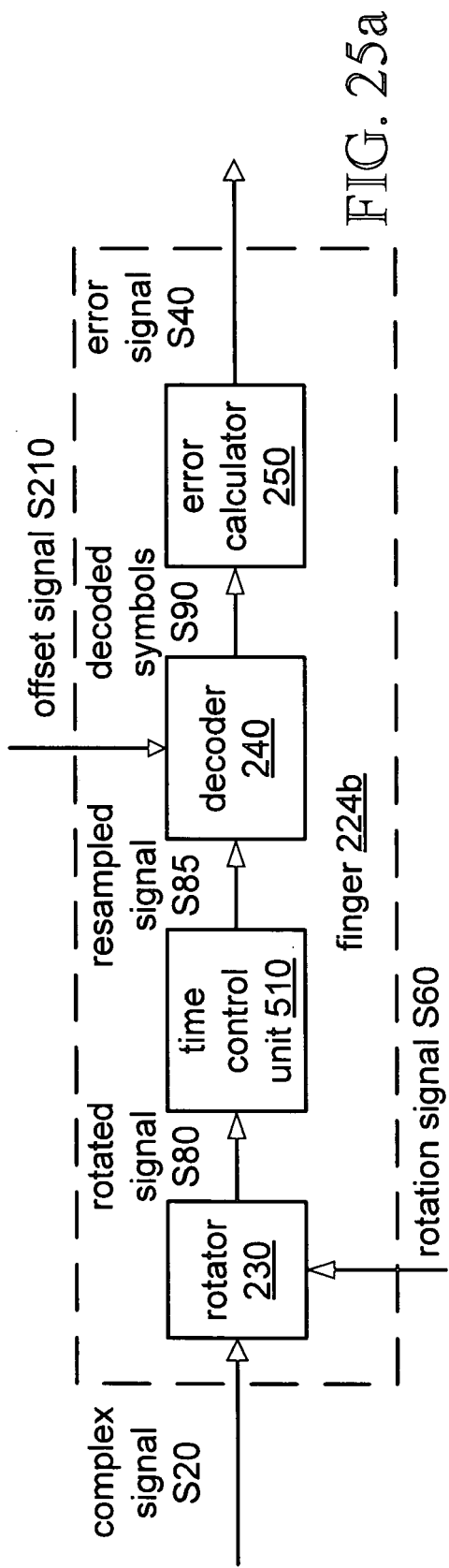
FIG. 25a shows a block diagram of an implementation 224b of finger 222b.
Figure 25B:
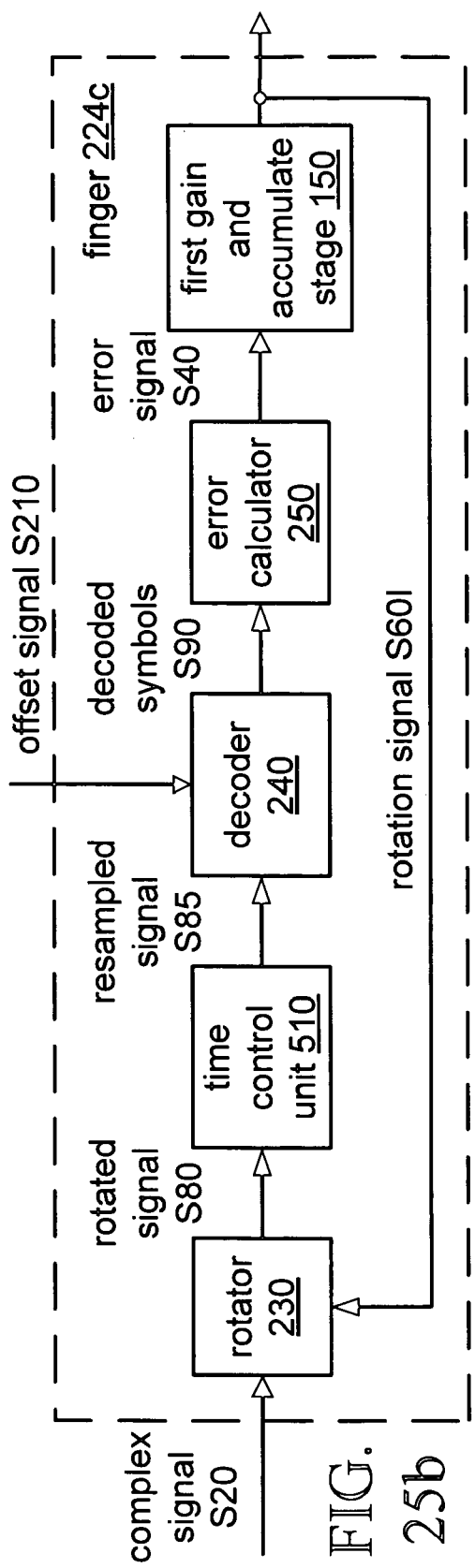
FIG. 25b shows a block diagram of an implementation 224c of finger 220c.

Some arrangements are configured to perform a resampling of the digital signal to correct a timing error. FIG. 25a shows a block diagram of an implementation 224b of finger 222b that includes a time control unit 510 configured to calculate a resampled signal S85 based on rotated signal S80. FIG. 25b shows a block diagram of an implementation 224c of finger 220c that includes such a time control unit 510. FIG. 25c shows a block diagram of an implementation 224a of finger 222a that includes a time control unit 510.

Time control unit 510 may be implemented to include a delay-locked loop (DLL). FIG. 26a shows a block diagram of an implementation 512 of time control unit 510. Resampler 520 receives a digital signal (for example, rotated signal S80 or a complex signal S20) and resamples the signal according to filtered error signal S520 to produce resampled signal S85. Decoders 240E and 240L decode early and late versions, respectively, of the resampled signal and output decoded symbols S90E, S90L to respective energy calculators 530E, 530L. Each of the energy calculators 530 is configured to calculate a measure of the energy of the respective decoded symbol stream, for example, as the squared magnitude of a complex input value. Loop filter 540 receives error signal S510 as a difference between the energy measures and calculates filtered error signal S520. Loop filter 540 may be implemented as a first- or other low-order IIR or FIR filter. For example, loop filter 540 may be implemented according to an example of first gain and accumulate stage 150 as described herein.

Resampler 520 may be configured to select from an oversampled input stream. For an input stream that is oversampled at a rate of m times the chip rate, for example, resampler 520 may be configured to select and output one of the m samples during each chip period based on the relative location of a previously selected sample, as modified according to filtered error signal S520. Resampler 520 may also be implemented to calculate an average or weighted average of samples in a neighborhood of the selected sample. Alternatively, resampler 520 may be configured to calculate an interpolated value from two or more samples according to filtered error signal S520. Such interpolation may be performed on a stream that is sampled at the chip rate or on an oversampled stream.

Decoders 240E and 240L are configured to perform advanced and delayed decoding, respectively, of resampled signal S85 according to offsets of some fraction of a chip period, such as +/−½ chip or +/−¼ chip. In one implementation, resampler 520 is configured to output early and late versions of resampled signal S85 to the decoders 240E, L. In this case, the decoders may be configured to decode the respective versions according to offset signal S210. In another implementation, decoders 240E and 240L are configured to apply respective early and late versions of offset signal S210 to resampled signal S85.

Figure 26B:
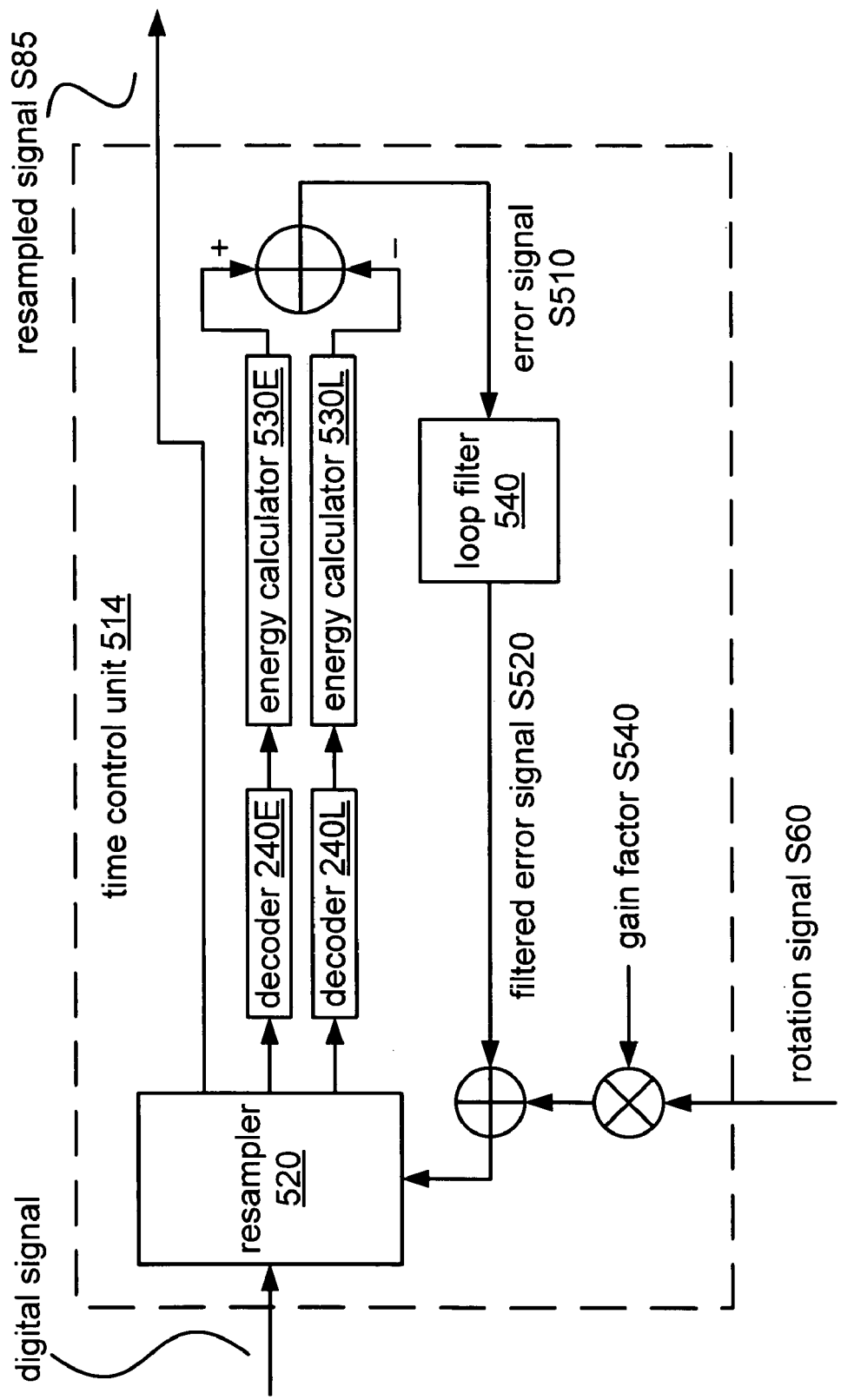
FIG. 26b shows a block diagram of an implementation 514 of time control unit 510.

Implementations of frequency control unit 130 may also be configured to apply rotation signal S60 to reduce or correct a timing error. FIG. 26b shows a block diagram of an implementation 514 of time control unit 510. In this example, resampler 520 resamples the digital signal according to a weighted sum of filtered error signal S520 and rotation signal S60. In one configuration, a rotation signal S60 based on a frequency error of a particular received instance is used, such as rotation signal S60I. In another configuration, a rotation signal S60 based on a combined frequency error is used, such as rotation signal S60C.

Figures 27A, 27B:
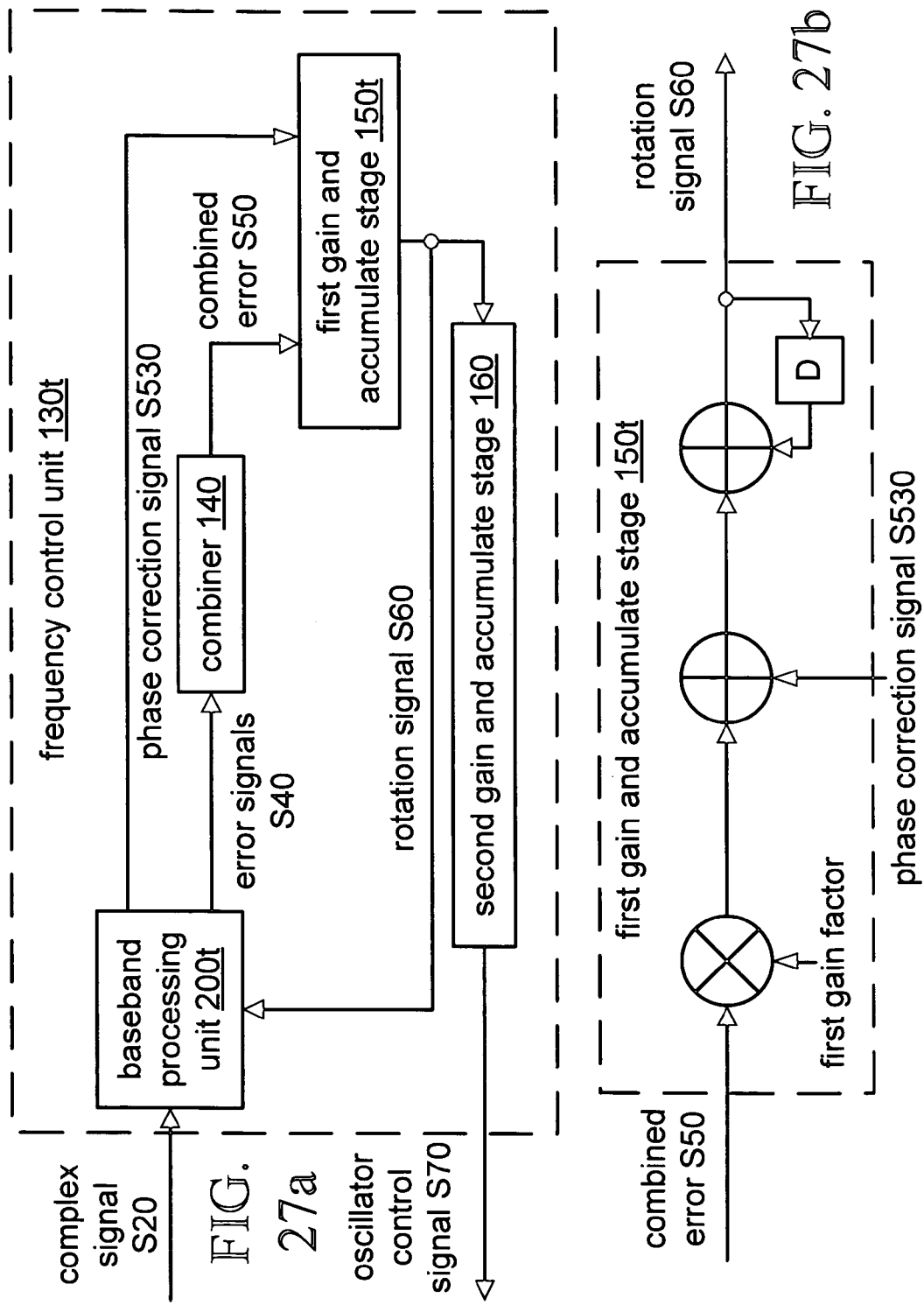
FIG. 27a shows a block diagram of an implementation of a frequency control unit.
FIG. 27b shows a block diagram of an implementation of first gain and accumulate stage 150t.

FIG. 27a shows a block diagram of an implementation 130t of frequency control unit 130. Frequency control unit 130t includes an implementation 200t of baseband processing unit 200 that includes a searcher 210 coupled to a set of fingers 224a or 224b as described above. (Another implementation of frequency control unit 130t is adapted to a baseband processing unit 200t configured to include a set of fingers 224c.) Baseband processing unit 200t is configured to output a phase correction signal S530 based on one or more error signals (e.g. filtered error signals S520) from the time control units 510 of the fingers. For example, phase correction signal S530 may be based on the filtered error signal S520 corresponding to the strongest received instance, or may be an average or weighted average of error signals from the time control units of the active (e.g. locked) fingers.

Fingers of baseband processing unit 200t may include other implementations of time control unit 510 that are configured according to principles described, for example, in Sindhushayana, U.S. Publ. Pat. Appl. No. 2003/0186666, entitled "FREQUENCY-TIMING CONTROL LOOP FOR WIRELESS COMMUNICATION SYSTEMS," published Oct. 2, 2003. FIG. 27b shows a block diagram of an implementation of first gain and accumulate stage 150t that is configured to calculate rotation signal S60 based on phase correction signal S530. In a further implementation of frequency control unit 130, these principles of applying a phase correction signal to a first gain and accumulate stage are used with an implementation of baseband processing unit 300 having fingers with time control units 510.

Figure 28:
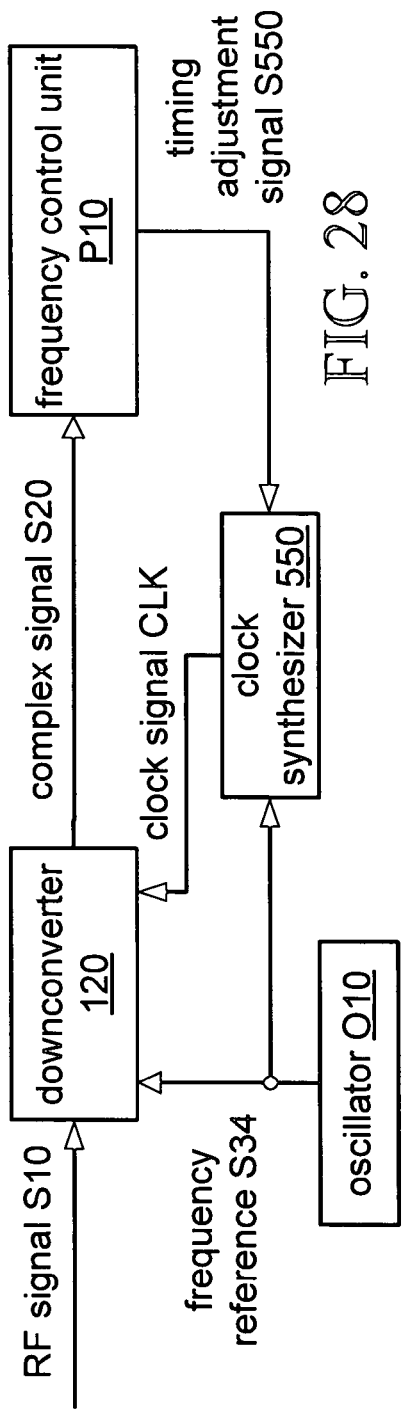
FIG. 28 shows a block diagram of a receiver that includes an implementation P10 of frequency control unit 130.

Other embodiments are arranged to adjust a timing of a sampling process according to information derived from an RF signal. FIG. 28 shows a block diagram of a receiver that includes an implementation P10 of frequency control unit 130. Frequency control unit P10, which may be configured according to any of the implementations of frequency control unit 130 as described herein, is arranged to output a timing adjustment signal S550 to a clock synthesizer S550. In some configurations, timing adjustment signal S550 is a frequency correction signal (for example, oscillator control signal S70) or is derived from such a signal. In other configurations, timing adjustment signal S550 is based on a time correction signal (for example, phase correction signal S530) or is derived from such a signal.

Oscillator O10 is configured to output an implementation S34 of frequency reference S30. Oscillator O10 may be implemented as variable-frequency oscillator 190 or, alternatively, as a fixed-frequency oscillator such as an XO or TCXO. Clock synthesizer 550 is configured to produce a sampling clock signal CLK based on timing adjustment signal S550 and frequency reference S34. For example, clock synthesizer 550 may be configured to derive a clock signal from frequency reference S34 and to expand or shrink a period of that clock signal according to timing adjustment signal S550. For a case in which clock synthesizer 550 is implemented as a PLL, timing adjustment signal S550 may be added into the loop as a phase correction. For a case in which clock synthesizer 550 is implemented as a dynamic M/N or M/N:D counter (e.g., as described in U.S. patent application Ser. No. 11/269,360 to Filipovic et al., entitled "Wireless Device with a Non-Compensated Crystal Oscillator"), timing adjustment signal S550 may be used to calculate values of M and N for the counter. Clock synthesizer 550 is also arranged to supply the sampling clock signal CLK to downconverter 120 (e.g., to one or more ADCs or resamplers of downconverter 120). Clock synthesizer 550 may be implemented as one or more PLLs or other clock generating circuits such as dynamic MIN or M/N:D counters.

Figure 29:
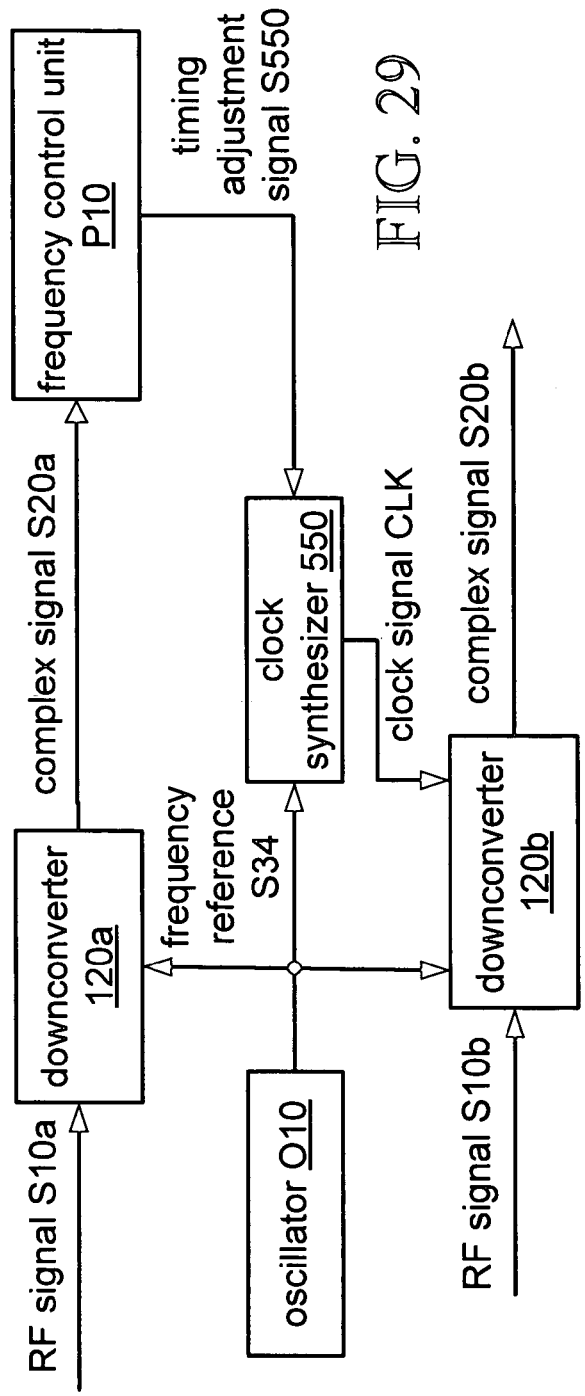
FIG. 29 shows an example of a receiver configured to transfer timing adjustment information.

FIG. 29 shows an example of a receiver configured to transfer timing adjustment information from one receiver chain to another. In this example, clock synthesizer 550 provides clock signal CLK to downconverter 120b (e.g. to one or more ADCs or resamplers of downconverter 120b). Timing adjustment signal S550 as calculated by frequency control unit P10 is based on an RF signal S10a having a first carrier frequency. According to clock signal CLK, downconverter 120b is configured to produce a complex signal S20b that is based on an RF signal S10b having a carrier frequency different than the first carrier frequency. In a typical application, one of RF signals S10a and S10b is received from a CDMA base station, and the other of RF signals S10a and S10b is received from a GPS SV.

Another implementation of a receiver as shown in FIG. 29 is a transceiver that includes, instead of or in addition to downconverter 120b, an upconverter configured to produce an RF signal based on complex signal S20b and according to frequency reference S34 and clock signal CLK.

Figure 30:
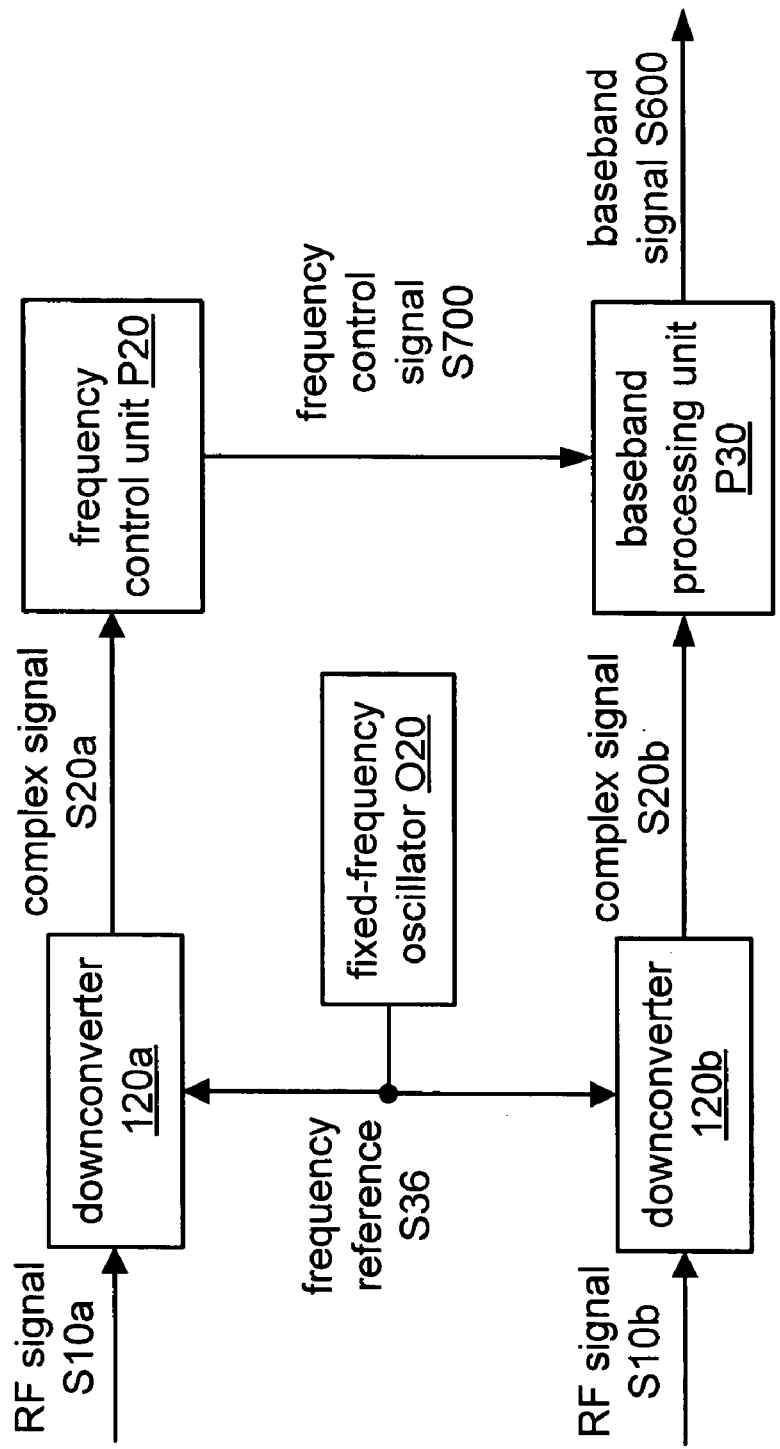
FIG. 30 shows a block diagram of a receiver according to an embodiment.

As noted above, inventive principles as described herein may be applied to configurations in which the oscillator is free-running. FIG. 30 shows a block diagram of a receiver according to an embodiment that includes a fixed-frequency oscillator O20 (such as an XO or TCXO) configured to produce an implementation S36 of frequency reference S30 and an implementation P20 of frequency control unit 130. Frequency control unit P20, which may be configured according to any of the implementations of frequency control unit 130 as described herein, is arranged to output a frequency control signal S700. Based on an RF signal S10a having a first carrier frequency, frequency control signal S700 relates to a frequency error of oscillator O20.

Frequency control unit P20 may be configured to transfer a frequency correction based on a long-term average frequency error. For example, frequency control unit P20 may be configured to transfer information relating to a frequency correction that is due to effects of temperature on the frequency of frequency reference S36 and to filter out frequency errors in RF signal S10a that are due to Doppler effects.

Baseband processing unit P30 is configured to produce, according to frequency control signal S700, a baseband digital signal S600 based on RF signal S10b. Baseband processing unit P30 may be configured according to any of the implementations of baseband processing unit 200 or 300 as described herein. For example, baseband processing unit P30 may be configured to rotate samples of complex signal S20b according to frequency control signal S700. Baseband digital signal S600 may include a stream of data symbols such as decoded data symbols S250 as described herein. In one example, RF signal S10b is received from a CDMA transmitter. In another example, RF signal S10b is received from a GPS SV.

Figure 31:
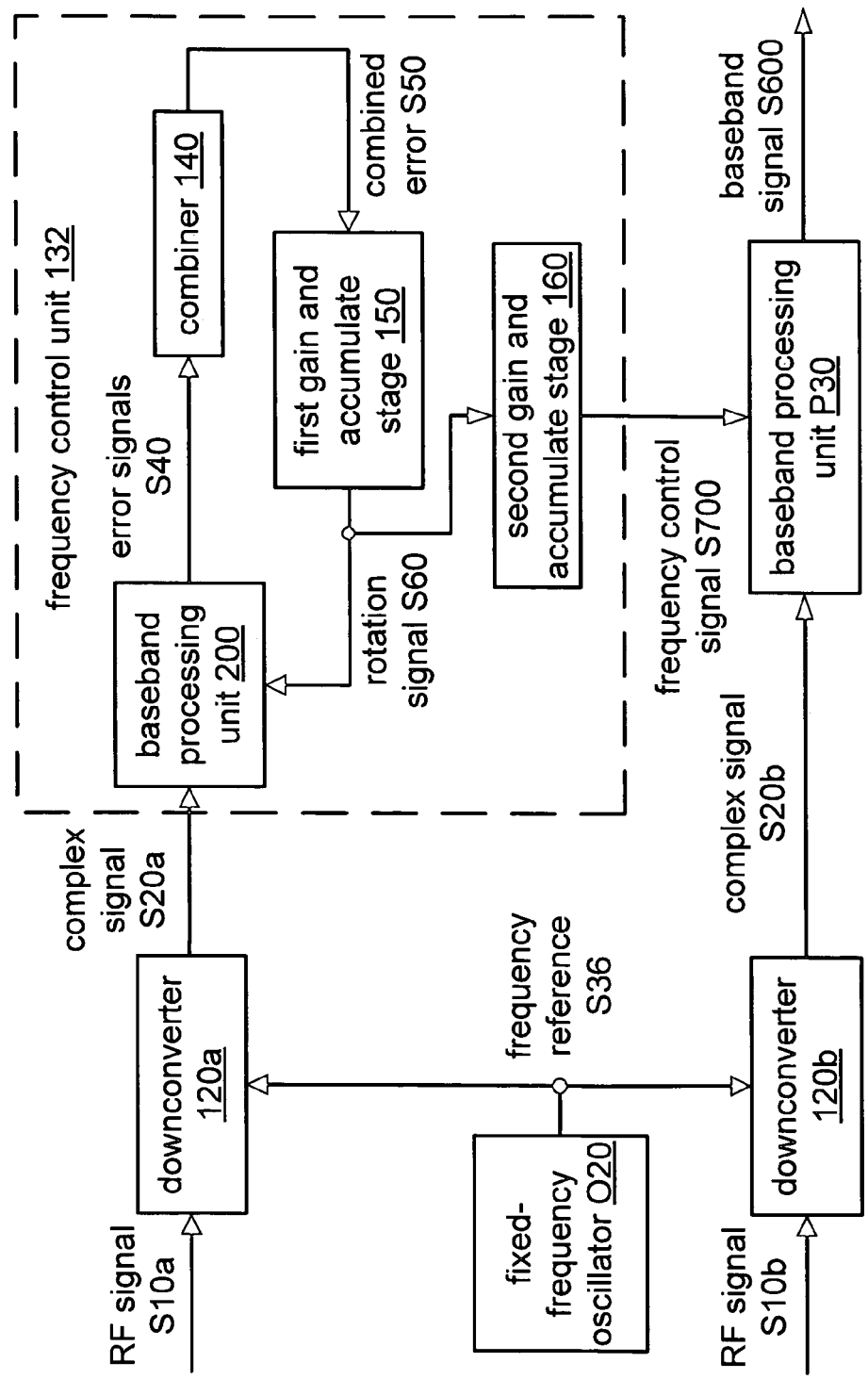
FIG. 31 shows a block diagram of an implementation of a receiver.

FIG. 31 shows a block diagram of an implementation of a receiver in which the output signal of an implementation of second gain and accumulate stage 160 as described herein is directed to baseband processing unit P30 as frequency control signal S700. Other implementations as described herein may also be used to transfer a time correction signal (for example, phase correction signal S500) from a frequency control unit of one receiver chain to a baseband processing unit of the other receiver chain.

Another implementation of a receiver as shown in FIG. 31 is a transceiver that includes, instead of or in addition to downconverter 120b, an upconverter configured to produce an RF signal based on complex signal S20b and according to frequency reference S36. In this example, a baseband processing unit is configured to produce complex signal S20b based on baseband signal S600 (e.g. by applying a spreading code) and according to frequency control signal S700 (e.g. by applying a rotation). A receiver or transceiver having a free-running oscillator may also be configured to apply frequency control signal S700 (or a signal based on frequency control signal S700) to a frequency synthesizer providing an LO signal to an upconverter or downconverter as described herein. In a case where the frequency synthesizer includes a PLL, for example, frequency control signal S700 or a signal based thereon may be added into the loop as a phase correction.

Figure 32:
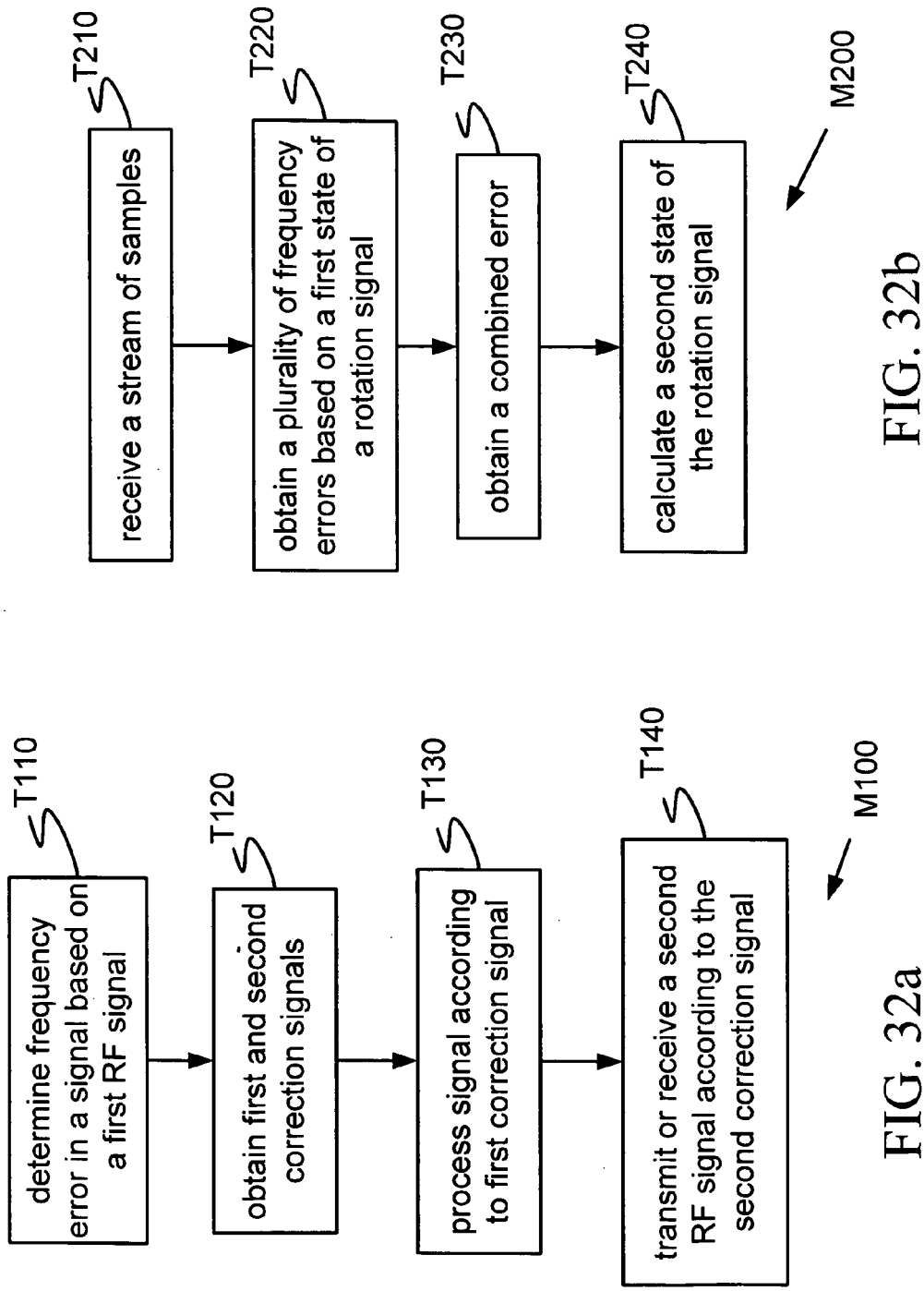
FIGS. 32a and 32b show flowcharts of methods M100 and M200 according to embodiments.

The foregoing presentation of the described embodiments is provided to enable any person skilled in the art to make or use the present invention. Various modifications to these embodiments are possible, and the generic principles presented herein may be applied to other embodiments as well. For example, FIGS. 32a and 32b show flowcharts of methods M100 and M200, respectively, according to embodiments. It is noted that further versions of such methods, as well as additional methods, are expressly disclosed herein, e.g., by descriptions of the operations of structural embodiments. Such a method may also be embodied as one or more sets of instructions readable and/or executable by a machine including an array of logic elements (e.g. a processor, microprocessor, microcontroller, or other finite state machine).

In method M100, task T110 determines a frequency error (e.g. combined error S50) in a signal that is based on a first RF signal (e.g. complex signal S20). Task T120 obtains first and second correction signals (e.g. rotation signal S60 and oscillator control signal S70) based on the frequency error. Task T130 processes (e.g. rotates) the signal according to the first correction signal. Task T140 transmits or receives a second RF signal according to the second correction signal. Further embodiments include generating one or more local oscillator signals based on the second correction signal.

In method M200, task T210 receives a stream of samples (e.g. complex signal S20). Task T220 obtains a plurality of frequency errors based on the stream of samples and a first state of a rotation signal. Task T230 obtains a combined error (e.g. based on more than one of the plurality of frequency errors). Task T240 calculates a second state of the rotation signal (e.g. based on the combined error). Further embodiments include producing an oscillator control signal based on the stream of samples.

In elements that include operations such as addition, multiplication, and/or shift (e.g. combiner 140, rotator 230, error calculator 250), such operations may be implemented using fixed gates and signal paths, and/or gates or signal paths that are shared with other elements, and/or instructions executable by an array of logic elements such as a microprocessor or digital signal processor (which instructions may include routines that are shared with other elements). It is expressly contemplated that a structure as described herein may also be implemented as a routine or set of instructions to perform the specified operation.

In an embodiment that includes more than one instance of an element such as rotator 230, decoder 240, error calculator 250, etc., different implementations of such element as described herein may be used from one instance to another. For example, it may be desired for an embodiment to include rotators having different resolutions of rotation angle, or decoders having different integration periods (which may be coherent or noncoherent), etc. A single hardware and/or software implementation of an element may also support more than one instance of an element, e.g. at different times. For example, a combiner implementation may be used as combiner 140 during one period and as combiner 340 during another period.

It is noted that in the attached drawings, boundaries of elements and modules are indicated for example and convenience only, and are not intended to enforce any physical boundaries. Elements of receiver 10 may be implemented in one chip or across more than one chip. Likewise, elements of frequency control unit 130 may be implemented in one chip or across more than one chip. In a case where the implementation includes portions of more than one chip, one or more of the chips may also support one or more other operations (such as a control, processing, local oscillator generation, etc. operation for a different receive and/or transmit path).

Doppler error in the received signal may result in both carrier Doppler errors and code Doppler errors. For successful signal acquisition, tracking, demodulation, and/or generation, it may be desirable to track both carrier and code Doppler. As described herein, embodiments may be configured to apply one or more rotations to track out frequency error such as carrier Doppler error and to generate another control signal (such as oscillator control signal S70 or frequency control signal S700) to track out remaining errors in time and/or frequency. A first receiver chain generating these corrections may also include one or more time-tracking loops (such as one or more delay-locked loops) to handle any residual code Doppler on its received signal and/or may adapt one or more rotation signals for time tracking. A second receiver chain may include its own Doppler correction but may still benefit from oscillator correction applied by the first receiver chain (for example, via oscillator control signal S70 or frequency control signal S700).

As described herein, an implementation of frequency control unit 130 configured to process a CDMA signal may include one or more rotators or time control units (e.g., code-tracking loops such as delay-locked loops) arranged to correct for errors in the received signal. A signal received from a GPS SV has its own noise sources, and a receiver chain for GPS reception may also include an implementation of frequency control unit 130 having one or more rotators or time control units. In some cases, GPS Doppler error information may be received from an external source such as a position determination entity (PDE), possibly over a CDMA link, and a GPS implementation of frequency control unit 130 may be arranged to correct for Doppler error according to this information.

Figure 33:
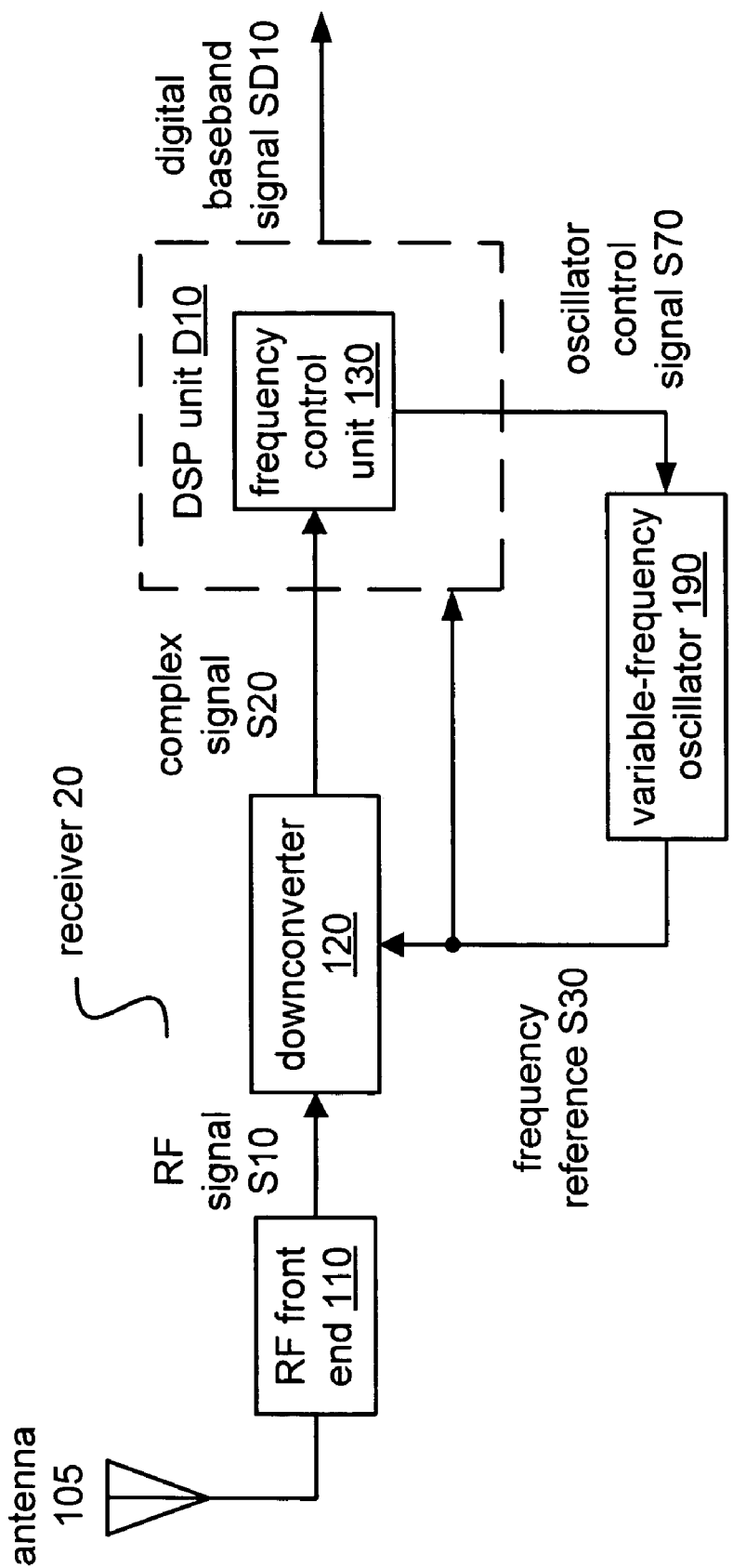
FIG. 33 shows a block diagram of an implementation 20 of a receiver.

As noted herein, frequency reference S30 may also serve as a time reference for a receiver. FIG. 33 shows a block diagram of a receiver 20 that includes a digital signal processing (DSP) unit D10 configured to produce a digital baseband signal SD10 based on complex signal S20. DSP unit D10 includes an instance of an implementation D130 of frequency control unit 130 as described herein that is implemented as one or more sets of instructions executable by DSP unit D10. DSP unit D10 may be configured to produce digital baseband signal SD10 by performing one or more operations (such as decoding, deinterleaving, and/or decompression) on a stream of symbols as outputted by the instance of frequency control unit 130 (e.g. a stream of decoded data symbols as described with reference to FIG. 8b).

In this example, DSP unit D10 is configured to receive frequency reference S30 from variable-frequency oscillator 190. For example, frequency reference S30, or a clock signal based on frequency reference S30, may be applied to a clock input of DSP unit D10. In another example, DSP unit D1 is configured to apply frequency reference S30 (or a clock signal based on frequency reference S30) to generate or retrieve one or more reference code sequences and to use such sequence or sequences to acquire or track a multipath instance and/or to despread or dechannelize symbols carried by complex signal S20.

Figure 34:
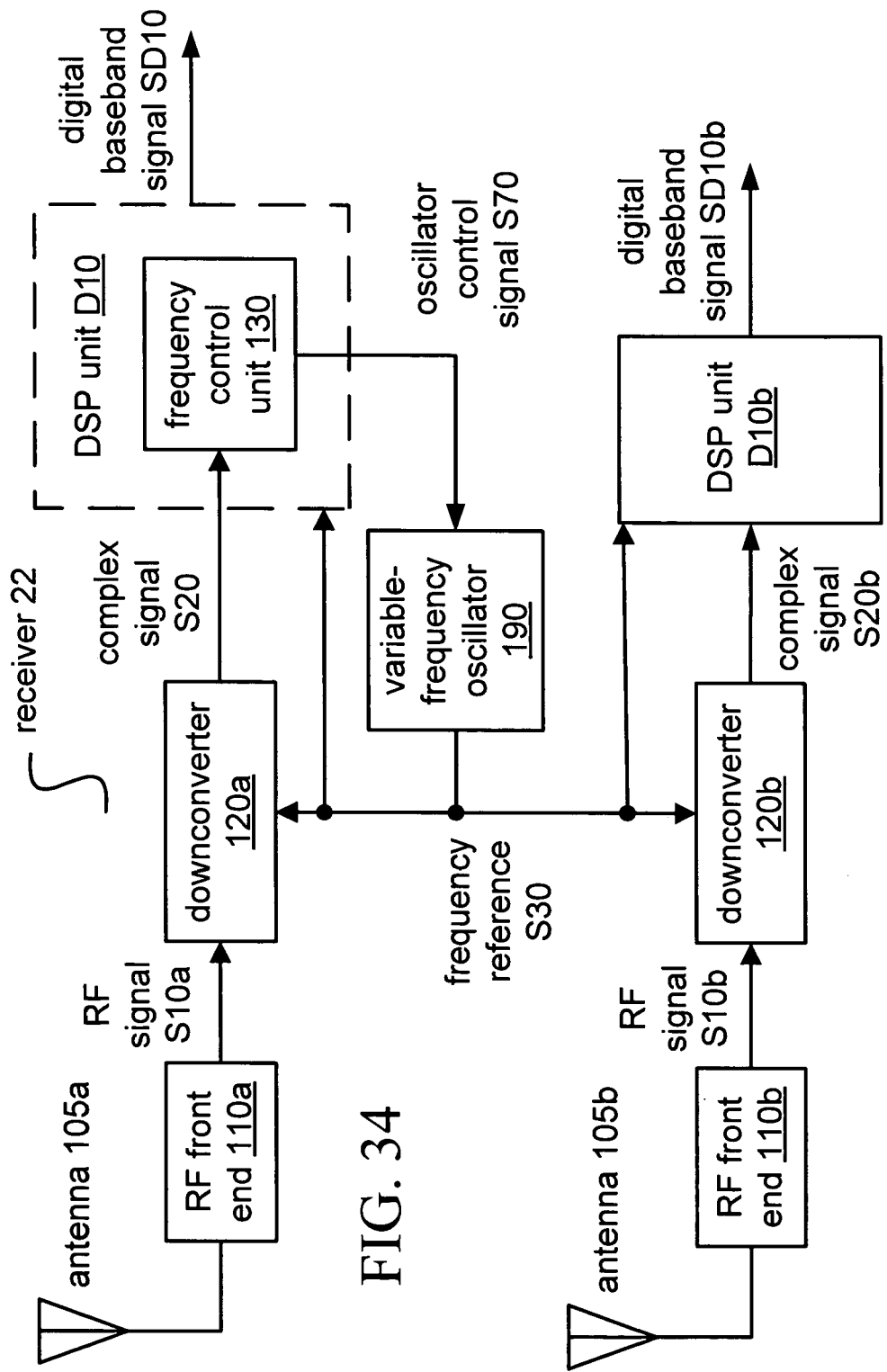
FIG. 34 shows a block diagram of an implementation 22 of a receiver.

FIG. 34 shows a block diagram of an implementation 22 of receiver 20 that also includes a DSP unit D10b configured to produce a digital baseband signal SD10b based on complex signal SD20b. For example, DSP unit D10b may be configured to perform operations of a RAKE receiver as described above. DSP unit D10b may also be configured to produce digital baseband signal SD10b by performing one or more operations (such as decoding, deinterleaving, and/or decompression) on a stream of despread and/or dechannelized symbols.

In this example, DSP unit D10b is configured to receive frequency reference S30 from variable-frequency oscillator 190. For example, frequency reference S30, or a clock signal based on frequency reference S30, may be applied to a clock input of DSP unit D10b. In another example, DSP unit D10b is configured to apply frequency reference S30 (or a clock signal based on frequency reference S30) to generate or retrieve one or more reference code sequences and to use such sequence or sequences to acquire or track a multipath instance and/or to despread or dechannelize symbols carried by complex signal S20b.

Figure 35:
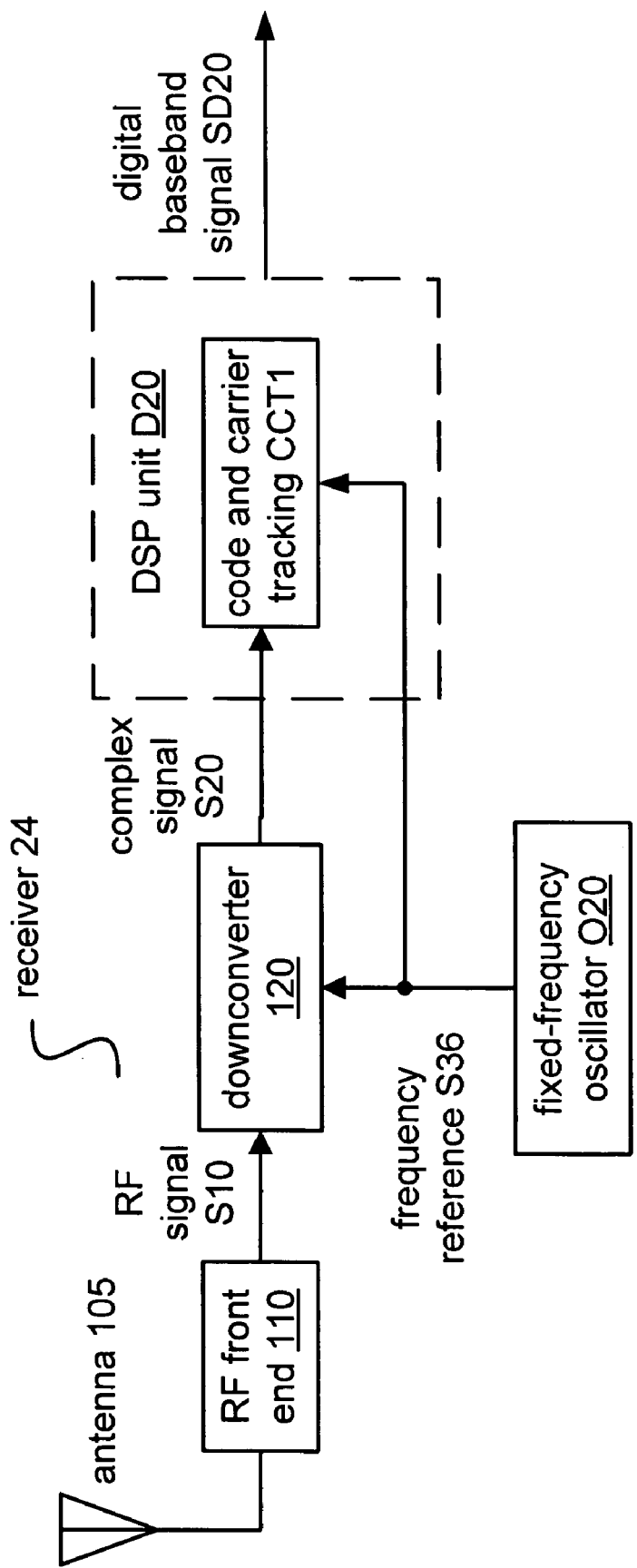
FIG. 35 shows a block diagram of an implementation 24 of a receiver.

FIG. 35 shows a block diagram of a receiver 24 in which fixed-frequency oscillator O20 provides frequency reference S36 to a code and carrier tracking block CCT1 implemented as one or more sets of instructions configured to execute on a DSP unit D20 and to receive complex signal S20. Code and carrier tracking block CCT1 may include one or more rotation loops as described herein and/or other carrier tracking logic. Code and carrier tracking block CCT1 may also include one or more delay-locked loops as described herein and/or other code tracking logic. In one example, block CCT1 is implemented as an instance of frequency control unit 130. DSP unit D20 may be configured to produce digital baseband signal SD20 by performing one or more operations (such as decoding, deinterleaving, and/or decompression) on a stream of despread and/or dechannelized symbols based on complex signal S20. In some implementations, code and carrier tracking block CCT1 is configured to output the stream of despread and/or dechannelized symbols.

Code and carrier tracking block CCT1 is also configured to receive frequency reference S36 from fixed-frequency oscillator O20. For example, code and carrier tracking block CCT1 may be configured to apply frequency reference S36 (or a clock signal based on frequency reference S36) to generate or retrieve one or more reference code sequences and to use such sequence or sequences to acquire or track a multipath instance and/or to despread or dechannelize symbols carried by complex signal S20.

Figure 36:
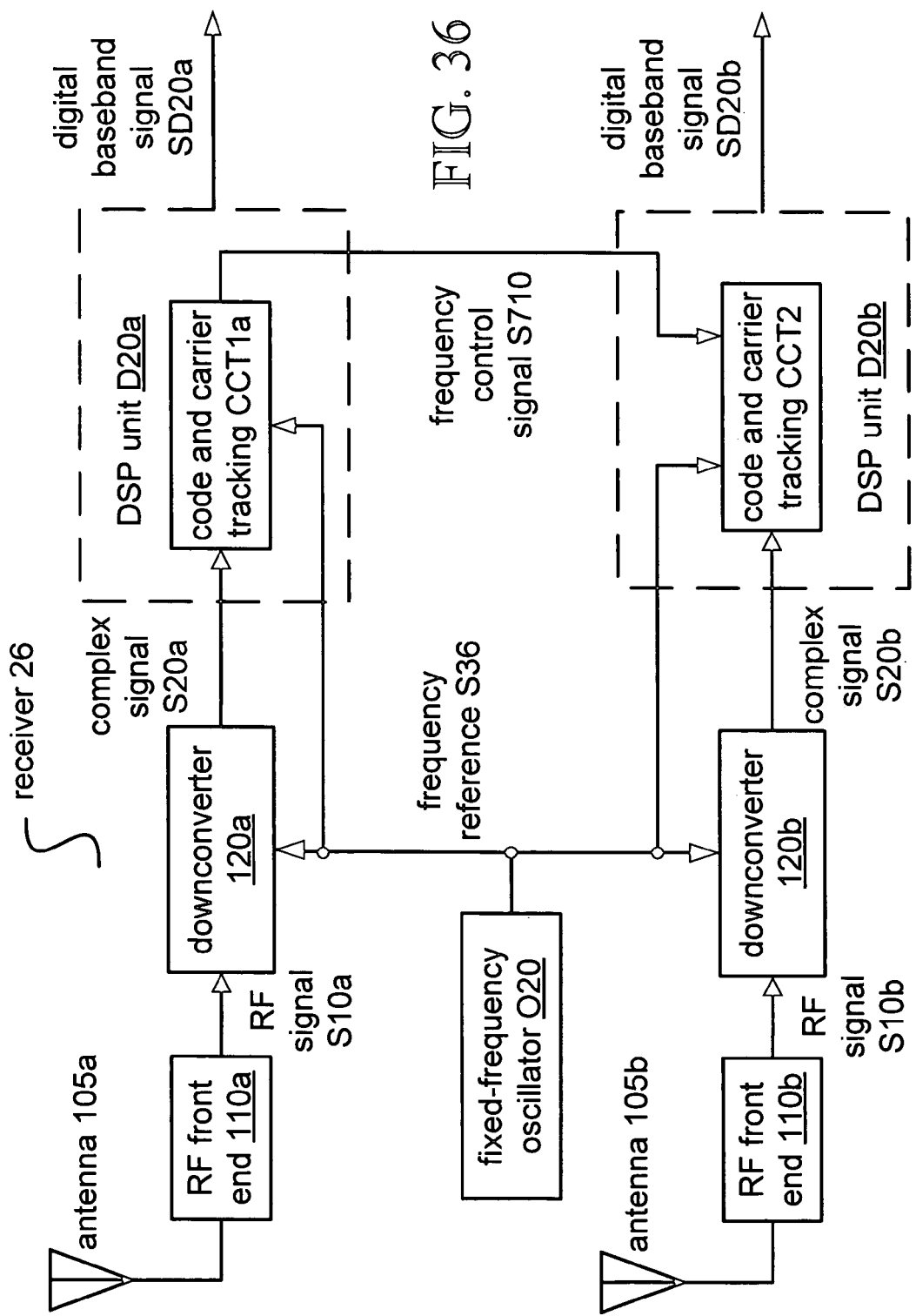
FIG. 36 shows a block diagram of an implementation 26 of a receiver.

FIG. 36 shows a block diagram of an implementation 26 of receiver 24 that includes a code and carrier tracking block CCT2 implemented as one or more sets of instructions configured to execute on a second DSP unit D20b and configured to receive a second complex signal S20b based on a second RF signal S10b having a different carrier frequency than RF signal S10a.

Code and carrier tracking block CCT2 is configured to receive frequency reference S36 from fixed-frequency oscillator O20. For example, code and carrier tracking block CCT2 may be configured to apply frequency reference S36 (or a clock signal based on frequency reference S36) to generate or retrieve one or more reference code sequences and to use such sequence or sequences to acquire or track a multipath instance and/or to despread or dechannelize symbols carried by complex signal S20b.

Receiver 26 includes an implementation CCT1a of code and carrier tracking block CCT1 that is configured to output a frequency control signal S710 to code and carrier tracking block CCT2. For an example in which block CCT1a is implemented as an instance of frequency control unit 132, frequency control signal S710 may be implemented as the output signal of an implementation of second gain and accumulate stage 160 as described herein.

Code and carrier block CCT2 may be configured to rotate samples of complex signal S20b according to frequency control signal S710. In one example, code and carrier block CCT2 is implemented as an instance of baseband processing unit P30 as described herein.

Embodiments may be implemented in part or in whole as a hard-wired circuit or as a circuit configuration fabricated into an application-specific integrated circuit. Embodiments may also be implemented in part or in whole as a firmware program loaded into non-volatile storage or a software program loaded from or into a data storage medium (e.g. semiconductor or magnetic random-access memory (volatile or nonvolatile, integrated or removable); magnetic, optical, or phase-change disc media; etc.) as machine-readable code, such code being instructions executable by one or more arrays of logic elements such as microcontrollers, microprocessors or other digital signal processing units, or finite state machines (whether such array or arrays are separate, integrated, and/or embedded). Thus, the present invention is not intended to be limited to the embodiments shown above but rather is to be accorded the widest scope consistent with the principles and novel features disclosed in any fashion herein.

What is claimed is:

1. A receiver comprising:
   an oscillator configured to output a frequency reference without the use of an oscillator control signal;
   a first downconverter configured to output a first complex digital signal based on a received first radio-frequency (RF) signal having a first carrier frequency and on the frequency reference output by the oscillator;
   a second downconverter configured to output a second complex digital signal based on a received second RF signal having a second carrier frequency different than the first carrier frequency and on the frequency reference output by the oscillator;
   a frequency control unit configured to calculate a frequency correction signal based on the first complex digital signal output by the first downconverter, wherein the frequency control unit is coupled to indirectly receive the frequency reference from the oscillator, wherein the frequency correction signal is indicative of frequency error of at least one of the frequency reference or the first RF signal, and wherein the frequency control unit is configured to produce a timing adjustment signal based on the first complex digital signal;
   a processing unit configured to produce, according to the frequency correction signal, a baseband digital signal based on the second complex digital signal output by the second downconverter, wherein the baseband digital signal includes a stream of information symbols carried by the second RF signal; and
   a clock synthesizer configured to produce a sampling clock signal according to the frequency reference and the timing adjustment signal.

2. The receiver according to claim 1:
   wherein said second downconverter includes a mixer configured to mix the second RF signal with a local oscillator (LO) signal based on the frequency reference; and
   wherein the frequency control unit is configured to calculate the frequency correction signal based on a frequency error of the frequency reference.

3. The receiver according to claim 2, wherein said mixer is configured to produce, according to the local oscillator signal, a downconverted signal based on the second RF signal,
   said second downconverter comprising a digitizer configured to produce the second complex digital signal based on the downconverted signal.

4. The receiver according to claim 3,
   wherein said digitizer is configured to sample the downconverted signal according to the sampling clock signal.

5. The receiver according to claim 1, said receiver comprising a plurality of first downconverters, each configured to receive another LO signal based on the frequency reference and to produce, according to the other LO signal, a first complex digital signal based on a different received instance of the first RF signal.

6. The receiver according to claim 1, said receiver comprising a plurality of second downconverters, each configured to receive the LO signal and to produce, according to the LO signal, a second complex digital signal based on a different received instance of the second RF signal.

7. The receiver according to claim 6, said receiver comprising a plurality of processing units, each configured to produce, according to the frequency correction signal, a baseband digital signal based on a corresponding one of the second complex digital signals.

8. The receiver according to claim 1, wherein the processing unit is configured to rotate a value of the second complex digital signal by an angle indicated by the frequency correction signal.

9. The receiver according to claim 1, said receiver comprising an oscillator configured to output a frequency reference,
   wherein the processing unit is configured to rotate a value of the second complex digital signal according to a Doppler error of the second RF signal, and
   wherein the frequency control unit is configured to calculate the frequency correction signal according to a time-varying frequency error of the frequency reference.

10. The receiver according to claim 1, wherein the first complex digital signal includes a plurality of received instances of a transmitted signal, and
    wherein the frequency control unit is configured to calculate a plurality of frequency errors, each based on a different one of the received instances of a transmitted signal, and to calculate the frequency correction signal based on the plurality of frequency errors.

11. The receiver according to claim 10, wherein the frequency control unit includes a plurality of fingers, each configured to decode symbols of a different one of the received instances and to calculate a corresponding one of the plurality of frequency errors, and
    wherein each of the plurality of fingers is configured to calculate the frequency error based on at least one decoded symbol of the received instance.

12. The receiver according to claim 11, wherein each of the plurality of fingers is configured to rotate a value of the first complex digital signal by an angle based on the frequency error.

13. The receiver according to claim 12, wherein one of the plurality of fingers is configured to apply a first rotation angle to a value of the first complex digital signal, and
    wherein another of the plurality of fingers is configured to apply a second rotation angle to the value of the first complex digital signal, wherein the second rotation angle is different than the first rotation angle.

14. The receiver according to claim 11, wherein each of at least two of the plurality of fingers is configured to adjust a code phase of the respective received instance according to a time correction derived from the received instance.

15. The receiver according to claim 1, wherein the frequency control unit comprises a first loop including a first gain and accumulate stage configured to calculate a rotation signal, and
    wherein the frequency control unit is configured to rotate a value of the first complex digital signal by an angle indicated by the rotation signal, and
    wherein the receiver comprises a second loop including a second gain and accumulate stage configured to calculate the frequency correction signal.

16. The receiver according to claim 15, wherein the second gain and accumulate stage is configured to calculate the frequency correction signal based on the rotation signal.

17. The receiver according to claim 15, wherein the first loop includes a plurality of first gain and accumulate stages, each configured to calculate a different one of a plurality of rotation signals, and wherein the second gain and accumulate stage is configured to calculate the frequency correction signal based on the plurality of rotation signals.

18. The receiver according to claim 15, wherein the rotation signal indicates a Doppler error in the first RF signal, and wherein the frequency correction signal indicates a variation of the frequency of the frequency reference over time.

19. The receiver according to claim 15, wherein a response of the second loop is overdamped across an expected range of strengths of the plurality of received instances of a transmitted signal.

20. The receiver according to claim 15, wherein a ratio of a bandwidth of the first loop to a bandwidth of the second loop is substantially constant across an expected range of strengths of the plurality of received instances of a transmitted signal.

21. The receiver according to claim 15, wherein a bandwidth of the second loop is substantially constant across an expected range of strengths of the plurality of received instances of a transmitted signal.

22. The receiver according to claim 15, wherein the frequency control unit is configured to calculate the frequency correction signal to be independent of the rotation signal.

23. The receiver according to claim 15, wherein the second gain and accumulate stage is selectably configured to operate in one of (A) a mode of enabling changes to the state of the frequency correction signal and (B) a mode of disabling changes to the state of the frequency correction signal, and wherein selection between the operating modes of the second gain and accumulate stage is based on an average value of the rotation signal over time.

24. The receiver according to claim 15, wherein the second gain and accumulate stage is configured to calculate the frequency correction signal according to a gain factor, and wherein the second gain and accumulate stage is configured to select the gain factor, according to an average value of the rotation signal over time, from among a plurality of different gain factors.

25. The receiver according to claim 15, wherein the second gain and accumulate stage is configured to limit, based on a magnitude of the rotation signal, a rate of change of the frequency correction signal.

26. The receiver according to claim 1, wherein the first RF signal comprises a signal received from a transmitter of a positioning satellite system.

27. The receiver according to claim 1, wherein the second RF signal comprises a signal received from a transmitter of a positioning satellite system.

28. The receiver according to claim 1, said receiver comprising an upconverter configured to produce, according to a signal based on the frequency correction signal, a third RF signal based on a third complex digital signal different than the first and second complex digital signals.

29. A receiver comprising:

an oscillator configured to output a frequency reference without the use of an oscillator control signal;

a first downconverter configured to output a first complex digital signal based on a received first radio-frequency (RF) signal having a first carrier frequency and on the frequency reference output by the oscillator;

a second downconverter configured to output a second complex digital signal based on a received second RF signal having a second carrier frequency different than the first carrier frequency and on the frequency reference output by the oscillator;

a frequency control unit configured to calculate a frequency correction signal based on the first complex digital signal output by the first downconverter, wherein the frequency control unit is coupled to indirectly receive the frequency reference from the oscillator, wherein the frequency correction signal is indicative of frequency error of at least one of the frequency reference or the first RF signal, and wherein the frequency control unit is configured to produce a timing adjustment signal based on the first complex digital signal;

a processing unit configured to produce, according to the frequency correction signal, a baseband digital signal based on the second complex digital signal output by the second downconverter, wherein the baseband digital signal includes a stream of information symbols carried by the second RF signal; and clock synthesizing means for producing a sampling clock signal according to the frequency reference and the timing adjustment signal, wherein the processing unit is configured to calculate a physical position of the receiver based on the baseband digital signal.

30. A receiver comprising:

an oscillator configured to output a frequency reference without the use of an oscillator control signal;

a first downconverter configured to produce a first complex digital signal based on a received first radio-frequency (RF) signal having a first carrier frequency and on the frequency reference output by the oscillator;

a processing unit configured to calculate a timing adjustment signal based on the first complex digital signal output by the first downconverter, wherein the processing unit is coupled to indirectly receive the frequency reference from the oscillator, and wherein the processing unit is further configured to produce a timing adjustment signal based on the first complex digital signal;

a clock synthesizer configured to produce a sampling clock signal according to the timing adjustment signal output by the processing unit and on the frequency reference output by the oscillator; and a second downconverter configured to produce, according to the sampling clock signal output by the clock synthesizer, a second complex digital signal based on a received second RF signal having a second carrier frequency different than the first carrier frequency and on the frequency reference output by the oscillator.

31. The receiver according to claim 30:

wherein said clock synthesizer is configured to produce the sampling clock signal based on the frequency reference, and wherein the timing adjustment signal indicates a frequency error of the frequency reference.

32. The receiver according to claim 31, wherein said first downconverter is configured to mix the first RF signal with a local oscillator (LO) signal based on the frequency reference.

33. The receiver according to claim 31, said second downconverter including:

a mixer configured to produce, according to a second LO signal based on the frequency reference, a downconverted signal based on the second RF signal; and a digitizer configured to produce the second complex digital signal based on the second RF signal, wherein the digitizer is configured to produce the second complex digital signal according to the sampling clock signal.

34. The receiver according to claim 30, wherein the first complex digital signal includes a plurality of received instances of a transmitted signal, and wherein the processing unit is configured to calculate a plurality of timing errors, each based on a different one of the received instances of a transmitted signal, and to calculate the timing adjustment signal based on the plurality of timing errors.

35. The receiver according to claim 34, wherein the processing unit includes a plurality of fingers, each configured to decode symbols of a different one of the received instances and to calculate a corresponding one of the plurality of timing errors, and wherein each of the plurality of fingers is configured to calculate the timing error based on at least one decoded symbol of the received instance.

36. The receiver according to claim 35, wherein each of at least two of the plurality of fingers is configured to adjust a code phase of the respective received instance according to a time correction derived from the received instance.

37. The receiver according to claim 35, wherein each of the plurality of fingers is configured to decode symbols of a different one of the received instances and to calculate a corresponding frequency error, and wherein each of the plurality of fingers is configured to calculate the frequency error based on at least one decoded symbol of the received instance, and at least one of the plurality of fingers is configured to rotate a value of the first complex digital signal by an angle based on the corresponding frequency error.

38. The receiver according to claim 37, wherein one of the plurality of fingers is configured to apply a first rotation angle to a value of the first complex digital signal, and wherein another of the plurality of fingers is configured to apply a second rotation angle to the value of the first complex digital signal, wherein the second rotation angle is different than the first rotation angle.

39. The receiver according to claim 37, wherein said receiver comprises a rotator configured to rotate the second complex digital signal by an angle based on at least one of the plurality of frequency errors.

40. The receiver according to claim 30, said receiver comprising a plurality of first downconverters, each configured to produce a first complex digital signal based on a different received instance of the first RF signal, wherein the processing unit is configured to calculate the timing adjustment signal based on a plurality of the first complex digital signals.

41. The receiver according to claim 30, said receiver comprising a plurality of second downconverters, each configured to produce, according to the sampling clock signal, a second complex digital signal based on a different received instance of the second RF signal.

42. The receiver according to claim 30, said receiver comprising an upconverter configured to produce, according to a frequency correction signal based on the first complex signal, a third RF signal based on a third complex digital signal different than the first and second complex digital signals.

43. The receiver according to claim 30, said receiver comprising:

a plurality of upconverters, each configured to produce, according to a signal based on the timing adjustment signal, a third RF signal based on a third complex digital signal; and a plurality of antennas, each configured to transmit a signal based on a different one of the third RF signals.

44. The receiver according to claim 30, wherein the first RF signal comprises a signal received from a transmitter of a positioning satellite system.

45. The receiver according to claim 30, wherein the second RF signal comprises a signal received from a transmitter of a positioning satellite system.

46. A method comprising:

producing a frequency reference without the use of an oscillator control signal;

downconverting a first radio-frequency (RF) signal, having a first carrier frequency, using the frequency reference to provide a first complex digital signal;

downconverting a second RF signal, having a second carrier frequency different than the first carrier frequency, using the frequency reference to provide a second complex digital signal;

calculating a frequency correction signal using the first complex digital signal, wherein the frequency correction signal is indicative of frequency error of at least one of the frequency reference or the first RF signal;

producing, according to the frequency correction signal, a baseband digital signal using the second complex digital signal, wherein the baseband digital signal includes a stream of information symbols carried by the second RF signal;

producing a timing adjustment signal based on the first complex digital signal; and producing a sampling clock signal using the frequency reference and the timing adjustment signal.

47. A receiver comprising:

means for producing a frequency reference without the use of an oscillator control signal;

means for downconverting a first radio-frequency (RF) signal, having a first carrier frequency, using the frequency reference to provide a first complex digital signal;

means for downconverting a second RF signal, having a second carrier frequency different than the first carrier frequency, using the frequency reference to provide a second complex digital signal;

means for calculating a frequency correction signal using the first complex digital signal, wherein the frequency correction signal is indicative of frequency error of at least one of the frequency reference or the first RF signal;

means for producing, according to the frequency correction signal, a baseband digital signal using the second complex digital signal, wherein the baseband digital signal includes a stream of information symbols carried by the second RF signal;

means for producing a timing adjustment signal based on the first complex digital signal; and means for producing a sampling clock signal using the frequency reference and the timing adjustment signal.

48. A computer program product residing on a non-transitory processor-readable medium and comprising instructions configured to cause a processor to:

downconvert a first radio-frequency (RF) signal, having a first carrier frequency, using a frequency reference to provide a first complex digital signal;

downconvert a second RF signal, having a second carrier frequency different than the first carrier frequency, using the frequency reference to provide a second complex digital signal;

calculate a frequency correction signal using the first complex digital signal, wherein the frequency correction signal is indicative of frequency error of at least one of the frequency reference or the first RF signal;

produce, according to the frequency correction signal, a baseband digital signal using the second complex digital signal, wherein the baseband digital signal includes a stream of information symbols carried by the second RF signal;

produce a timing adjustment signal based on the first complex digital signal; and produce a sampling clock signal using the frequency reference and the timing adjustment signal.

\* \* \* \* \*